US009237291B2

(12) United States Patent
Selim

(10) Patent No.: US 9,237,291 B2
(45) Date of Patent: Jan. 12, 2016

(54) METHOD AND SYSTEM FOR LOCATING PROGRAMMING ON A TELEVISION

(71) Applicant: Flextronics AP, LLC, San Jose, CA (US)

(72) Inventor: Mohammed Selim, Oakville (CA)

(73) Assignee: Flextronics AP, LLC, San Jose, CA (US)

( * ) Notice: Subject to any disclaimer, the term of this patent is extended or adjusted under 35 U.S.C. 154(b) by 21 days.

(21) Appl. No.: 13/968,867

(22) Filed: Aug. 16, 2013

(65) Prior Publication Data

US 2014/0053196 A1     Feb. 20, 2014

Related U.S. Application Data

(60) Provisional application No. 61/684,672, filed on Aug. 17, 2012, provisional application No. 61/702,650, filed on Sep. 18, 2012, provisional application No. 61/697,710, filed on Sep. 6, 2012, provisional (Continued)

(51) Int. Cl.
*H04N 21/433* (2011.01)
*H04N 5/44* (2011.01)
(Continued)

(52) U.S. Cl.
CPC .............. *H04N 5/4401* (2013.01); *G06F 3/017* (2013.01); *G06F 3/0481* (2013.01);
(Continued)

(58) Field of Classification Search
CPC ............ H04N 21/431; H04N 21/4332; H04N 21/482; H04N 21/4888
USPC .......................................... 725/39, 40, 41, 43
See application file for complete search history.

(56) References Cited

U.S. PATENT DOCUMENTS

| 4,284,849 A | 8/1981 | Anderson et al. |
| 5,539,479 A | 7/1996 | Bertram |

(Continued)

FOREIGN PATENT DOCUMENTS

| CN | 1832534 | 9/2006 |
| CN | 101472102 | 7/2009 |

(Continued)

OTHER PUBLICATIONS

Official Action for U.S. Appl. No. 13/969,846, mailed Aug. 15, 2014 19 pages.

(Continued)

*Primary Examiner* — Benjamin R Bruckart
*Assistant Examiner* — Tien M Nguyen
(74) *Attorney, Agent, or Firm* — Sheridan Ross P.C.

(57) ABSTRACT

A method, system, and executable instructions are provided that obtain, from a network accessible content provider, electronic program guide ("EPG") information, the EPG information comprising, for each program, airtime, program name, program channel, and program description, display, on a screen of a television, a search panel, the search panel comprising a search term field to receive a search term and at least one previous search term used by the user in a prior search, wherein selection of the at least one previous search term initiates a search of the EPG information using the at least one previous search term as one or more selected search term, perform the search using one or more selected search terms, the one or more selected search terms being received in the search term field or a selected previous search term, obtain a set of search results, the set of search results comprising EPG information corresponding to multiple channels and/or programs, display the search results on the television screen, receive, from a remote control of the user, a program selection from the displayed search results, and change a current channel to a channel broadcasting the program selection.

24 Claims, 31 Drawing Sheets

Related U.S. Application Data application No. 61/700,182, filed on Sep. 12, 2012, provisional application No. 61/736,692, filed on Dec. 13, 2012, provisional application No. 61/798,821, filed on Mar. 15, 2013, provisional application No. 61/804,942, filed on Mar. 25, 2013, provisional application No. 61/804,998, filed on Mar. 25, 2013, provisional application No. 61/804,971, filed on Mar. 25, 2013, provisional application No. 61/804,990, filed on Mar. 25, 2013, provisional application No. 61/805,003, filed on Mar. 25, 2013, provisional application No. 61/805,053, filed on Mar. 25, 2013, provisional application No. 61/805,030, filed on Mar. 25, 2013, provisional application No. 61/805,027, filed on Mar. 25, 2013, provisional application No. 61/805,042, filed on Mar. 25, 2013, provisional application No. 61/805,038, filed on Mar. 25, 2013.

(51) Int. Cl.

| | |
|---|---|
| H04N 21/422 | (2011.01) |
| H04N 17/04 | (2006.01) |
| H04N 21/482 | (2011.01) |
| H04N 5/50 | (2006.01) |
| H04N 21/43 | (2011.01) |
| H04N 21/262 | (2011.01) |
| H04N 21/437 | (2011.01) |
| H04N 21/462 | (2011.01) |
| H04N 21/81 | (2011.01) |
| H04N 21/442 | (2011.01) |
| H04N 21/485 | (2011.01) |
| H04N 21/472 | (2011.01) |
| H04N 21/4788 | (2011.01) |
| H04N 21/475 | (2011.01) |
| H04N 21/84 | (2011.01) |
| H04N 21/478 | (2011.01) |
| H04N 21/8358 | (2011.01) |
| H04N 5/445 | (2011.01) |
| G06F 3/0481 | (2013.01) |
| H04N 21/488 | (2011.01) |
| H04N 21/61 | (2011.01) |
| H04N 21/439 | (2011.01) |
| H04N 21/431 | (2011.01) |
| H04N 21/435 | (2011.01) |
| H04N 21/432 | (2011.01) |
| H04N 21/47 | (2011.01) |
| H04L 12/58 | (2006.01) |
| H04N 21/258 | (2011.01) |
| H04N 21/45 | (2011.01) |
| G06F 3/01 | (2006.01) |
| G06F 3/0488 | (2013.01) |
| H04N 5/45 | (2011.01) |

(52) U.S. Cl.
CPC ........... *G06F 3/04883* (2013.01); *H04L 51/32* (2013.01); *H04N 5/44* (2013.01); *H04N 5/4403* (2013.01); *H04N 5/445* (2013.01); *H04N 5/45* (2013.01); *H04N 5/50* (2013.01); *H04N 17/04* (2013.01); *H04N 21/25808* (2013.01); *H04N 21/26291* (2013.01); *H04N 21/42204* (2013.01); *H04N 21/42207* (2013.01); *H04N 21/432* (2013.01); *H04N 21/433* (2013.01); *H04N 21/435* (2013.01); *H04N 21/437* (2013.01); *H04N 21/4307* (2013.01); *H04N 21/4316* (2013.01); *H04N 21/4396* (2013.01); *H04N 21/442* (2013.01); *H04N 21/44204* (2013.01); *H04N 21/44213* (2013.01); *H04N 21/44222* (2013.01); *H04N 21/4532* (2013.01); *H04N 21/4622* (2013.01); *H04N 21/47* (2013.01); *H04N 21/472* (2013.01); *H04N 21/478* (2013.01); *H04N 21/4755* (2013.01); *H04N 21/4788* (2013.01); *H04N 21/47202* (2013.01); *H04N 21/482* (2013.01); *H04N 21/485* (2013.01); *H04N 21/488* (2013.01); *H04N 21/4821* (2013.01); *H04N 21/4823* (2013.01); *H04N 21/4828* (2013.01); *H04N 21/4858* (2013.01); *H04N 21/4882* (2013.01); *H04N 21/6125* (2013.01); *H04N 21/6175* (2013.01); *H04N 21/8126* (2013.01); *H04N 21/8133* (2013.01); *H04N 21/8166* (2013.01); *H04N 21/8173* (2013.01); *H04N 21/8358* (2013.01); *H04N 21/84* (2013.01); *G06F 2203/04804* (2013.01); *H04N 21/42219* (2013.01); *H04N 21/4332* (2013.01)

(56) References Cited

U.S. PATENT DOCUMENTS

| | | | |
|---|---|---|---|
| 5,701,183 | A | 12/1997 | Bellemare et al. |
| 5,734,444 | A | 3/1998 | Yoshinobo |
| 5,801,747 | A | 9/1998 | Bedard |
| 5,867,227 | A | 2/1999 | Yamaguchi |
| 5,933,141 | A | 8/1999 | Smith |
| 5,964,839 | A | 10/1999 | Johnson et al. |
| 6,008,803 | A | 12/1999 | Rowe et al. |
| 6,047,319 | A | 4/2000 | Olson |
| 6,111,614 | A | 8/2000 | Mugura et al. |
| 6,177,931 | B1 | 1/2001 | Alexander et al. |
| 6,239,794 | B1 | 5/2001 | Yuen et al. |
| 6,285,804 | B1 | 9/2001 | Crinon et al. |
| 6,493,038 | B1 | 12/2002 | Singh et al. |
| 6,493,876 | B1 | 12/2002 | DeFreese et al. |
| 6,515,968 | B1 | 2/2003 | Combar et al. |
| 6,563,515 | B1 | 5/2003 | Reynolds et al. |
| 6,564,378 | B1 | 5/2003 | Satterfield et al. |
| 6,629,077 | B1 | 9/2003 | Arling et al. |
| 6,661,468 | B2 | 12/2003 | Alten et al. |
| 6,704,062 | B1 | 3/2004 | Ahida |
| 6,766,526 | B1 | 7/2004 | Ellis |
| 6,971,118 | B1 | 11/2005 | Akhavan et al. |
| 7,058,600 | B1 | 6/2006 | Combar et al. |
| 7,174,126 | B2 | 2/2007 | McElhatten et al. |
| 7,228,556 | B2 | 6/2007 | Beach et al. |
| 7,232,073 | B1 | 6/2007 | de Jong |
| 7,233,316 | B2 | 6/2007 | Smith et al. |
| 7,266,726 | B1 | 9/2007 | Ladd et al. |
| 7,363,591 | B2 | 4/2008 | Goldthwaite et al. |
| 7,487,529 | B1 | 2/2009 | Orlick |
| 7,493,641 | B2 | 2/2009 | Klosterman et al. |
| 7,506,350 | B2 | 3/2009 | Johnson |
| 7,543,320 | B2 | 6/2009 | Schein et al. |
| 7,577,923 | B2 | 8/2009 | Beam et al. |
| 7,623,933 | B2 | 11/2009 | Sarosi et al. |
| 7,685,520 | B2 | 3/2010 | Rashkovskiy et al. |
| 7,698,606 | B2 | 4/2010 | Ladd et al. |
| 7,805,634 | B2 | 9/2010 | Balazich et al. |
| 7,822,716 | B2 | 10/2010 | Lee et al. |
| 7,880,077 | B2 | 2/2011 | Pauws et al. |
| 7,900,228 | B2 | 3/2011 | Stark et al. |
| 7,904,924 | B1 | 3/2011 | De Heer et al. |
| 7,908,635 | B2 | 3/2011 | Barton et al. |
| 8,006,201 | B2 | 8/2011 | Bhattacharya |
| 8,065,390 | B2 | 11/2011 | Cheng |
| 8,089,455 | B1 | 1/2012 | Wieder |
| 8,127,329 | B1 | 2/2012 | Kunkel et al. |
| 8,151,215 | B2 | 4/2012 | Baurmann et al. |
| 8,166,511 | B2 | 4/2012 | Griggs |
| 8,201,104 | B2 | 6/2012 | Yamamoto et al. |
| 8,220,021 | B1 | 7/2012 | Look et al. |
| 8,281,339 | B1 | 10/2012 | Walker et al. |
| 8,352,983 | B1 | 1/2013 | Chane et al. |

(56) References Cited

U.S. PATENT DOCUMENTS

| | | | |
|---|---|---|---|
| 8,473,976 B2 | 6/2013 | Udani | |
| 8,510,780 B2 | 8/2013 | Stallings et al. | |
| 8,516,519 B2 | 8/2013 | Lee | |
| 8,549,561 B2 | 10/2013 | Yeh et al. | |
| 8,566,874 B2 | 10/2013 | Roberts et al. | |
| 8,589,981 B2 | 11/2013 | Lee et al. | |
| 8,640,166 B1 | 1/2014 | Craner | |
| 8,683,519 B2 | 3/2014 | McCarthy et al. | |
| 8,756,620 B2 | 6/2014 | Papish et al. | |
| 8,832,742 B2 | 9/2014 | Rasanen et al. | |
| 8,875,056 B2 | 10/2014 | Onogi et al. | |
| 2001/0001160 A1 | 5/2001 | Shoff et al. | |
| 2001/0010097 A1 | 7/2001 | Lee | |
| 2001/0056577 A1 | 12/2001 | Gordon et al. | |
| 2002/0007485 A1 | 1/2002 | Rodriguez et al. | |
| 2002/0026637 A1 | 2/2002 | Markel et al. | |
| 2002/0042914 A1 | 4/2002 | Walker et al. | |
| 2002/0049970 A1 | 4/2002 | Park | |
| 2002/0052746 A1 | 5/2002 | Handelman | |
| 2002/0056098 A1 | 5/2002 | White | |
| 2002/0067376 A1 | 6/2002 | Martin et al. | |
| 2002/0152267 A1 | 10/2002 | Lennon | |
| 2002/0188944 A1 | 12/2002 | Noble | |
| 2002/0188958 A1 | 12/2002 | Miller | |
| 2003/0003876 A1 | 1/2003 | Rumsey | |
| 2003/0014752 A1 | 1/2003 | Zaslavsky et al. | |
| 2003/0070171 A1 | 4/2003 | Jeon et al. | |
| 2003/0084449 A1 | 5/2003 | Chane et al. | |
| 2003/0110234 A1 | 6/2003 | Egli et al. | |
| 2003/0118323 A1 | 6/2003 | Ismail et al. | |
| 2003/0149988 A1 | 8/2003 | Ellis et al. | |
| 2003/0151621 A1 | 8/2003 | McEvilly et al. | |
| 2003/0177498 A1 | 9/2003 | Ellis et al. | |
| 2003/0182658 A1 | 9/2003 | Alexander | |
| 2003/0182659 A1 | 9/2003 | Ellis et al. | |
| 2003/0208763 A1 | 11/2003 | McElhatten et al. | |
| 2003/0221192 A1 | 11/2003 | Rappaport et al. | |
| 2003/0225777 A1 | 12/2003 | Marsh | |
| 2003/0226146 A1 | 12/2003 | Thurston et al. | |
| 2004/0078807 A1 | 4/2004 | Fries et al. | |
| 2004/0093616 A1* | 5/2004 | Johnson | 725/53 |
| 2004/0103120 A1 | 5/2004 | Fickle et al. | |
| 2004/0117831 A1* | 6/2004 | Ellis et al. | 725/53 |
| 2004/0119815 A1 | 6/2004 | Soloff | |
| 2004/0148362 A1 | 7/2004 | Friedman | |
| 2004/0154040 A1 | 8/2004 | Ellis | |
| 2004/0158193 A1 | 8/2004 | Bui | |
| 2004/0211282 A1 | 10/2004 | Kim | |
| 2004/0216156 A1 | 10/2004 | Wagner | |
| 2004/0237108 A1 | 11/2004 | Drazin et al. | |
| 2005/0015804 A1 | 1/2005 | LaJoie et al. | |
| 2005/0022237 A1 | 1/2005 | Nomura | |
| 2005/0091596 A1 | 4/2005 | Anthony et al. | |
| 2005/0097606 A1 | 5/2005 | Scott, III et al. | |
| 2005/0097622 A1 | 5/2005 | Zigmond et al. | |
| 2005/0120306 A1 | 6/2005 | Klassen et al. | |
| 2005/0149964 A1 | 7/2005 | Thomas et al. | |
| 2005/0160452 A1 | 7/2005 | Lawler et al. | |
| 2005/0165918 A1 | 7/2005 | Wantanabe et al. | |
| 2005/0188318 A1 | 8/2005 | Tamir et al. | |
| 2005/0188402 A1 | 8/2005 | de Andrade et al. | |
| 2005/0204382 A1 | 9/2005 | Ellis et al. | |
| 2005/0204387 A1* | 9/2005 | Knudson et al. | 725/52 |
| 2005/0229210 A1 | 10/2005 | Akhavan | |
| 2005/0232210 A1 | 10/2005 | Karaoguz et al. | |
| 2005/0273819 A1 | 12/2005 | Knudson et al. | |
| 2005/0289603 A1 | 12/2005 | Cezeaux et al. | |
| 2006/0031875 A1 | 2/2006 | Yu | |
| 2006/0064716 A1 | 3/2006 | Sull et al. | |
| 2006/0090183 A1 | 4/2006 | Zito et al. | |
| 2006/0101504 A1 | 5/2006 | Aravamudan et al. | |
| 2006/0117337 A1 | 6/2006 | Shivaji Rao et al. | |
| 2006/0117343 A1 | 6/2006 | Novak et al. | |
| 2006/0123445 A1 | 6/2006 | Sullivan et al. | |
| 2006/0143674 A1 | 6/2006 | Jones et al. | |
| 2006/0158838 A1 | 7/2006 | Kinoshita et al. | |
| 2006/0184972 A1 | 8/2006 | Rafey et al. | |
| 2006/0248557 A1 | 11/2006 | Stark et al. | |
| 2006/0262116 A1 | 11/2006 | Moshiri et al. | |
| 2006/0280449 A1 | 12/2006 | Ogawa et al. | |
| 2007/0011702 A1 | 1/2007 | Vaysman | |
| 2007/0028282 A1 | 2/2007 | Kooijmans et al. | |
| 2007/0050733 A1 | 3/2007 | Lee et al. | |
| 2007/0061724 A1 | 3/2007 | Slothouber et al. | |
| 2007/0066283 A1 | 3/2007 | Haar et al. | |
| 2007/0096939 A1 | 5/2007 | Walrath | |
| 2007/0143809 A1 | 6/2007 | Chen et al. | |
| 2007/0154163 A1 | 7/2007 | Cordray | |
| 2007/0162936 A1* | 7/2007 | Stallings et al. | 725/58 |
| 2007/0192715 A1 | 8/2007 | Kataria et al. | |
| 2007/0199022 A1 | 8/2007 | Moshiri et al. | |
| 2007/0250762 A1 | 10/2007 | Mansfield | |
| 2007/0250864 A1 | 10/2007 | Diaz Perez | |
| 2007/0261090 A1 | 11/2007 | Miller et al. | |
| 2008/0022309 A1 | 1/2008 | Begeja et al. | |
| 2008/0086745 A1 | 4/2008 | Knudson et al. | |
| 2008/0092198 A1 | 4/2008 | Hutten | |
| 2008/0098433 A1 | 4/2008 | Hardacker et al. | |
| 2008/0114794 A1 | 5/2008 | Craner | |
| 2008/0114861 A1 | 5/2008 | Gildred | |
| 2008/0120635 A1 | 5/2008 | Trimper et al. | |
| 2008/0133525 A1 | 6/2008 | Ott | |
| 2008/0141307 A1 | 6/2008 | Whitehead | |
| 2008/0155613 A1 | 6/2008 | Benya et al. | |
| 2008/0163307 A1 | 7/2008 | Coburn et al. | |
| 2008/0177828 A1 | 7/2008 | Accarie et al. | |
| 2008/0235595 A1 | 9/2008 | Krantz et al. | |
| 2008/0244637 A1 | 10/2008 | Candelore | |
| 2008/0250455 A1 | 10/2008 | Fukuda et al. | |
| 2008/0271080 A1* | 10/2008 | Gossweiler et al. | 725/47 |
| 2008/0276279 A1 | 11/2008 | Gossweiler et al. | |
| 2008/0282294 A1 | 11/2008 | Carpenter et al. | |
| 2008/0288461 A1 | 11/2008 | Glennon et al. | |
| 2008/0307457 A1 | 12/2008 | Yang et al. | |
| 2008/0313677 A1 | 12/2008 | Lee | |
| 2009/0013350 A1 | 1/2009 | Ohlfs et al. | |
| 2009/0019485 A1 | 1/2009 | Ellis et al. | |
| 2009/0064222 A1 | 3/2009 | Dawson et al. | |
| 2009/0102966 A1 | 4/2009 | Jiang et al. | |
| 2009/0106793 A1 | 4/2009 | Tecot et al. | |
| 2009/0125940 A1* | 5/2009 | Kim et al. | 725/39 |
| 2009/0129340 A1 | 5/2009 | Handa | |
| 2009/0150379 A1 | 6/2009 | Park et al. | |
| 2009/0158326 A1 | 6/2009 | Hunt et al. | |
| 2009/0158375 A1 | 6/2009 | Rodriguez et al. | |
| 2009/0160764 A1 | 6/2009 | Myllymäki | |
| 2009/0165045 A1 | 6/2009 | Stallings et al. | |
| 2009/0177981 A1 | 7/2009 | Christie et al. | |
| 2009/0179989 A1 | 7/2009 | Bessone et al. | |
| 2009/0199237 A1 | 8/2009 | White et al. | |
| 2009/0199241 A1 | 8/2009 | Unger et al. | |
| 2009/0199242 A1 | 8/2009 | Johnson et al. | |
| 2009/0204929 A1 | 8/2009 | Baurmann et al. | |
| 2009/0210910 A1 | 8/2009 | Smith et al. | |
| 2009/0213079 A1 | 8/2009 | Segal et al. | |
| 2009/0228919 A1 | 9/2009 | Zott et al. | |
| 2009/0235311 A1 | 9/2009 | Michel et al. | |
| 2009/0241048 A1 | 9/2009 | Augustine et al. | |
| 2009/0249394 A1 | 10/2009 | Schwesinger et al. | |
| 2009/0271823 A1 | 10/2009 | Jung et al. | |
| 2009/0293078 A1 | 11/2009 | Pirani et al. | |
| 2009/0293079 A1 | 11/2009 | McKee et al. | |
| 2009/0300674 A1 | 12/2009 | Ratsch et al. | |
| 2009/0313232 A1 | 12/2009 | Tinsley et al. | |
| 2010/0013997 A1 | 1/2010 | Whang | |
| 2010/0031193 A1 | 2/2010 | Stark et al. | |
| 2010/0050219 A1 | 2/2010 | Angiolillo et al. | |
| 2010/0058231 A1 | 3/2010 | Duarte et al. | |
| 2010/0060799 A1 | 3/2010 | Ishii | |
| 2010/0071019 A1 | 3/2010 | Blanchard et al. | |
| 2010/0086277 A1 | 4/2010 | Craner | |
| 2010/0095317 A1 | 4/2010 | Toebes et al. | |
| 2010/0100512 A1 | 4/2010 | Brodin et al. | |
| 2010/0107112 A1 | 4/2010 | Jennings et al. | |

(56) References Cited

U.S. PATENT DOCUMENTS

| | | |
|---|---|---|
| 2010/0122284 A1 | 5/2010 | Yoon et al. |
| 2010/0128183 A1 | 5/2010 | Ishii |
| 2010/0161506 A1 | 6/2010 | Bosenick et al. |
| 2010/0172407 A1 | 7/2010 | Ramaswamy |
| 2010/0177252 A1 | 7/2010 | Larsen et al. |
| 2010/0180292 A1 | 7/2010 | Epstein et al. |
| 2010/0180300 A1 | 7/2010 | Carpenter et al. |
| 2010/0191727 A1 | 7/2010 | Malik |
| 2010/0201890 A1 | 8/2010 | Degonde et al. |
| 2010/0225830 A1 | 9/2010 | Blanchard et al. |
| 2010/0235740 A1 | 9/2010 | Friedlander et al. |
| 2010/0241962 A1 | 9/2010 | Peterson et al. |
| 2010/0293497 A1 | 11/2010 | Peterson |
| 2010/0302444 A1 | 12/2010 | Ahn et al. |
| 2010/0306402 A1 | 12/2010 | Russell et al. |
| 2010/0306800 A1 | 12/2010 | Jung et al. |
| 2010/0319036 A1 | 12/2010 | Lim et al. |
| 2010/0321405 A1 | 12/2010 | MacInnes et al. |
| 2011/0016492 A1 | 1/2011 | Morita |
| 2011/0022450 A1 | 1/2011 | Meredith |
| 2011/0023608 A1 | 2/2011 | Rueger |
| 2011/0035774 A1 | 2/2011 | Parker |
| 2011/0041150 A1 | 2/2011 | Schein et al. |
| 2011/0043696 A1 | 2/2011 | Onogi et al. |
| 2011/0047572 A1 | 2/2011 | Hill et al. |
| 2011/0055873 A1 | 3/2011 | Heo et al. |
| 2011/0060661 A1 | 3/2011 | Chai et al. |
| 2011/0067066 A1 | 3/2011 | Barton et al. |
| 2011/0072480 A1 | 3/2011 | Stone |
| 2011/0074591 A1 | 3/2011 | Arling et al. |
| 2011/0078745 A1 | 3/2011 | Macrae et al. |
| 2011/0093888 A1 | 4/2011 | Araki et al. |
| 2011/0107376 A1 | 5/2011 | Lee et al. |
| 2011/0119626 A1 | 5/2011 | Faenger et al. |
| 2011/0119702 A1 | 5/2011 | Jang et al. |
| 2011/0119707 A1 | 5/2011 | Bae et al. |
| 2011/0125755 A1 | 5/2011 | Kaila et al. |
| 2011/0126251 A1 | 5/2011 | LaFreniere et al. |
| 2011/0131506 A1 | 6/2011 | Callisendorff |
| 2011/0145860 A1 | 6/2011 | Wei |
| 2011/0145881 A1 | 6/2011 | Hartman et al. |
| 2011/0154198 A1 | 6/2011 | Bachman et al. |
| 2011/0154405 A1 | 6/2011 | Isaias |
| 2011/0161996 A1 | 6/2011 | Hamano et al. |
| 2011/0167452 A1 | 7/2011 | Baumgartner et al. |
| 2011/0173657 A1 | 7/2011 | Thomas et al. |
| 2011/0179453 A1 | 7/2011 | Poniatowski |
| 2011/0179454 A1 | 7/2011 | Yates |
| 2011/0187929 A1 | 8/2011 | Suzuki et al. |
| 2011/0213670 A1 | 9/2011 | Strutton et al. |
| 2011/0213700 A1 | 9/2011 | Sant'Anselmo |
| 2011/0219395 A1 | 9/2011 | Moshiri et al. |
| 2011/0246495 A1 | 10/2011 | Mallinson |
| 2011/0252446 A1 | 10/2011 | Jeong et al. |
| 2011/0273552 A1 | 11/2011 | Wang et al. |
| 2011/0273625 A1 | 11/2011 | McMahon et al. |
| 2011/0276995 A1 | 11/2011 | Alten et al. |
| 2011/0283304 A1 | 11/2011 | Roberts et al. |
| 2011/0283318 A1 | 11/2011 | Seidel et al. |
| 2011/0289067 A1 | 11/2011 | Jordan et al. |
| 2011/0289419 A1 | 11/2011 | Yu et al. |
| 2011/0289452 A1 | 11/2011 | Jordan et al. |
| 2011/0321095 A1 | 12/2011 | Yao et al. |
| 2011/0321098 A1 | 12/2011 | Bangalore et al. |
| 2012/0002951 A1 | 1/2012 | Reisman |
| 2012/0011545 A1 | 1/2012 | Doets et al. |
| 2012/0026400 A1 | 2/2012 | Kang et al. |
| 2012/0030317 A1 | 2/2012 | Smyth et al. |
| 2012/0033950 A1 | 2/2012 | Cordray et al. |
| 2012/0042334 A1 | 2/2012 | Choi et al. |
| 2012/0054803 A1 | 3/2012 | Lee et al. |
| 2012/0060094 A1 | 3/2012 | Irwin et al. |
| 2012/0060187 A1 | 3/2012 | Moon et al. |
| 2012/0069131 A1 | 3/2012 | Abelow |
| 2012/0072952 A1 | 3/2012 | Vaysman et al. |
| 2012/0076473 A1 | 3/2012 | Kunkel et al. |
| 2012/0079096 A1 | 3/2012 | Cowan et al. |
| 2012/0079427 A1 | 3/2012 | Carmichael et al. |
| 2012/0086857 A1 | 4/2012 | Kim et al. |
| 2012/0090004 A1 | 4/2012 | Jeong |
| 2012/0096264 A1 | 4/2012 | Traversat et al. |
| 2012/0099024 A1 | 4/2012 | Ryu et al. |
| 2012/0110623 A1 | 5/2012 | Hill et al. |
| 2012/0120316 A1 | 5/2012 | Lee |
| 2012/0133840 A1 | 5/2012 | Shirasuka et al. |
| 2012/0143972 A1 | 6/2012 | Malik et al. |
| 2012/0144416 A1 | 6/2012 | Wetzer et al. |
| 2012/0144422 A1 | 6/2012 | Han et al. |
| 2012/0144423 A1 | 6/2012 | Kim et al. |
| 2012/0147049 A1 | 6/2012 | Lee |
| 2012/0147270 A1 | 6/2012 | Kim et al. |
| 2012/0147825 A1 | 6/2012 | Hassan et al. |
| 2012/0151006 A1 | 6/2012 | McInerney et al. |
| 2012/0154449 A1 | 6/2012 | Ramagem et al. |
| 2012/0167154 A1 | 6/2012 | Kim et al. |
| 2012/0173979 A1 | 7/2012 | Lee |
| 2012/0174039 A1 | 7/2012 | Rhoads et al. |
| 2012/0174157 A1 | 7/2012 | Stinson, III et al. |
| 2012/0176546 A1 | 7/2012 | Yoon |
| 2012/0194742 A1 | 8/2012 | Barnes et al. |
| 2012/0198490 A1 | 8/2012 | Mertens |
| 2012/0200574 A1 | 8/2012 | Hill et al. |
| 2012/0206652 A1 | 8/2012 | Yi |
| 2012/0210275 A1 | 8/2012 | Park et al. |
| 2012/0210355 A1 | 8/2012 | Kim et al. |
| 2012/0210367 A1 | 8/2012 | Lee et al. |
| 2012/0210370 A1 | 8/2012 | Kim et al. |
| 2012/0210375 A1 | 8/2012 | Wong et al. |
| 2012/0210386 A1 | 8/2012 | Kim et al. |
| 2012/0218203 A1 | 8/2012 | Kanki |
| 2012/0221972 A1 | 8/2012 | Dougall et al. |
| 2012/0229320 A1 | 9/2012 | Yu |
| 2012/0229473 A1 | 9/2012 | Tam |
| 2012/0257108 A1 | 10/2012 | Friedlander et al. |
| 2012/0260284 A1 | 10/2012 | Friedlander et al. |
| 2012/0272271 A1 | 10/2012 | Nishizawa et al. |
| 2012/0278725 A1 | 11/2012 | Gordon et al. |
| 2012/0284751 A1 | 11/2012 | Kim et al. |
| 2012/0284752 A1 | 11/2012 | Jung |
| 2012/0291068 A1 | 11/2012 | Khushoo et al. |
| 2012/0297422 A1 | 11/2012 | Mountain |
| 2012/0331505 A1 | 12/2012 | Chun et al. |
| 2013/0014006 A1 | 1/2013 | Abellera et al. |
| 2013/0027613 A1 | 1/2013 | Kim et al. |
| 2013/0034023 A1 | 2/2013 | Jung |
| 2013/0047174 A1 | 2/2013 | Lee et al. |
| 2013/0051615 A1 | 2/2013 | Lim et al. |
| 2013/0091053 A1 | 4/2013 | Park et al. |
| 2013/0097640 A1 | 4/2013 | Lemmons et al. |
| 2013/0148023 A1 | 6/2013 | Sullivan et al. |
| 2013/0152135 A1 | 6/2013 | Hong et al. |
| 2013/0160065 A1 | 6/2013 | Aso et al. |
| 2013/0191869 A1 | 7/2013 | Sugiyama et al. |
| 2013/0238777 A1 | 9/2013 | Raleigh |
| 2013/0238796 A1 | 9/2013 | Lentzitzky |
| 2013/0263021 A1 | 10/2013 | Dunn et al. |
| 2013/0263053 A1 | 10/2013 | Tritschler et al. |
| 2013/0275519 A1 | 10/2013 | Nichols |
| 2013/0276031 A1 | 10/2013 | Oh et al. |
| 2013/0282839 A1 | 10/2013 | Alcala |
| 2013/0291015 A1 | 10/2013 | Pan |
| 2013/0297697 A1 | 11/2013 | Haimovitch et al. |
| 2013/0298164 A1 | 11/2013 | Moreau et al. |
| 2013/0318553 A1 | 11/2013 | Yegorov et al. |
| 2013/0326557 A1 | 12/2013 | Kang et al. |
| 2013/0332856 A1 | 12/2013 | Sanders et al. |
| 2014/0040344 A1 | 2/2014 | Gehring et al. |
| 2014/0040819 A1 | 2/2014 | Duffy |
| 2014/0049651 A1 | 2/2014 | Voth |
| 2014/0049691 A1 | 2/2014 | Burdzinski et al. |
| 2014/0049692 A1 | 2/2014 | Sirpal et al. |
| 2014/0049693 A1 | 2/2014 | Selim et al. |
| 2014/0052785 A1 | 2/2014 | Sirpal |
| 2014/0052786 A1 | 2/2014 | de Paz |

(56) References Cited

U.S. PATENT DOCUMENTS

| | | |
|---|---|---|
| 2014/0053176 A1 | 2/2014 | Milano et al. |
| 2014/0053177 A1 | 2/2014 | Voth |
| 2014/0053178 A1 | 2/2014 | Voth et al. |
| 2014/0053179 A1 | 2/2014 | Voth |
| 2014/0053180 A1 | 2/2014 | Shoykher |
| 2014/0053190 A1 | 2/2014 | Sirpal |
| 2014/0053191 A1 | 2/2014 | Selim |
| 2014/0053192 A1 | 2/2014 | Sirpal |
| 2014/0053193 A1 | 2/2014 | Selim et al. |
| 2014/0053194 A1 | 2/2014 | Shoykher et al. |
| 2014/0053195 A1 | 2/2014 | Sirpal et al. |
| 2014/0053197 A1 | 2/2014 | Shoykher et al. |
| 2014/0053198 A1 | 2/2014 | Sirpal et al. |
| 2014/0053200 A1 | 2/2014 | de Paz et al. |
| 2014/0053202 A1 | 2/2014 | Selim |
| 2014/0053203 A1 | 2/2014 | Csiki |
| 2014/0053204 A1 | 2/2014 | Milano |
| 2014/0053205 A1 | 2/2014 | Sirpal et al. |
| 2014/0053206 A1 | 2/2014 | Shoykher et al. |
| 2014/0053207 A1 | 2/2014 | Shoykher et al. |
| 2014/0053208 A1 | 2/2014 | Sirpal et al. |
| 2014/0053211 A1 | 2/2014 | Milano |
| 2014/0053212 A1 | 2/2014 | Shoykher et al. |
| 2014/0053221 A1 | 2/2014 | Sirpal et al. |
| 2014/0053222 A1 | 2/2014 | Shoykher et al. |
| 2014/0053225 A1 | 2/2014 | Shoykher et al. |
| 2014/0055673 A1 | 2/2014 | Sirpal et al. |
| 2014/0059480 A1 | 2/2014 | de Paz et al. |
| 2014/0059578 A1 | 2/2014 | Voth et al. |
| 2014/0059589 A1 | 2/2014 | Sirpal |
| 2014/0059596 A1 | 2/2014 | Dourado |
| 2014/0059598 A1 | 2/2014 | Milano |
| 2014/0059599 A1 | 2/2014 | Sirpal et al. |
| 2014/0059600 A1 | 2/2014 | Duarado |
| 2014/0059601 A1 | 2/2014 | Sirpal |
| 2014/0059602 A1 | 2/2014 | Sirpal |
| 2014/0059603 A1 | 2/2014 | Lee et al. |
| 2014/0059605 A1 | 2/2014 | Sirpal et al. |
| 2014/0059606 A1 | 2/2014 | Selim et al. |
| 2014/0059609 A1 | 2/2014 | Duarado |
| 2014/0059610 A1 | 2/2014 | Sirpal et al. |
| 2014/0059612 A1 | 2/2014 | Selim |
| 2014/0059613 A1 | 2/2014 | Burdzinski et al. |
| 2014/0059614 A1 | 2/2014 | Shoykher et al. |
| 2014/0059615 A1 | 2/2014 | Sirpal et al. |
| 2014/0059625 A1 | 2/2014 | Dourado et al. |
| 2014/0059626 A1 | 2/2014 | Selim |
| 2014/0059635 A1 | 2/2014 | Sirpal et al. |
| 2014/0059637 A1 | 2/2014 | Chen et al. |
| 2014/0067954 A1 | 3/2014 | Sirpal |
| 2014/0068673 A1 | 3/2014 | Sirpal et al. |
| 2014/0068674 A1 | 3/2014 | Sirpal et al. |
| 2014/0068679 A1 | 3/2014 | Kaneko et al. |
| 2014/0068682 A1 | 3/2014 | Selim et al. |
| 2014/0068683 A1 | 3/2014 | Selim et al. |
| 2014/0068685 A1 | 3/2014 | Selim et al. |
| 2014/0068689 A1 | 3/2014 | Sirpal et al. |
| 2014/0075475 A1 | 3/2014 | Sirpal et al. |
| 2014/0075476 A1 | 3/2014 | de Paz et al. |
| 2014/0075477 A1 | 3/2014 | de Paz et al. |
| 2014/0075479 A1 | 3/2014 | Soto et al. |
| 2014/0075483 A1 | 3/2014 | de Paz et al. |
| 2014/0075484 A1 | 3/2014 | Selim et al. |
| 2014/0075487 A1 | 3/2014 | Selim et al. |
| 2014/0082659 A1 | 3/2014 | Fife et al. |
| 2014/0109143 A1 | 4/2014 | Craner |
| 2014/0173660 A1 | 6/2014 | Correa et al. |
| 2014/0181851 A1 | 6/2014 | Givon et al. |
| 2014/0181853 A1 | 6/2014 | Dureau et al. |
| 2014/0188970 A1 | 7/2014 | Madhok et al. |
| 2014/0223464 A1 | 8/2014 | Moran et al. |
| 2014/0259074 A1 | 9/2014 | Ansari et al. |
| 2014/0380414 A1 | 12/2014 | Saidi et al. |

FOREIGN PATENT DOCUMENTS

| | | |
|---|---|---|
| CN | 101540850 | 9/2009 |
| CN | 101567992 | 10/2009 |
| CN | 201937743 | 8/2011 |
| EP | 1031929 | 8/2000 |
| EP | 1067458 | 1/2001 |
| EP | 1770956 | 4/2007 |
| EP | 1865723 | 12/2007 |
| EP | 2328346 | 6/2011 |
| EP | 2348724 | 7/2011 |
| EP | 2439935 | 4/2012 |
| EP | 2487922 | 8/2012 |
| WO | WO 99/21308 | 4/1999 |
| WO | WO 99/35849 | 7/1999 |
| WO | WO 00/05884 | 2/2000 |
| WO | WO 01/06784 | 1/2001 |
| WO | WO 01/06788 | 1/2001 |
| WO | WO 02/080552 | 10/2002 |
| WO | WO 03/044755 | 5/2003 |
| WO | WO 2007/137611 | 12/2007 |
| WO | WO 2011/148054 | 12/2011 |
| WO | WO 2011/163481 | 12/2011 |
| WO | WO 2012/030024 | 3/2012 |
| WO | WO 2012/068438 | 5/2012 |
| WO | WO 2012/073027 | 6/2012 |
| WO | WO 2012/094247 | 7/2012 |
| WO | WO 2012/103121 | 8/2012 |
| WO | WO 2014/026636 | 2/2014 |
| WO | WO 2014/026640 | 2/2014 |
| WO | WO 2014/028067 | 2/2014 |
| WO | WO 2014/028068 | 2/2014 |
| WO | WO 2014/028069 | 2/2014 |
| WO | WO 2014/028071 | 2/2014 |
| WO | WO 2014/028074 | 2/2014 |

OTHER PUBLICATIONS

Official Action for U.S. Appl. No. 13/969,869, mailed Sep. 16, 2014 20 pages.
Official Action for U.S. Appl. No. 13/969,880, mailed Sep. 11, 2014 10 pages.
Official Action for U.S. Appl. No. 13/969,884, mailed Oct. 23, 2014 20 pages.
Official Action for U.S. Appl. No. 13/969,887, mailed Oct. 23, 2014 16 pages.
Official Action for U.S. Appl. No. 13/969,482, mailed Oct. 21, 2014 22 pages.
Official Action for U.S. Appl. No. 13/969,485, mailed Oct. 2, 2014 21 pages.
Official Action for U.S. Appl. No. 13/970,388, mailed Sep. 4, 2014 14 pages.
Official Action for U.S. Appl. No. 13/970,398, mailed Sep. 2, 2014 14 pages.
Official Action for U.S. Appl. No. 13/970,420, mailed Oct. 9, 2014 15 pages.
Official Action for U.S. Appl. No. 13/970,427, mailed Sep. 30, 2014 24 pages.
Official Action for U.S. Appl. No. 13/970,442, mailed Oct. 7, 2014 10 pages.
Official Action for U.S. Appl. No. 13/969,588, mailed Nov. 10, 2014 11 pages.
Official Action for U.S. Appl. No. 13/969,487, mailed Sep. 11, 2014 10 pages.
Official Action for U.S. Appl. No. 13/969,491, mailed Oct. 8, 2014 21 pages.
Official Action for U.S. Appl. No. 13/864,214, mailed Aug. 19, 2014 17 pages.
Official Action for U.S. Appl. No. 13/969,506, mailed Oct. 2, 2014 9 pages.
Official Action for U.S. Appl. No. 13/968,665, mailed Oct. 9, 2014 12 pages.
Official Action for U.S. Appl. No. 13/968,897, mailed Aug. 15, 2014 15 pages.
Official Action for U.S. Appl. No. 13/970,234, mailed Aug. 12, 2014 19 pages.

(56) References Cited

OTHER PUBLICATIONS

Official Action for U.S. Appl. No. 13/968,969, mailed Aug. 19, 2014 14 pages.
Official Action for U.S. Appl. No. 13/968,610, mailed Aug. 19, 2014 13 pages.
Official Action for U.S. Appl. No. 13/968,630, mailed Jul. 31, 2014 9 pages.
Official Action for U.S. Appl. No. 13/969,507, mailed Aug. 29, 2014 30 pages.
Official Action for U.S. Appl. No. 13/969,508, mailed Nov. 7, 2014 10 pages.
Official Action for U.S. Appl. No. 13/969,510, mailed Nov. 3, 2014 16 pages.
Official Action for U.S. Appl. No. 13/970,243, mailed Aug. 22, 2014 20 pages.
U.S. Appl. No. 13/970,420, filed Aug. 19, 2013, Selim et al.
Tvonicsuk "Tvonics: How to use the EPG search function." 1 pages retrieved from the internet on Nov. 11, 2013 from [www.youtube.com/watch?v=H8euZ0Iydo].
International Search Report and Written Opinion for International (PCT) Patent Application No. PCT/US13/36844, mailed Jun. 28, 2013 8 pages.
International Search Report and Written Opinion for International (PCT) Patent Application No. PCT/US13/36843, mailed Jun. 28, 2013 8 pages.
International Search Report and Written Opinion for International (PCT) Patent Application No. PCT/US13/36826, mailed Jun. 17, 2013 8 pages.
International Search Report and Written Opinion for International (PCT) Patent Application No. PCT/US13/55589, mailed Dec. 19, 2013 9 pages.
International Search Report and Written Opinion for International (PCT) Patent Application No. PCT/US2013/055289, mailed Dec. 2, 2013 7 pages.
International Search Report and Written Opinion for International (PCT) Patent Application No. PCT/US2013/055288, mailed Dec. 2, 2013 9 pages.
International Search Report and Written Opinion for International (PCT) Patent Application No. PCT/US2013/055286, mailed Dec. 2, 2013 8 pages.
International Search Report and Written Opinion for International (PCT) Patent Application No. PCT/US13/55285, mailed Dec. 11, 2013 8 pages.
International Search Report and Written Opinion for International (PCT) Patent Application No. PCT/US2013/055284, mailed Jan. 14, 2014 12 pages.
International Search Report and Written Opinion for International (PCT) Patent Application No. PCT/US2013/055293, mailed Dec. 2, 2013 12 pages.
International Search Report and Written Opinion for International (PCT) Patent Application No. PCT/US2013/055294, mailed Dec. 2, 2013 10 pages.
International Search Report and Written Opinion for International (PCT) Patent Application No. PCT/US2013/055296, mailed Nov. 29, 2013 9 pages.
International Search Report and Written Opinion for International (PCT) Patent Application No. PCT/US13/55493, mailed Nov. 7, 2013 9 pages.
International Search Report and Written Opinion for International (PCT) Patent Application No. PCT/US2013/036828, mailed Jun. 28, 2013 12 pages.
International Search Report and Written Opinion for International (PCT) Patent Application No. PCT/US2013/055340, mailed Feb. 10, 2014 10 pages.
International Search Report and Written Opinion for International (PCT) Patent Application No. PCT/US13/55551, mailed Dec. 6, 2013 7 pages.
International Search Report and Written Opinion for International (PCT) Patent Application No. PCT/US2013/036819, mailed Jun. 17, 2013 9 pages.
International Search Report and Written Opinion for International (PCT) Patent Application No. PCT/US2013/036782, mailed Jun. 28, 2013 9 pages.
International Search Report and Written Opinion for International (PCT) Patent Application No. PCT/US13/36678, mailed Aug. 30, 2013 9 pages.
International Search Report and Written Opinion for International (PCT) Patent Application No. PCT/US2013/036804, mailed Jul. 1, 2013 13 pages.
International Search Report and Written Opinion for International (PCT) Patent Application No. PCT/US13/55405, mailed Jan. 17, 2014 8 pages.
International Search Report and Written Opinion for International (PCT) Patent Application No. PCT/US2013/055278, mailed Mar. 11, 2014 9 pages.
International Search Report and Written Opinion for International (PCT) Patent Application No. PCT/US13/55509, mailed Nov. 8, 2013 9 pages.
International Search Report and Written Opinion for Intenational (PCT) Patent Application No. PCT/CN2013/081639, mailed Nov. 28, 2013 10 pages.
International Search Report and Written Opinion for International (PCT) Patent Application No. PCT/US2013/055303, mailed Dec. 5, 2013 8 pages.
International Search Report and Written Opinion for International (PCT) Patent Application No. PCT/US2013/055280, mailed Jan. 10, 2014 10 pages.
International Search Report and Written Opinion for International (PCT) Patent Application No. PCT/US13/55383, mailed Nov. 13, 2013 9 pages.
International Search Report and Written Opinion for International (PCT) Patent Application No. PCT/US2013/055344, mailed Mar. 11, 2014 8 pages.
International Search Report and Written Opinion for International (PCT) Patent Application No. PCT/US2013/055345, mailed Dec. 6, 2013 7 pages.
International Search Report and Written Opinion for International (PCT) Patent Application No. PCT/US13/55371, mailed Nov. 8, 2013 7 pages.
International Search Report and Written Opinion for International (PCT) Patent Application No. PCT/US13/55389, mailed Mar. 10, 2014 10 pages.
International Search Report and Written Opinion for International (PCT) Patent Application No. PCT/US2013/055283, mailed Mar. 4, 2014 7 pages.
International Search Report and Written Opinion for International (PCT) Patent Application No. PCT/US13/55564, mailed Nov. 22, 2013 7 pages.
International Search Report and Written Opinion for International (PCT) Patent Application No. PCT/US13/55379, mailed Dec. 6, 2013 8 pages.
International Search Report and Written Opinion for International (PCT) Patent Application No. PCT/US2013/055349, mailed Nov. 29, 2013 7 pages.
International Search Report and Written Opinion for International (PCT) Patent Application No. PCT/US2013/055312, mailed Dec. 5, 2013 8 pages.
International Search Report and Written Opinion for International (PCT) Patent Application No. PCT/US13/55374, mailed Nov. 12, 2013 8 pages.
International Search Report and Written Opinion for International (PCT) Patent Application No. PCT/US13/55542, mailed Mar. 10, 2014 9 pages.
International Search Report and Written Opinion for International (PCT) Patent Application No. PCT/US13/55315, mailed Jan. 24, 2014 9 pages.
International Search Report and Written Opinion for International (PCT) Patent Application No. PCT/US2013/055317, mailed Dec. 2, 2013 9 pages.
International Search Report and Written Opinion for International (PCT) Patent Application No. PCT/US2013/055318, mailed Jan. 9, 2014 10 pages.

(56) References Cited

OTHER PUBLICATIONS

International Search Report and Written Opinion for International (PCT) Patent Application No. PCT/US2013/055319, mailed Mar. 11, 2014 7 pages.
International Search Report and Written Opinion for International (PCT) Patent Application No. PCT/US2013/055321, mailed Dec. 6, 2013 9 pages.
International Search Report and Written Opinion for International (PCT) Patent Application No. PCT/CN2013/081630, mailed Nov. 21, 2013 11 pages.
International Search Report and Written Opinion for International (PCT) Patent Application No. PCT/US2013/055298, mailed Nov. 29, 2013 8 pages.
International Search Report and Written Opinion for International (PCT) Patent Application No. PCT/US13/55567, mailed Dec. 20, 2013 10 pages.
International Search Report and Written Opinion for International (PCT) Patent Application No. PCT/US13/55570, mailed Nov. 22, 2013 8 pages.
Official Action for U.S. Appl. No. 13/864,206, mailed Nov. 27, 2013 17 pages.
Official Action for U.S. Appl. No. 13/864,214, mailed Mar. 12, 2014 12 pages.
International Search Report and Written Opinion for International (PCT) Patent Application No. PCT/US13/55494, mailed Apr. 16, 2014 9 pages.
International Search Report and Written Opinion for International (PCT) Patent Application No. PCT/US2013/055342, mailed Apr. 17, 2014 12 pages.
International Search Report and Written Opinion for International (PCT) Patent Application No. PCT/US13/55592, mailed Mar. 10, 2014 11 pages.
Notice of Allowance for U.S. Appl. No. 13/864,206, mailed Apr. 16, 2014 7 pages.
Official Action for U.S. Appl. No. 13/970,409, mailed Jul. 21, 2014 21 pages.
Official Action for U.S. Appl. No. 13/970,442, mailed Jun. 4, 2014 10 pages.
Official Action for U.S. Appl. No. 13/970,450 mailed Jul. 9, 2014 17 pages.
Official Action for U.S. Appl. No. 13/970,453, mailed Jul. 21, 2014 12 pages.
Official Action for U.S. Appl. No. 13/968,858 mailed May 15, 2014 6 pages.
Official Action for U.S. Appl. No. 13/968,884, mailed Jun. 25, 2014 23 pages.
Official Action for U.S. Appl. No. 13/968,876 mailed Jun. 16, 2014 10 pages.
Official Action for U.S. Appl. No. 13/968,983, mailed Ju. 7, 2014 15 pages.
Official Action for U.S. Appl. No. 13/968,948 mailed May 6, 2014 11 pages.
Official Action for U.S. Appl. No. 13/864,120 mailed Jun. 13, 2014 10 pages.
Official Action for U.S. Appl. No. 13/969,505, mailed Jul. 15, 2014 7 pages.
Official Action for U.S. Appl. No. 13/969,490 mailed May 23, 2014 18 pages.
Official Action for U.S. Appl. No. 13/969,492 mailed May 23, 2014 17 pages.
Official Action for U.S. Appl. No. 13/970,000, mailed Jul. 15, 2014 12 pages.
Official Action for U.S. Appl. No. 13/970,355, mailed Jul. 7, 2014 7 pages.
Official Action for U.S. Appl. No. 13/970,374, mailed Jun. 6, 2014 7 pages.
Official Action for U.S. Appl. No. 13/968,903, mailed Jul. 18, 2014 14 pages.
Official Action for U.S. Appl. No. 13/968,969, mailed May 6, 2014 12 pages.
Official Action for U.S. Appl. No. 13/968,610, mailed Apr. 30, 2014 11 pages.
Official Action for U.S. Appl. No. 13/968,732, mailed May 27, 2014 12 pages.
Official Action for U.S. Appl. No. 13/969,777, mailed Jun. 25, 2014 9 pages.
Official Action for U.S. Appl. No. 13/969,510, mailed Jun. 25, 2014 13 pages.
Official Action for U.S. Appl. No. 13/970,247, mailed Jul. 9, 2014 19 pages.
Official Action for U.S. Appl. No. 13/969,504, mailed Jul. 15, 2014 9 pages.
U.S. Appl. No. 14/407,593, filed Dec. 12, 2014, Sirpal et al.
U.S. Appl. No. 14/407,598, filed Dec. 12, 2014, Sirpal et al.
U.S. Appl. No. 14/407,601, filed Dec. 12, 2014, Sirpal et al.
U.S. Appl. No. 14/407,609, filed Dec. 12, 2014, Sirpal et al.
U.S. Appl. No. 14/418,969, filed Feb. 2, 2015, Sirpal et al.
U.S. Appl. No. 14/418,972, filed Feb. 2, 2015, Sirpal et al.
U.S. Appl. No. 14/418,971, filed Feb. 2, 2015, Shoykher et al.
International Preliminary Report on Patentability for Intenational (PCT) Patent Application No. PCT/CN2013/081639, mailed Feb. 26, 2015 6 pages.
Official Action for U.S. Appl. No. 13/969,846, mailed Mar. 2, 2015 21 pages.
Official Action for U.S. Appl. No. 13/969,869, mailed Feb. 24, 2015 22 pages.
Official Action for U.S. Appl. No. 13/970,388, mailed Jan. 22, 2015 12 pages.
Notice of Allowance for U.S. Appl. No. 13/970,398, mailed Feb. 2, 2015 14 pages.
Official Action for U.S. Appl. No. 13/970,409, mailed Feb. 11, 2015 25 pages.
Official Action for U.S. Appl. No. 13/970,420, mailed Feb. 10, 2015 13 pages.
Official Action for U.S. Appl. No. 13/970,442, mailed Feb. 26, 2015 10 pages.
Official Action for U.S. Appl. No. 13/970,450, mailed Nov. 19, 2014 12 pages.
Notice of Allowance for U.S. Appl. No. 13/970,453, mailed Dec. 9, 2014 11 pages.
Official Action for U.S. Appl. No. 13/968,858, mailed Jan. 23, 2015 9 pages.
Notice of Allowance for U.S. Appl. No. 13/968,884, mailed Jan. 5, 2015 20 pages.
Official Action for U.S. Appl. No. 13/968,876, mailed Dec. 26, 2014 13 pages.
Official Action for U.S. Appl. No. 13/968,983, mailed Nov. 26, 2014 17 pages.
Official Action for U.S. Appl. No. 13/968,948, mailed Nov. 24, 2014 13 pages.
Official Action for U.S. Appl. No. 13/864,120, mailed Dec. 24, 2014 13 pages.
Official Action for U.S. Appl. No. 13/969,505, mailed Feb. 24, 2015 9 pages.
Official Action for U.S. Appl. No. 13/969,490, mailed Nov. 19, 2014 22 pages.
Official Action for U.S. Appl. No. 13/969,492, mailed Dec. 5, 2014 14 pages.
Official Action for U.S. Appl. No. 13/969,493, mailed Mar. 2, 2015 15 pages.
Official Action for U.S. Appl. No. 13/9700,000, mailed Nov. 14, 2014 14 pages.
Official Action for U.S. Appl. No. 13/970,355, mailed Dec. 19, 2014 9 pages.
Official Action for U.S. Appl. No. 13/864,214, mailed Jan. 29, 2015 17 pages.
Official Action for U.S. Appl. No. 13/969,179, mailed Nov. 28, 2014 15 pages.
Official Action for U.S. Appl. No. 13/968,767, mailed Jan. 22, 2015 15 pages.
Official Action for U.S. Appl. No. 13/969,506, mailed Jan. 23, 2015 9 pages.

(56) References Cited

OTHER PUBLICATIONS

Official Action for U.S. Appl. No. 13/970,374, mailed Dec. 9, 2014 9 pages.
Official Action for U.S. Appl. No. 13/968,897, mailed Jan. 28, 2015 18 pages.
Official Action for U.S. Appl. No. 13/968,652, mailed Dec. 5, 2014 25 pages.
Official Action for U.S. Appl. No. 13/968,709, mailed Nov. 14, 2014 17 pages.
Official Action for U.S. Appl. No. 13/968,709, mailed Feb. 23, 2015 13 pages.
Official Action for U.S. Appl. No. 13/968,903, mailed Jan. 5, 2015 13 pages.
Official Action for U.S. Appl. No. 13/970,234, mailed Dec. 26, 2014 13 pages.
Notice of Allowance for U.S. Appl. No. 13/968,969, mailed Jan. 6, 2015 6 pages.
Official Action for U.S. Appl. No. 13/968,610, mailed Dec. 31, 2014 7 pages.
Notice of Allowance for U.S. Appl. No. 13/968,610, mailed Feb. 24, 2015 5 pages.
Official Action for U.S. Appl. No. 13/968,732, mailed Dec. 26, 2014 13 pages.
Official Action for U.S. Appl. No. 13/969,777, mailed Jan. 8, 2015 11 pages.
Official Action for U.S. Appl. No. 13/968,630, mailed Nov. 19, 2014 11 pages.
Official Action for U.S. Appl. No. 13/969,507, mailed Jan. 27, 2015 30 pages.
Official Action for U.S. Appl. No. 13/968,937, mailed Dec. 18, 2014 9 pages.
Official Action for U.S. Appl. No. 13/969,510, mailed Feb. 24, 2015 17 pages.
Official Action for U.S. Appl. No. 13/970,243, mailed Jan. 22, 2015 14 pages.
Official Action for U.S. Appl. No. 13/970,247, mailed Dec. 22, 2014 20 pages.
Official Action for U.S. Appl. No. 13/969,504, mailed Feb. 23, 2015 10 pages.
International Preliminary Report on Patentability for International (PCT) Patent Application No. PCT/US13/55494, mailed Feb. 26, 2015 8 pages.
International Preliminary Report on Patentability for International (PCT) Patent Application No. PCT/US13/36826, mailed Feb. 26, 2015 8 pages.
International Preliminary Report on Patentability for International (PCT) Patent Application No. PCT/US2013/055342, mailed Feb. 26, 2015 10 pages.
International Preliminary Report on Patentability for International (PCT) Patent Application No. PCT/US13/55589, mailed Feb. 26, 2015 8 pages.
International Preliminary Report on Patentability for International (PCT) Patent Application No. PCT/US2013/055289, mailed Feb. 26, 2015 8 pages.
International Preliminary Report on Patentability for International (PCT) Patent Application No. PCT/US2013/055288, mailed Feb. 26, 2015 10 pages.
International Preliminary Report on Patentability for International (PCT) Patent Application No. PCT/US2013/055286, mailed Feb. 26, 2015 8 pages.
International Preliminary Report for International (PCT) Patent Application No. PCT/US2013/055284, mailed Feb. 26, 2015 9 pages.
International Preliminary Report for International (PCT) Patent Application No. PCT/US2013/055293, mailed Feb. 26, 2015 12 pages.
International Preliminary Report on Patentability for International (PCT) Patent Application No. PCT/US2013/055294, mailed Feb. 26, 2015 10 pages.
International Preliminary Report on Patentability for International (PCT) Patent Application No. PCT/US13/55493, mailed Feb. 26, 2015 8 pages.
International Preliminary Report on Patentability for International (PCT) Patent Application No. PCT/US2013/036828, mailed Feb. 26, 2015 12 pages.
International Preliminary Report on Patentability for International (PCT) Patent Application No. PCT/US2013/055340, mailed Feb. 26, 2015 8 pages.
International Preliminary Report on Patentability for International (PCT) Patent Application No. PCT/US13/055551, mailed Feb. 26, 2015 6 pages.
International Preliminary Report on Patentability for International (PCT) Patent Application No. PCT/US13/55592, mailed Feb. 26, 2015 10 pages.
International Preliminary Report on Patentability for International (PCT) Patent Application No. PCT/US2013/036819, mailed Feb. 26, 2015 8 pages.
International Preliminary Report on Patentability for International (PCT) Patent Application No. PCT/US2013/036782, mailed Feb. 26, 2015 8 pages.
International Preliminary Report on Patentability for International (PCT) Patent Application No. PCT/US13/36678, mailed Feb. 26, 2015 8 pages.
International Preliminary Report on Patentability for International (PCT) Patent Application No. PCT/US2013/036804, mailed Feb. 26, 2015 12 pages.
International Preliminary Report on Patentability for International (PCT) Patent Application No. PCT/US13/55405, mailed Feb. 26, 2015 8 pages.
International Preliminary Report on Patentability for International (PCT) Patent Application No. PCT/US2013/055278, mailed Feb. 26, 2015 8 pages.
International Preliminary Report on Patentability for International (PCT) Patent Application No. PCT/US13/55509, mailed Feb. 26, 2015 8 pages.
International Preliminary Report on Patentability for International (PCT) Patent Application No. PCT/US2013/055303, mailed Feb. 26, 2015 7 pages.
International Preliminary Report for International (PCT) Patent Application No. PCT/US2013/055383, mailed Apr. 2, 2015 8 pages.
International Preliminary Report for International (PCT) Patent Application No. PCT/US2013/055344, mailed Apr. 2, 2015 7 pages.
International Preliminary Report for International (PCT) Patent Application No. PCT/US2013/055389, mailed Apr. 2, 2015 9 pages.
International Preliminary Report for International (PCT) Patent Application No. PCT/US2013/055283, mailed Apr. 2, 2015 6 pages.
International Preliminary Report for International (PCT) Patent Application No. PCT/US2013/055564, mailed Apr. 2, 2015 6 pages.
International Preliminary Report for International (PCT) Patent Application No. PCT/US2013/055379, mailed Apr. 2, 2015 8 pages.
International Preliminary Report for International (PCT) Patent Application No. PCT/US2013/055349, mailed Apr. 2, 2015 7 pages.
International Preliminary Report for International (PCT) Patent Application No. PCT/US2013/055298, mailed Feb. 26, 2015 7 pages.
International Preliminary Report on Patentability for International (PCT) Patent Application No. PCT/US13/55567, mailed Feb. 26, 2015 9 pages.
International Preliminary Report on Patentability for International (PCT) Patent Application No. PCT/US13/55570, mailed Feb. 26, 2015 7 pages.
Official Action for U.S. Appl. No. 13/969,880, mailed Mar. 27, 2015 14 pages.
Notice of Allowance for U.S. Appl. No. 13/969,884, mailed Mar. 24, 2015 16 pages.
Official Action for U.S. Appl. No. 13/969,887, mailed Mar. 11, 2015 24 pages.
Official Action for U.S. Appl. No. 13/969,482, mailed Apr. 3, 2015 19 pages.
Official Action for U.S. Appl. No. 13/969,485, mailed Mar. 11, 2015 19 pages.

(56) References Cited

OTHER PUBLICATIONS

Corrected Notice of Allowance for U.S. Appl. No. 13/968,884, mailed Apr. 1, 2015 15 pages.
Official Action for U.S. Appl. No. 13/968,913, mailed Apr. 1, 2015 16 pages.
Official Action for U.S. Appl. No. 13/968,983, mailed Mar. 12, 2015 21 pages.
Official Action for U.S. Appl. No. 13/968,948, mailed Mar. 11, 2015 13 pages.
Official Action for U.S. Appl. No. 13/968,929, mailed Apr. 29, 2015 12 pages.
Official Action for U.S. Appl. No. 13/969,588, mailed Mar. 11, 2015 12 pages.
Notice of Allowance for U.S. Appl. No. 13/864,120, mailed Apr. 14, 2015 9 pages.
Official Action for U.S. Appl. No. 13/969,490, mailed Mar. 13, 2015 26 pages.
Official Action for U.S. Appl. No. 13/969,491, mailed Mar. 20, 2015 25 pages.
Official Action for U.S. Appl. No. 13/970,000, mailed Mar. 5, 2015 16 pages.
Official Action for U.S. Appl. No. 13/969,179, mailed Mar. 12, 2015 17 pages.
Official Action for U.S. Appl. No. 13/968,652, mailed Apr. 17, 2015 17 pages.
Official Action for U.S. Appl. No. 13/969,777, mailed Apr. 15, 2015 11 pages.
Official Action for U.S. Appl. No. 13/968,630, mailed Mar. 27, 2015 15 pages.
Official Action for U.S. Appl. No. 13/968,937, mailed Apr. 7, 2015 10 pages.
Official Action for U.S. Appl. No. 13/969,508, mailed Mar. 5, 2015 9 pages.

\* cited by examiner

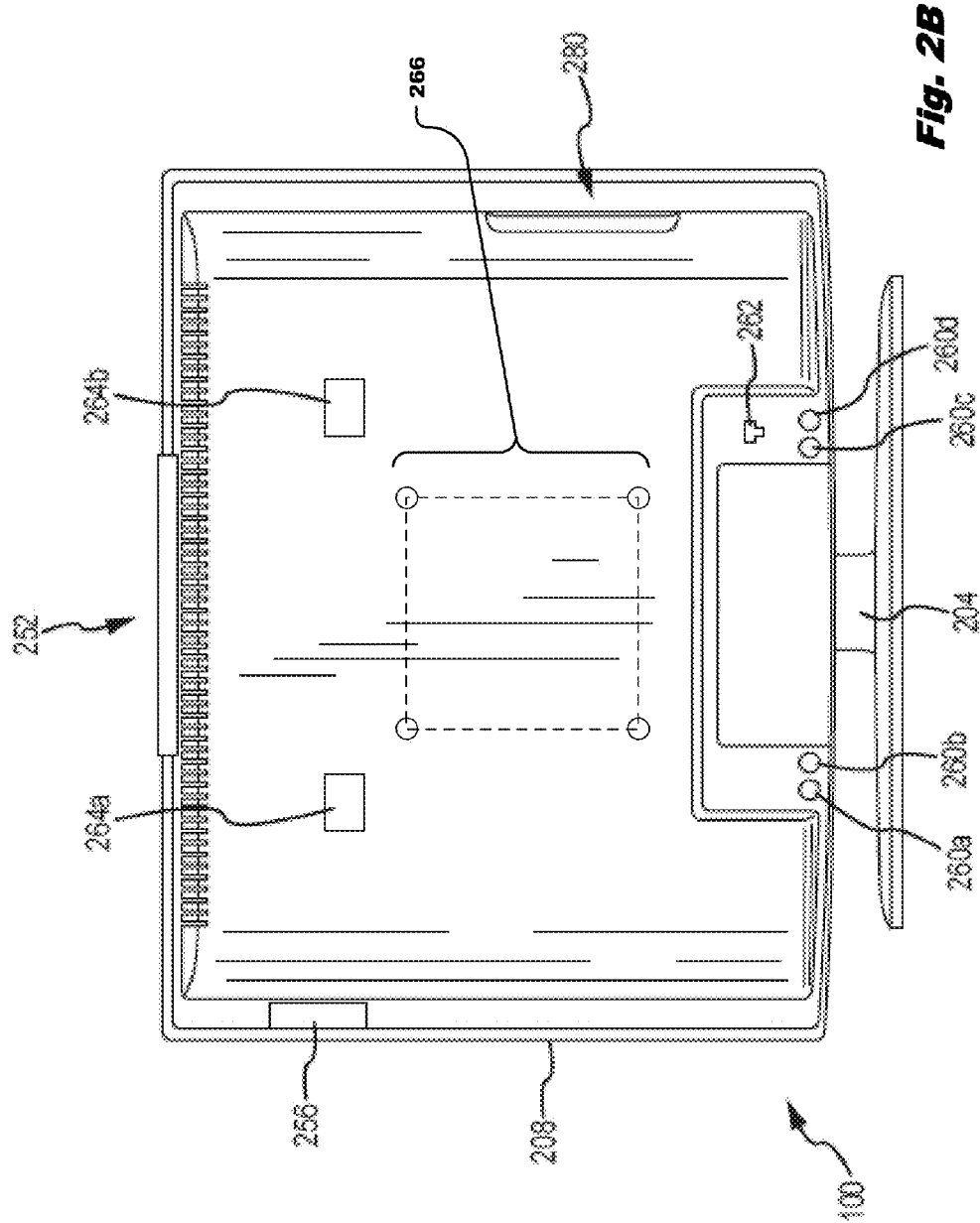

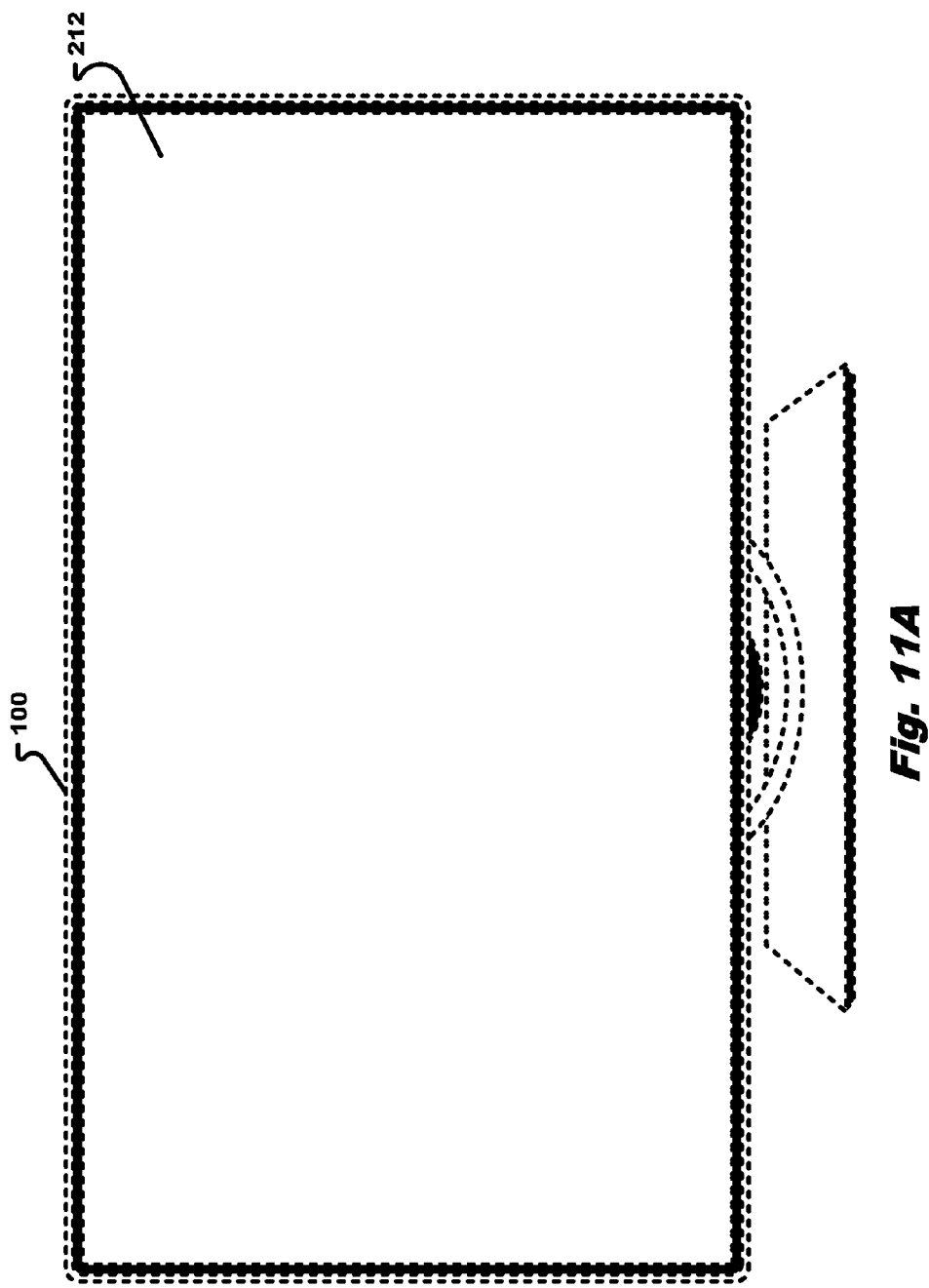

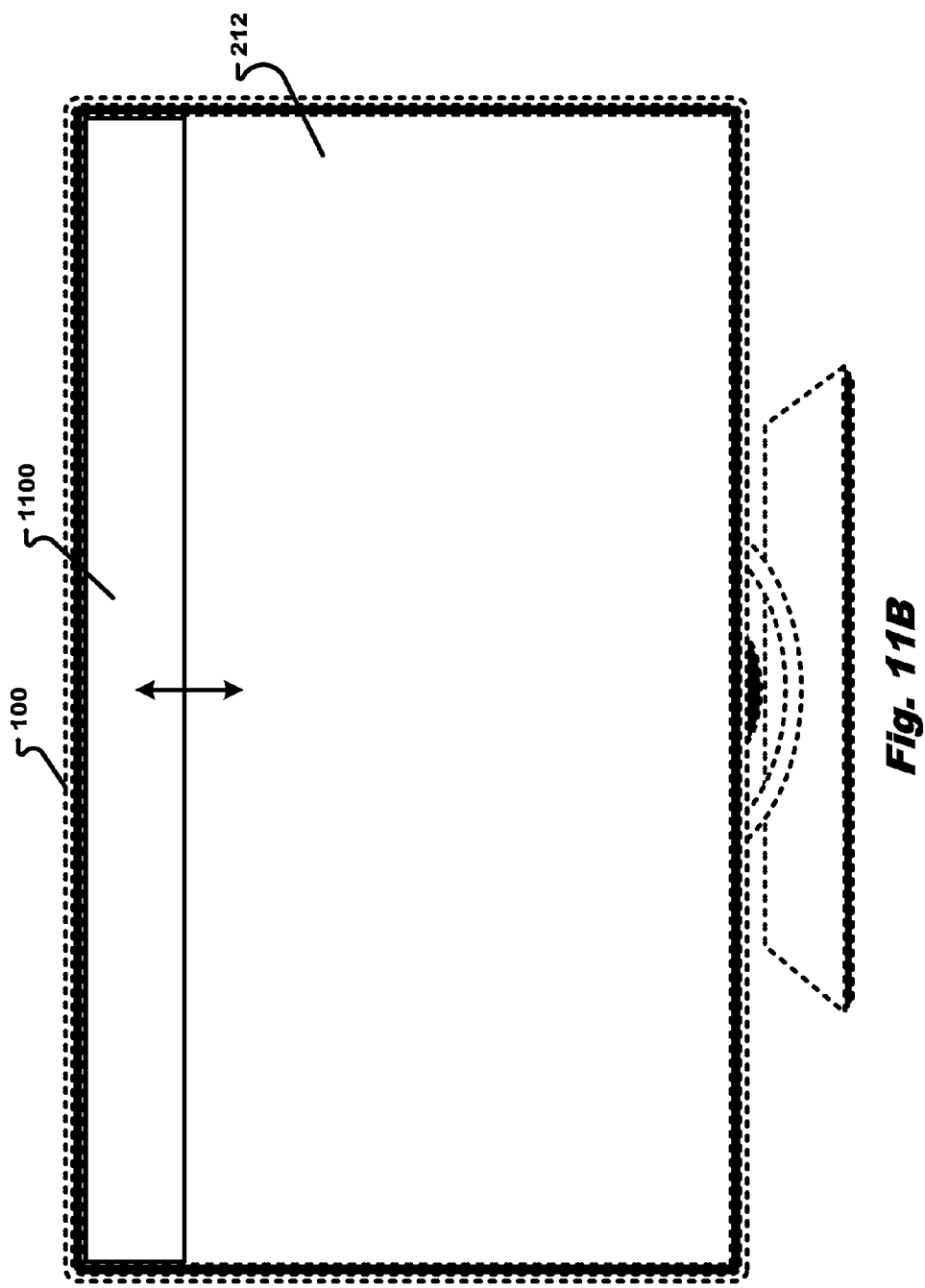

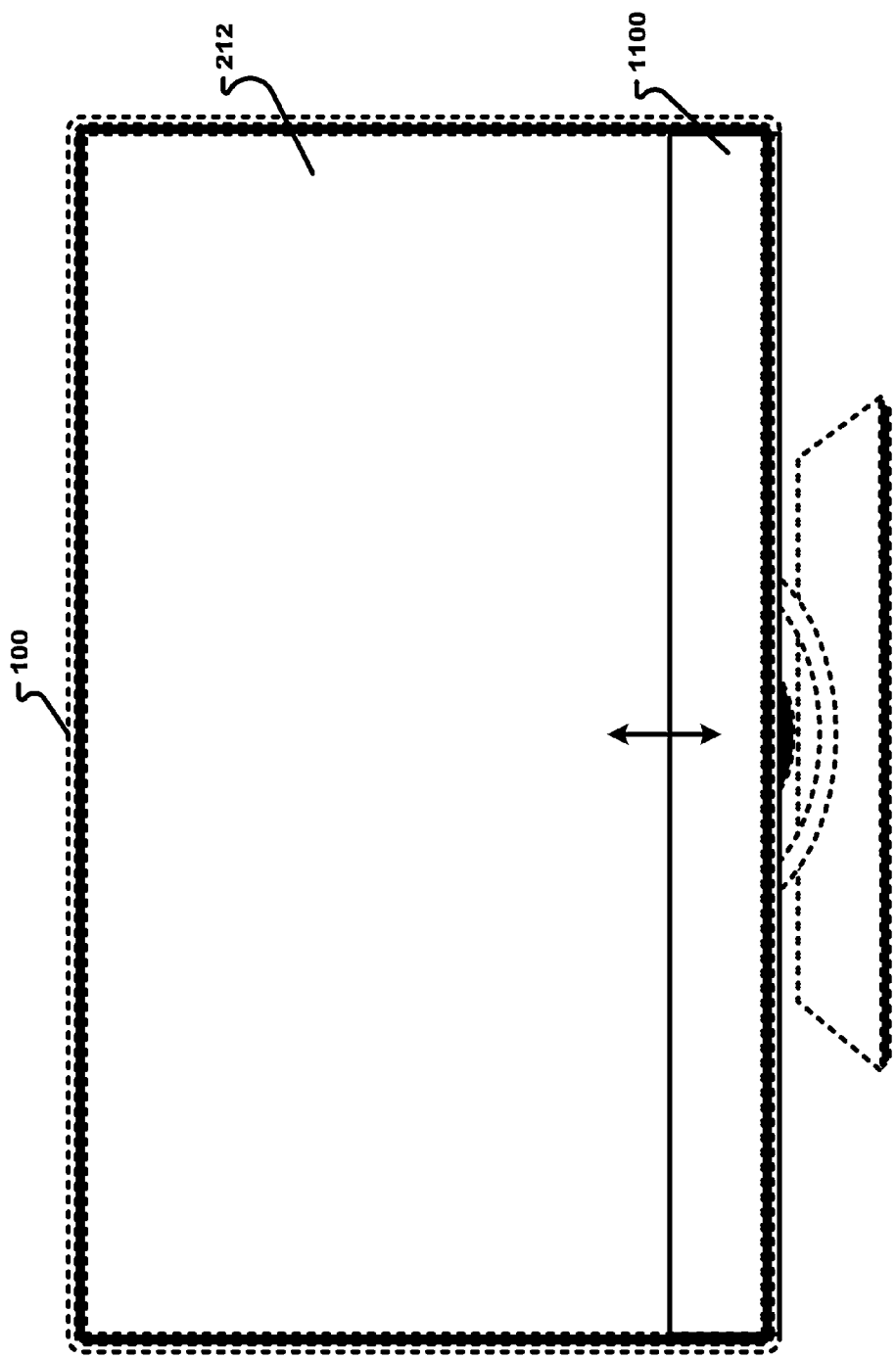

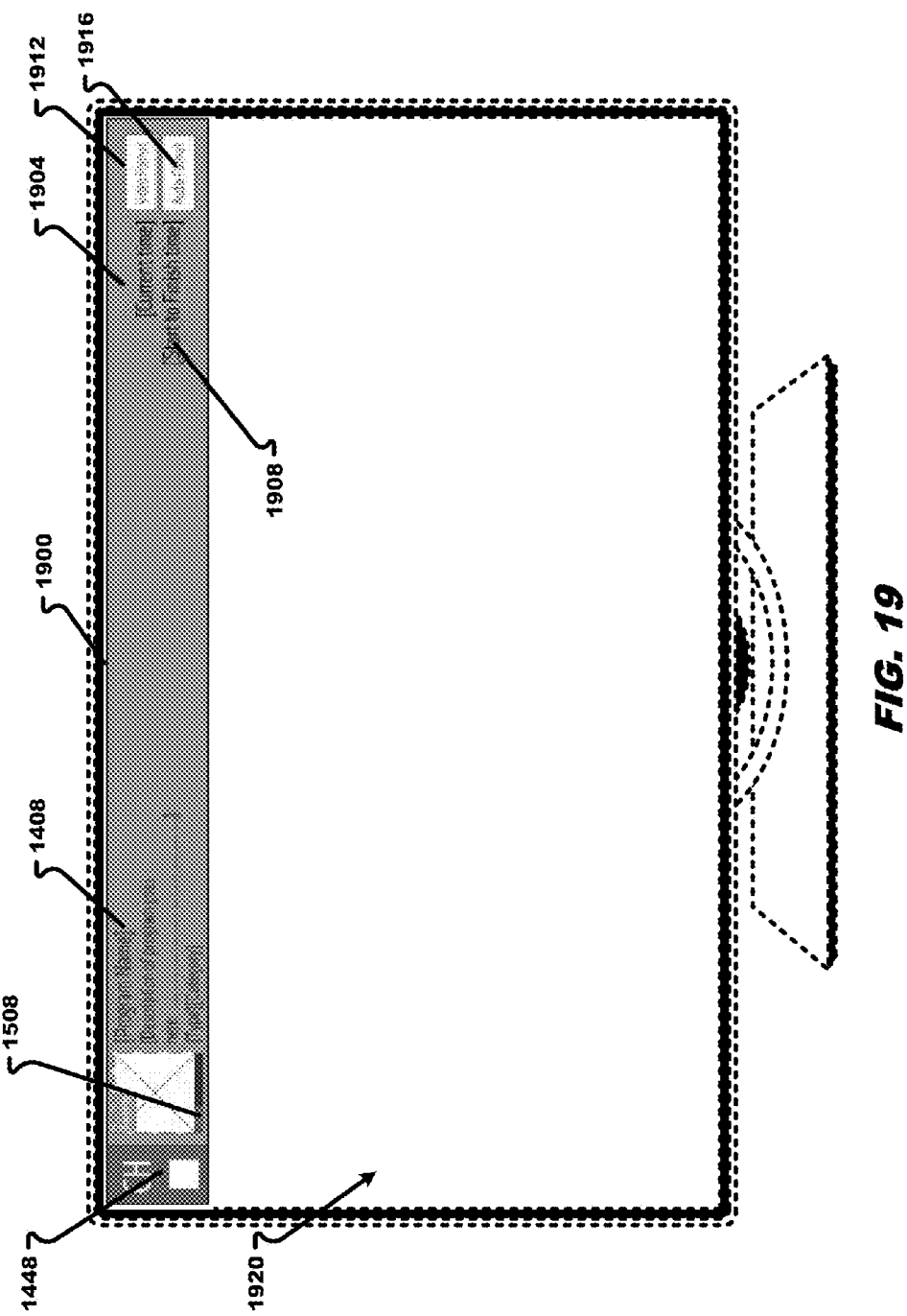

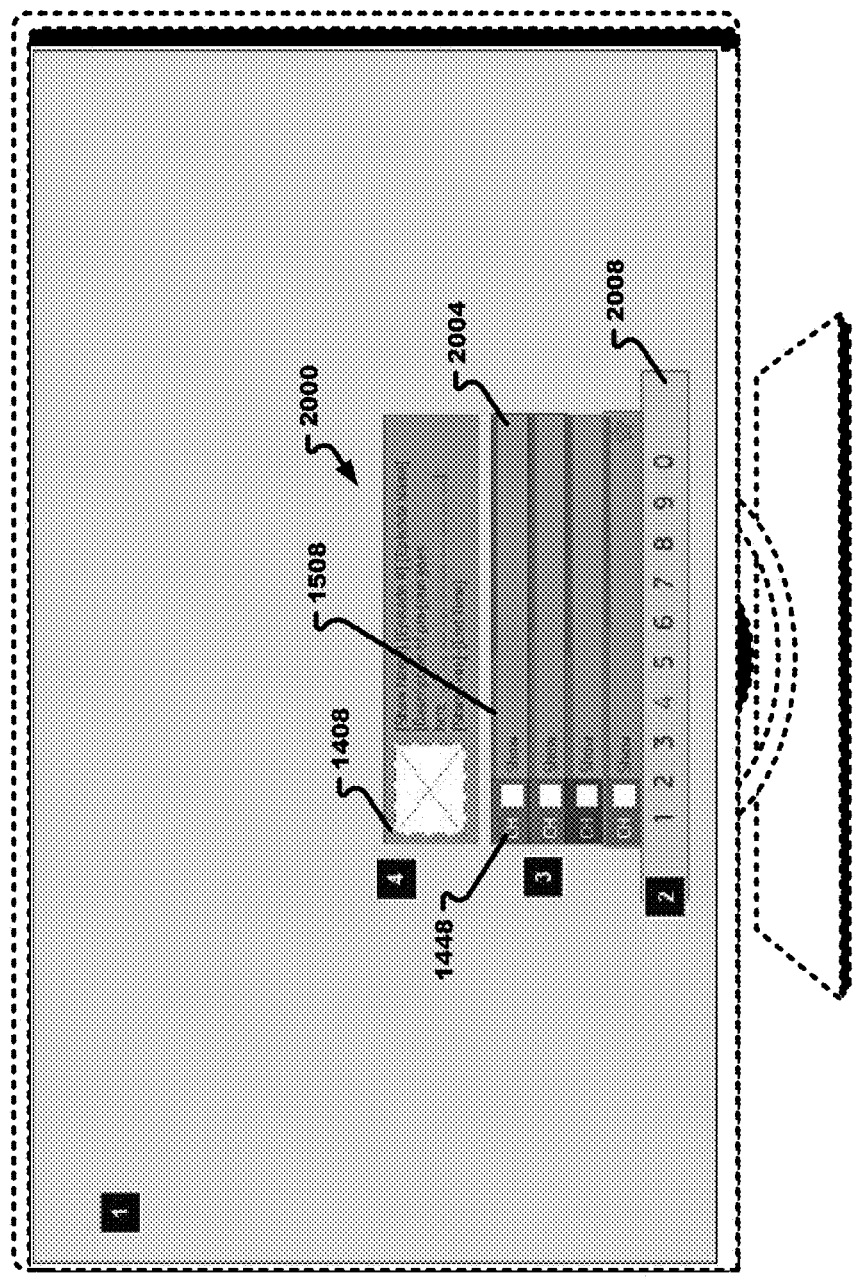

METHOD AND SYSTEM FOR LOCATING PROGRAMMING ON A TELEVISION

CROSS REFERENCE TO RELATED APPLICATION

The present application claims the benefits of and priority, under 35 U.S.C. §119(e), to U.S. Provisional Application Ser. Nos. 61/684,672 filed Aug. 17, 2012, "Smart TV"; 61/702,650 filed Sep. 18, 2012, "Smart TV"; 61/697,710 filed Sep. 6, 2012, "Social TV"; 61/700,182 filed Sep. 12, 2012, "Social TV Roadmap"; 61/736,692 filed Dec. 13, 2012, "SmartTV"; 61/798,821 filed Mar. 15, 2013, "SmartTV"; 61/804,942 filed Mar. 25, 2013, "SmartTV"; 61/804,998 filed Mar. 25, 2013, "SmartTV"; 61/804,971 filed Mar. 25, 2013, "SmartTV"; 61/804,990 filed Mar. 25, 2013, "SmartTV"; 61/805,003 filed Mar. 25, 2013, "SmartTV"; 61/805,053 filed Mar. 25, 2013, "SmartTV"; 61/805,030 filed Mar. 25, 2013, "SmartTV"; 61/805,027 filed Mar. 25, 2013, "SmartTV"; 61/805,042 filed Mar. 25, 2013, "SmartTV"; and 61/805,038 filed Mar. 25, 2013, "SmartTV." Each of the aforementioned documents is incorporated herein by reference in their entirety for all that they teach and for all purposes.

BACKGROUND

Consolidation of device features or technological convergence is in an increasing trend. Technological convergence describes the tendency for different technological systems to evolve toward performing similar tasks. As people use more devices, the need to carry those devices, charge those devices, update software on those devices, etc. becomes more cumbersome. To compensate for these problems, technology companies have been integrating features from different devices into one or two multi-functional devices. For example, cellular phones are now capable of accessing the Internet, taking photographs, providing calendar functions, etc.

The consolidation trend is now affecting the design and functionality of devices generally used in the home. For example, audio receivers can access the Internet, digital video recorders can store or provide access to digital photographs, etc. The television in home audio/video systems remains a cornerstone device because the display function cannot be integrated into other devices. As such, consolidating home devices leads to integrating features and functionality into the television. The emergence of the Smart Television (Smart TV) is evidence of the trend to consolidate functionality into the television.

A Smart TV is generally conceived as a device that integrates access to the Internet and Web 2.0 features into television sets. The Smart TV represents the trend of technological convergence between computers and television sets. The Smart TV generally focuses on online interactive media, Internet TV, on-demand streaming media, and generally does not focus on traditional broadcast media. Unfortunately, most Smart TVs have yet to provide seamless and intuitive user interfaces for navigating and/or executing the various features of the Smart TV. As such, there are still issues with the consolidation of features and the presentation of these features in Smart TVs.

SUMMARY

There is a need for an Intelligent TV with intuitive user interfaces and with seamless user interaction capability. These and other needs are addressed by the various aspects, embodiments, and/or configurations of the present disclosure. Also, while the disclosure is presented in terms of exemplary embodiments, it should be appreciated that individual aspects of the disclosure can be separately claimed.

A method is provided that can include the steps:

accessing, from a network accessible content provider, electronic program guide ("EPG") information, the EPG information comprising, for each program, airtime, program name, program channel, and program description;

displaying, by a microprocessor executable application framework and on a screen of a television, a search panel, the search panel comprising a search term field to receive a search term and previous set of search term(s) used by the user in a prior search, wherein selection of the previous set of search term(s) initiates a search of the EPG information using the previous set of search term(s) as one or more selected search term;

performing, by a microprocessor executable data service of a television, the search using a selected set of search terms, the selected set of search terms being received in the search term field or a selected previous set of search term(s);

obtaining, by the data service, a set of search results, the set of search results comprising EPG information corresponding to multiple channels and/or programs;

displaying, by the application framework, the search results on the television screen;

receiving, by the application framework and from a remote control of the user, a program selection from the displayed search results; and changing, by the application framework, a current channel to a channel broadcasting the program selection.

A television is provided that can include:

a television screen;

a local computer readable medium;

an infrared and/or radio frequency module configured to receive wirelessly input signals from a remote control of a user;

a microprocessor executable application platform configured to display, on the television screen, a search panel, the search panel comprising a search term field to receive a search term and a previous set of search terms used by the user in a prior search, wherein selection of the previous set of search terms initiates a search of the EPG information using the previous set of search terms as a selected set of search terms, to display search results on the television screen, to receive a program selection from the displayed search results, and to change a current channel to a channel airing the program selection; and a microprocessor executable data service configured to receive, from a network accessible content provider, electronic program guide ("EPG") information, the EPG information comprising, for each program, airtime, program name, program channel, and program description, to perform the search using selected set of search terms, the selected set of search terms being received in the search term field or a selected previous set of search terms, and to obtain a set of search results, the set of search results comprising EPG information corresponding to multiple channels and/or programs.

A tangible and non-transient computer readable medium is provided that includes microprocessor executable instructions that, when executed, are configured to perform operations that can include:

obtaining, from a network accessible content provider, electronic program guide ("EPG") information, the EPG information comprising, for each program, airtime, program name, program channel, and program description;

displaying, on a screen of a television, a search panel, the search panel comprising a search term field to receive a search term and a previous set of search terms used by the user in a prior search, wherein selection of the previous set of search terms initiates a search of the EPG information using the previous set of search terms as a selected set of search terms;

performing the search using a selected set of search terms, the selected set of search terms being received in the search term field or a selected previous set of search terms;

obtaining a set of search results, the set of search results comprising EPG information corresponding to multiple channels and/or programs;

displaying the set of search results on the television screen;

receiving, from a remote control of the user, a program selection from the displayed set of search results; and changing a current channel to a channel broadcasting the program selection.

When a search term is entered into the search term field, an existing set of search results can be cleared automatically and replaced by the obtained set of search results.

The displayed search results can list multiple programs.

Each search result can include an air time of the corresponding program, a name of the corresponding program, and a channel broadcasting the corresponding program.

When one of the multiple programs is in focus, a thumbnail preview can be displayed on the television screen with the displayed set of search results. The thumbnail preview corresponds to the in focus program. The thumbnail preview can include a graphical image and a program name, series name, episode number, episode name, and/or sport event name and a plurality of a program description, a program type, a program category, a start-to-finish time, current runtime, and a remaining runtime. The graphical image can be a captured frame of the in focus program, a picture associated with the in focus program, and a photograph associated with the in focus program.

The displayed set of search results can list multiple airings of a common program.

Each search result in the set of search results can include a respective air time of the common program, a name of the common program, and a respective channel broadcasting the common program. The displayed set of search results can be ordered by time.

The displayed set of search results can update in real time while the user fills in the search term field.

The user can, using the remote control, mark a channel and/or program as a favorite.

The set of user marked favorite channels and/or programs is commonly maintained in a local computer readable medium.

The programs described by the EPG programming information can be indexed by airtime, channel, category, and favorites.

The set of favorite channels and programs cannot be maintained in a remotely located computer readable medium.

The locally stored EPG information can include a favorite indicator to indicate that a corresponding channel or program is in the set of favorite channels and programs, a reminder indicator to indicate that a corresponding program has been set to trigger a reminder, a category indicator to indicate a category of the corresponding program, and a first air indicator to indicate that a corresponding program that is airing for the first time.

The program is typically one or more of a movie, an episode, sport event, and a television special.

In the displaying step/operation, the displayed search panel on the television screen can include a (live) view of currently selected programming, which is displayed on only a part of the screen.

The present disclosure can provide a number of advantages depending on the particular aspect, embodiment, and/or configuration. The search panel can provide a versatile and convenient interface to locate desired programming quickly and efficiently. Displaying prior sets of search terms can avoid the user needing to recall prior searches and type in the search terms again. The ability to mark favorite channels and programs can not only increase user convenience but also provide a quick interface to select channels. The ability of the user to select channels and programs through various mechanisms, such as an EPG listing indexed by airtime, channel, program title, or program category and favorites, can enable users to use the most suitable mechanism for his or her needs and preferences. The display of the graphical image provided by or derived from metadata associated with the programming can provide meaningful information without needing to wait for the channel change to be activated fully. This can improve the channel changing experience as all channels can show a full screen channel preview while tuning takes place. This can enable the user to flip quickly through channels to see what is on without needing to wait for the tuner to catch up.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

A "blog" (a blend of the term web log) is a type of website or part of a website supposed to be updated with new content from time to time. Blogs are usually maintained by an individual with regular entries of commentary, descriptions of events, or other material such as graphics or video. Entries are commonly displayed in reverse-chronological order.

A "blogging service" is a blog-publishing service that allows private or multi-user blogs with time-stamped entries.

The term "cable TV" refers to a system of distributing television programs to subscribers via radio frequency (RF) signals transmitted through coaxial cables or light pulses through fiber-optic cables. This contrasts with traditional broadcast television (terrestrial television) in which the television signal is transmitted over the air by radio waves and received by a television antenna attached to the television.

The term "channel" or "television channel," as used herein, can be a physical or virtual channel over which a television station or television network is distributed. A physical cannel in analog television can be an amount of bandwidth, typically 6, 7, or 8 MHz, that occupies a predetermine channel frequency. A virtual channel is a representation, in cable or satellite television, of a data stream for a particular television media provider (e.g., CDS, TNT, HBO, etc.).

The term "computer-readable medium," as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "enhanced television" (ETV) refers to a collection of specifications developed under the OpenCable project of CableLabs (Cable Television Laboratories, Inc.) that define an ETV Application consisting of resources (files) adhering to the Enhanced TV Binary Interchange Format (EBIF) content format as well as PNG images, JPEG images, and PFR downloadable fonts. An ETV application is normally delivered through an MPEG transport stream and accompanies an MPEG program containing video and audio elementary streams. An "ETV Application" is a collection of resources (files) that include one or more EBIF resources that represent viewable information in the form of pages. Two forms of a given ETV Application may be distinguished: (1) an interchange form and (2) an execution form. The interchange form of an ETV Application consists of the resources (files) that represent the compiled application prior to its actual execution by an ETV User Agent. The execution form of an ETV Application consists of the stored, and possibly mutated forms of these resources while being decoded, presented, and executed by an ETV User Agent. An "ETV User Agent" is a software component that operates on a set-top box, a television, or any other computing environment capable of receiving, decoding, presenting, and processing an ETV Application. This component usually provides, along with its host hardware environment, one or more mechanisms for an end-user to navigate and interact with the multimedia content represented by ETV Applications.

The term "high-definition television" (HDTV) provides a resolution that is substantially higher than that of standard-definition television. HDTV may be transmitted in various formats, namely 1080p—1920×1080p: 2,073,600 pixels (approximately 2.1 megapixels) per frame, 1080i (which is typically either 1920×1080i: 1,036,800 pixels (approximately 1 megapixel) per field or 2,073,600 pixels (approximately 2.1 megapixels) per frame or 1440×1080i:[1] 777,600 pixels (approximately 0.8 megapixels) per field or 1,555,200 pixels (approximately 1.6 megapixels) per frame), or 720p—1280× 720p: 921,600 pixels (approximately 0.9 megapixels) per frame. As will be appreciated, "frame size" in pixels is defined as number of horizontal pixels×number of vertical pixels, for example 1280×720 or 1920×1080. Often the number of horizontal pixels is implied from context and is omitted, as in the case of 720p and 1080p, "scanning system" is identified with the letter "p" for progressive scanning or "i" for interlaced scanning, and "frame rate" is identified as number of video frames per second. For interlaced systems an alternative form of specifying number of fields per second is often used. For purposes of this disclosure, "high-definition television" is deemed to include other high-definition analog or digital video formats, including ultra high definition television.

The term "internet television" (otherwise known as Internet TV, Online Television, or Online TV) is the digital distribution of television content via the Internet. It should not be confused with Web television—short programs or videos created by a wide variety of companies and individuals, or Internet protocol television (IPTV)—an emerging internet technology standard for use by television broadcasters. Internet Television is a general term that covers the delivery of television shows and other video content over the internet by video streaming technology, typically by major traditional television broadcasters. It does not describe a technology used to deliver content (see Internet protocol television). Internet television has become very popular through services such as RTÉ Player in Ireland; BBC iPlayer, 4oD, ITV Player (also STV Player and UTV Player) and Demand Five in the United Kingdom; Hulu in the United States; Nederland 24 in the Netherlands; ABC iview and Australia Live TV in Australia; Tivibu in Turkey; and iWanTV! in the Philippines.

The term "internet protocol television" (IPTV) refers to a system through which television services are delivered using the Internet protocol suite over a packet-switched network such as the Internet, instead of being delivered through traditional terrestrial, satellite signal, and cable television formats. IPTV services may be classified into three main groups, namely live television, with or without interactivity related to the current TV show; time-shifted television: catch-up TV (replays a TV show that was broadcast hours or days ago), start-over TV (replays the current TV show from its beginning); and video on demand (VOD): browse a catalog of videos, not related to TV programming. IPTV is distinguished from Internet television by its on-going standardization process (e.g., European Telecommunications Standards Institute) and preferential deployment scenarios in subscriber-based telecommunications networks with high-speed access channels into end-user premises via set-top boxes or other customer-premises equipment.

The term "silo," as used herein, can be a logical representation of an input, source, or application. An input can be a device or devices (e.g., DVD, VCR, etc.) electrically connected to the television through a port (e.g., HDMI, video/audio inputs, etc.) or through a network (e.g., LAN WAN, etc.). Rather than a device or devices, the input could be configured as an electrical or physical connection to one or more devices. A source, particularly a content source, can be a data service that provides content (e.g., a media center, a file system, etc.). An application can be a software service that provides a particular type of function (e.g., Live TV, Video on Demand, User Applications, photograph display, etc.). The silo, as a logical representation, can have an associated definition or property, such as a setting, feature, or other characteristic.

The term "panel," as used herein, can mean a user interface displayed in at least a portion of the display. The panel may be interactive (e.g., accepts user input) or informational (e.g., does not accept user input). A panel may be translucent whereby the panel obscures but does not mask the underlying content being displayed in the display. Panels may be provided in response to a user input from a button or remote control interface.

The term "screen," as used herein, refers to a physical structure that includes one or more hardware components that provide the device with the ability to render a user interface and/or receive user input. A screen can encompass any combination of gesture capture region, a touch sensitive display, and/or a configurable area. The device can have one or more physical screens embedded in the hardware. However a screen may also include an external peripheral device that may be attached and detached from the device. In embodiments, multiple external devices may be attached to the device. For example, another screen may be included with a remote control unit that interfaces with the Intelligent TV.

The term "media" of "multimedia," as used herein, refers to content that may assume one of a combination of different content forms. Multimedia can include one or more of, but is not limited to, text, audio, still images, animation, video, or interactivity content forms.

The term "Intelligent TV," as used herein, refers to a television configured to provide one or more intuitive user interfaces and interactions based on a unique application platform and architecture. The Intelligent TV utilizes processing resources associated with the television to integrate Internet connectivity with parallel application functionality. This integration allows a user the ability to intuitively access various sources of media and content (e.g., Internet, over-the-top content, on-demand streaming media, over-the-air broadcast media, and/or other forms of information) via the Intelligent TV in a quick and efficient manner. Although the Intelligent TV disclosed herein may comprise one or more components of a "smart TV," it is an aspect of the Intelligent TV to provide expanded intuitive user interaction capability for navigating and executing the various features of the television. A "smart TV," sometimes referred to as a connected TV, or hybrid TV (not to be confused with IPTV, Internet TV, or with Web TV), describes a trend of integration of the Internet and Web 2.0 features into television sets and set-top boxes, as well as the technological convergence between computers and these television sets/set-top boxes. The smart TV devices have a higher focus on online interactive media, Internet TV, over-the-top content, as well as on-demand streaming media, and less focus on traditional broadcast media than traditional television sets and set-top boxes. As can be appreciated, the Intelligent TV encompasses a broader range of technology than that of the smart TV defined above.

The term "television" is a telecommunication medium, device (or set) or set of associated devices, programming, and/or transmission for transmitting and receiving moving images that can be monochrome (black-and-white) or colored, with or without accompanying sound. Different countries use one of the three main video standards for TVs, namely PAL, NTSC or SECAM. Television is most commonly used for displaying broadcast television signals. The broadcast television system is typically disseminated via radio transmissions on designated channels in the 54-890 MHz frequency band. A common television set comprises multiple internal electronic circuits, including those for receiving and decoding broadcast signals. A visual display device which lacks a tuner is properly called a video monitor, rather than a television. A television may be different from other monitors or displays based on the distance maintained between the user and the television when the user watches the media and based on the inclusion of a tuner or other electronic circuit to receive the broadcast television signal.

The term "Live TV," as used herein, refers to a television production broadcast in real-time, as events happen, in the present.

The term "standard-definition television" (SDTV) is a television system that uses a resolution that is not considered to be either high-definition television (HDTV 720p and 1080p) or enhanced-definition television (EDTV 480p). The two common SDTV signal types are 576i, with 576 interlaced lines of resolution, derived from the European-developed PAL and SECAM systems; and 480i based on the American National Television System Committee NTSC system. In the US, digital SDTV is broadcast in the same 4:3 aspect ratio as NTSC signals. However, in other parts of the world that used the PAL or SECAM analog standards, standard-definition television is now usually shown with a 16:9 aspect ratio. Standards that support digital SDTV broadcast include DVB, ATSC and ISDB. Television signals are transmitted in digital form, and their pixels have a rectangular shape, as opposed to square pixels that are used in modern computer monitors and modern implementations of HDTV. The table below summarizes pixel aspect ratios for various kinds of SDTV video signal. Note that the actual image (be it 4:3 or 16:9) is always contained in the center 704 horizontal pixels of the digital frame, regardless of how many horizontal pixels (704 or 720) are used. In case of digital video signal having 720 horizontal pixels, only the center 704 pixels contain actual 4:3 or 16:9 image, and the 8 pixel wide stripes from either side are called nominal analogue blanking and should be discarded before displaying the image. Nominal analogue blanking should not be confused with overscan, as overscan areas are part of the actual 4:3 or 16:9 image.

The term "video on demand (VOD)," as used herein, refers to systems and processes which allow users to select and watch/listen to video or audio content on demand. VOD systems may stream content, to view the content in real time, or download the content to a storage medium for viewing at a later time.

The term "satellite positioning system receiver" refers to a wireless receiver or transceiver to receive and/or send location signals from and/or to a satellite positioning system, such as the Global Positioning System ("GPS") (US), GLONASS (Russia), Galileo positioning system (EU), Compass navigation system (China), and Regional Navigational Satellite System (India).

The term "display," as used herein, refers to at least a portion of a screen used to display the output of the television to a user. A display may be a single-screen display or a multi-screen display, referred to as a composite display. A composite display can encompass the touch sensitive display of one or more screens. A single physical screen can include multiple displays that are managed as separate logical displays. Thus, different content can be displayed on the separate displays although part of the same physical screen.

The term "displayed image," as used herein, refers to an image produced on the display. A typical displayed image is a television broadcast or menu. The displayed image may occupy all or a portion of the display.

The term "display orientation," as used herein, refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical.

The term "module," as used herein, refers to any known or later developed hardware, software, firmware, artificial intelligence, fuzzy logic, or combination of hardware and software that is capable of performing the functionality associated with that element.

The terms "determine," "calculate" and "compute," and variations thereof, as used herein, are used interchangeably and include any type of methodology, process, mathematical operation or technique.

The term "touch screen" or "touchscreen" refer to screen that can receive user contact or other tactile input, such as a stylus. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "web television" is original television content produced for broadcast via the World Wide Web. Some major distributors of web television are YouTube, Myspace, Newgrounds, Blip.tv, and Crackle.

The terms "instant message" and "instant messaging" refer to a form of real-time text communication between two or more people, typically based on typed text.

The term "internet search engine" refers to a web search engine designed to search for information on the World Wide Web and FTP servers. The search results are generally presented in a list of results often referred to as SERPS, or "search engine results pages". The information may consist of web pages, images, information and other types of files. Some search engines also mine data available in databases or open directories. Web search engines work by storing information about many web pages, which they retrieve from the html itself. These pages are retrieved by a Web crawler (sometimes also known as a spider)—an automated Web browser which follows every link on the site. The contents of each page are then analyzed to determine how it should be indexed (for example, words are extracted from the titles, headings, or special fields called meta tags). Data about web pages are stored in an index database for use in later queries. Some search engines, such as Google™, store all or part of the source page (referred to as a cache) as well as information about the web pages, whereas others, such as AltaVista™, store every word of every page they find.

The terms "online community", "e-community", or "virtual community" mean a group of people that primarily interact via a computer network, rather than face to face, for social, professional, educational or other purposes. The interaction can use a variety of media formats, including wikis, blogs, chat rooms, Internet forums, instant messaging, email, and other forms of electronic media. Many media formats are used in social software separately or in combination, including text-based chatrooms and forums that use voice, video text or avatars.

The term "remote control" refers to a component of an electronics device, most commonly a television set, DVD player and/or home theater system for operating the device wirelessly, typically from a short line-of-sight distance. Remote control normally uses infrared and/or radio frequency (RF) signaling and can include WiFi, wireless USB, Bluetooth™ connectivity, motion sensor enabled capabilities and/or voice control. A touchscreen remote control is a handheld remote control device which uses a touchscreen user interface to replace most of the hard, built-in physical buttons used in normal remote control devices.

The term "satellite TV" refers to television programming delivered by the means of communications satellites and received by an outdoor antenna, usually a parabolic reflector generally referred to as a satellite dish, and as far as household usage is concerned, a satellite receiver either in the form of an external set-top box or a satellite tuner module built into a TV set.

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The term "social network" refers to a web-based social network.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "gesture capture" refers to a sense or otherwise a detection of an instance and/or type of user gesture. The gesture capture can occur in one or more areas of the screen. A gesture region can be on the display, where it may be referred to as a touch sensitive display or off the display where it may be referred to as a gesture capture area.

The term "electronic address" refers to any contactable address, including a telephone number, instant message handle, e-mail address, Universal Resource Locator (URL), Universal Resource Identifier (URI), Address of Record (AOR), electronic alias in a database, like addresses, and combinations thereof It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 2B includes a second view of an embodiment of a intelligent television;

FIG. 11A is a front view of an embodiment of an Intelligent TV screen;

FIG. 11B is a front view of an embodiment of an Intelligent TV screen;

FIG. 11C is a front view of an embodiment of an Intelligent TV screen;

FIG. 19 is a screen shot of the Intelligent TV screen according to according to an embodiment;

FIG. 20 is a screen shot of the Intelligent TV screen according to according to an embodiment;

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a device. The device can be a network-enabled telecommunications device, such as a television, an electronic visual display device, or other smart device. The device can include one or more screens, or sections of a screen, that are configured to receive and present information from a number of sources. Further, the device can receive user input in unique ways. The overall design and functionality of the device provides for an enhanced user experience making the device more useful and more efficient.

Figure 1A:
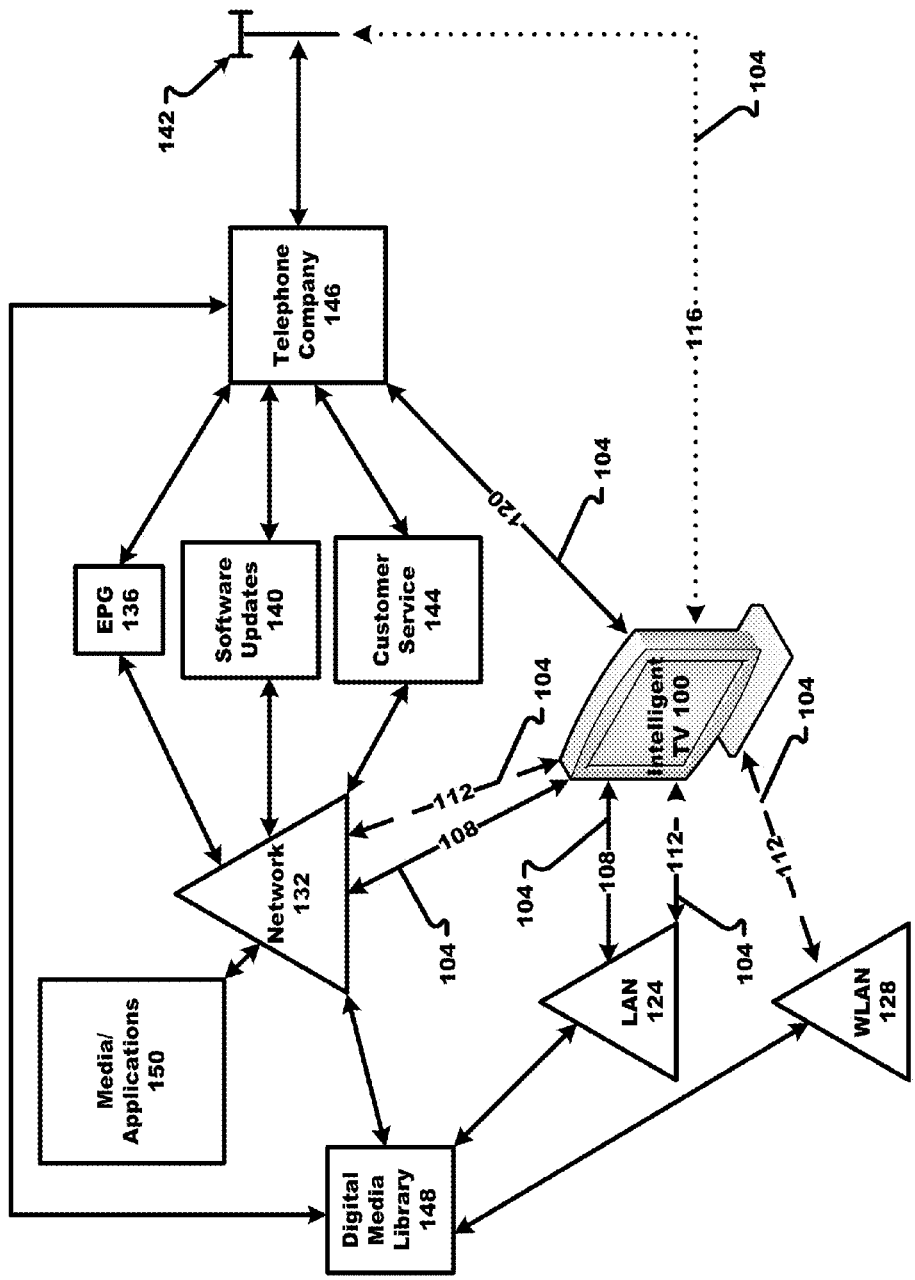
FIG. 1A includes a first view of an embodiment of an environment or a intelligent television.
Figure 1B:
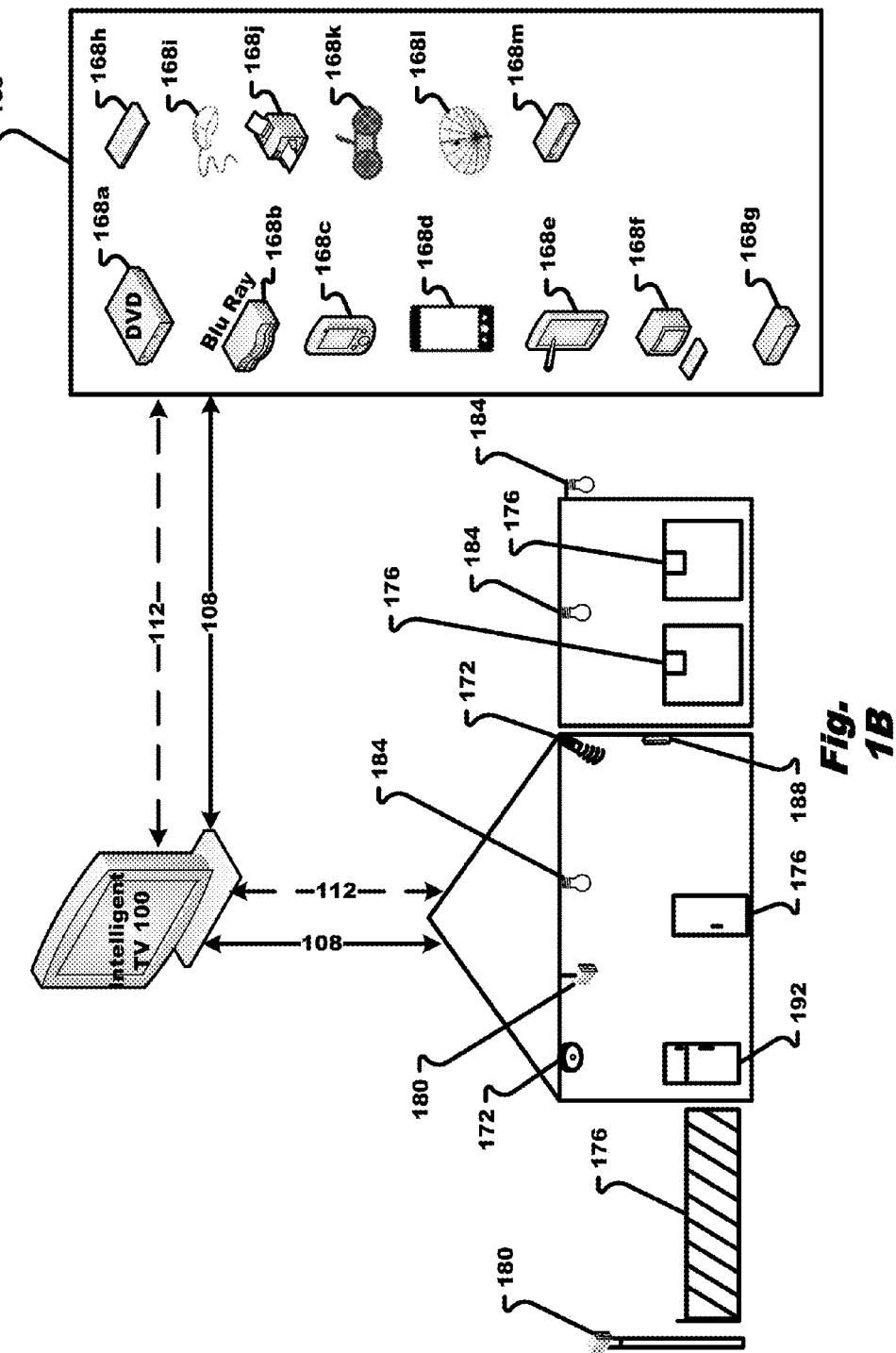
FIG. 1B includes a second view of an embodiment of an environment or a intelligent television.

Intelligent Television (TV) Environment:

Referring to FIGS. 1A and 1B, an Intelligent TV, or device, 100 is shown. It is anticipated that the Intelligent TV 100 may be used for entertainment, business applications, social interaction, content creation and/or consumption, and to organize and control one or more other devices that are in communication with the Intelligent TV 100. As can be appreciated, the Intelligent TV can be used to enhance the user interactive experience whether at home or at work.

In some embodiments, the Intelligent TV 100 may be configured to receive and understand a variety of user and/or device inputs. For example, a user may interface with the Intelligent TV 100 via one or more physical or electrical controls, such as buttons, switches, touch sensitive screens/regions (e.g., capacitive touch, resistive touch, etc.), and/or other controls associated with the Intelligent TV 100. In some cases, the Intelligent TV 100 may include the one or more interactive controls. Additionally or alternatively, the one or more controls may be associated with a remote control. The remote control may communicate with the Intelligent TV 100 via wired and/or wireless signals. As can be appreciated, the remote control may operate via radio frequency (RF), infrared (IR), and/or a specific wireless communications protocol (e.g., Bluetooth™, Wi-Fi, etc.). In some cases, the controls, whether physical or electrical, may be configured (e.g., programmed) to suit a user's preferences.

Additionally or alternatively, smart phones, tablets, computers, laptops, netbooks, and other smart devices may be used to control the Intelligent TV 100. For example, control of the Intelligent TV 100 may be achieved via an application running on a smart device. The application may be configured to present a user with various Intelligent TV 100 controls in an intuitive user interface (UI) on a screen associated with the device 100. The screen may be a touch sensitive, or touch screen, display. Selections input by a user via the UI may be configured to control the Intelligent TV 100 by the application accessing one or more communication features associated with the smart device.

It is anticipated that the Intelligent TV 100 can receive input via various input devices including, but in no way limited to, video, audio, radio, light, tactile, and combinations thereof. Among other things, these input devices may be configured to allow the Intelligent TV 100 to see, recognize, and react to user gestures. For instance, a user may talk to the Intelligent TV 100 in a conversational manner. The Intelligent TV 100 may hear and understand voice commands in a manner similar to a smart device's intelligent personal assistant and voice-controlled navigator application (e.g., Apple's Siri, Android's Skyvi, Robin, Iris, and other applications).

The Intelligent TV 100 may also be a communications device which can establish network connections 104 through many alternate means, including wired 108 or wireless 112 means, over cellular networks 116 to connect via cellular base antenna 142 to telephone networks operated by telephone company 146, and by using a telephone line 120 to connect to telephone networks operated by telephone company 146. These connections 104 enable the Intelligent TV 100 to access one or more communication networks 132. The communication networks may comprise any type of known communication medium or collection of communication media and may use any type of protocols to transport messages or signals between endpoints. The communication networks may include wired and/or wireless communication technologies. The Internet is an example of a communication network 132 that constitutes an Internet Protocol (IP) network consisting of many computers, computing networks, and other communication devices located all over the world, which are connected through many telephone systems and other means.

Other examples of the communication network 132 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 132 need not be limited to any one network type, and instead may be comprised of a number of different networks and/or network types.

In some embodiments, the Intelligent TV 100 may be equipped with multiple communication means. The multiple communication means may allow the Intelligent TV 100 to communicate across Local Area Networks (LANs) 124, wireless local area networks (WLANs) 128, and other networks 132. The networks 132 may be connected in a redundant manner to ensure network access. In other words, if one connection is interrupted, the intelligent TV 100 can use an alternate communications path to reestablish and/or maintain the network connection 104. Among other things, the Intelligent TV 100 may use these network connections 104 to send and receive information, interact with an electronic program guide (EPG) 136, receive software updates 140, contact customer service 144 (e.g., to receive help or service, etc.), and/or access remotely stored digital media libraries 148. In addition, these connections can allow the Intelligent TV 100 to make phone calls, send and/or receive email messages, send and/or receive text messages (such as email and instant messages), surf the Internet using an internet search engine, post blogs by a blogging service, and connect/interact with social media sites and/or an online community (e.g., Facebook™, Twitter, LinkedIn™, Pinterest™, GooglePlus™, MySpace™, and the like) maintained by a social network service. In combination with other components of the Intelligent TV 100 described in more detail below, these network connections 104 also enable the Intelligent TV 100 to conduct video teleconferences, electronic meetings, and other communications. The Intelligent TV 100 may capture and store images and sound, using associated cameras, microphones, and other sensors. Additionally or alternatively, the Intelligent TV 100 may create and save screen shots of media, images, and data displayed on a screen associated with the Intelligent TV 100.

Further, as shown in FIG. 1B, the Intelligent TV 100 can interact with other electronic devices 168 by either by the wired 108 and/or wireless 112 connections. As described herein, components of the Intelligent TV 100 allow the device 100 to be connected to devices 168 including, but not limited to, DVD players 168a, BluRay players 168b, portable digital media devices 168c, smart phones 168d, tablet devices 168e, personal computers 168f, external cable boxes 168g, keyboards 168h, pointing devices 168i, printers 168j, game controllers and/or game pads 168k, satellite dishes 168l, external display devices 168m, and other universal serial bus (USB), local area network (LAN), Bluetooth™, or high-definition multimedia interface (HDMI) compliant devices, and/or wireless devices. When connected to an external cable box 168g or satellite dish 168l, the Intelligent TV 100 can access additional media content. Also, as further described below, the Intelligent TV 100 is capable of receiving digital and/or analog signals broadcast by TV stations. The Intelligent TV 100 can be configured as one or more of a standard-definition television, enhanced television, and high-definition television. It may operate as one or more of cable, Internet, Internet Protocol, satellite, web, and/or smart television. The Intelligent TV 100 may also be used to control the operation of, and may interface with, other smart components such as security systems 172, door/gate controllers 176, remote video cameras 180, lighting systems 184, thermostats 188, refrigerators 192, and other appliances.

Figure 2A:
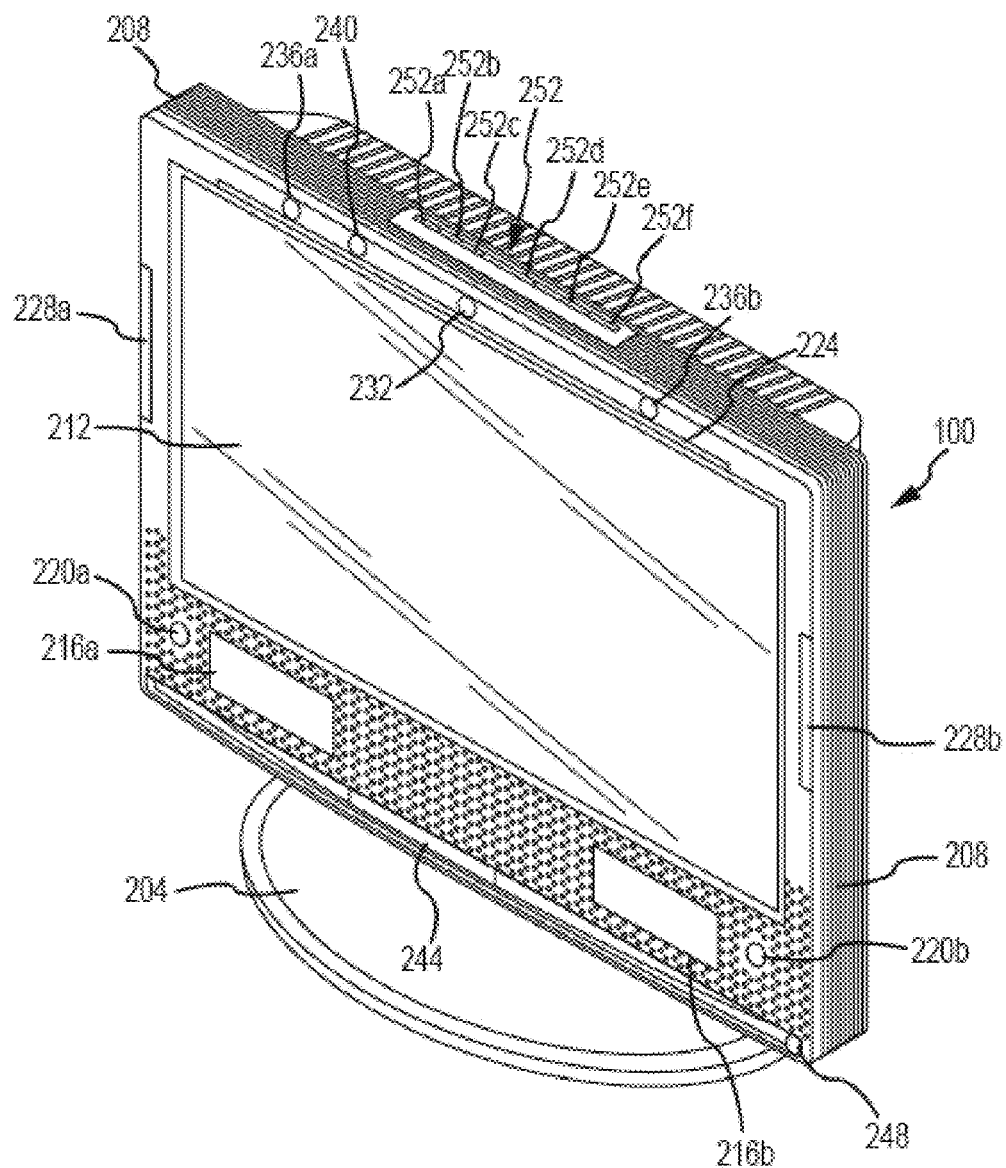
FIG. 2A includes a first view of an embodiment of a intelligent television.

Intelligent TV:

FIGS. 2A-2D illustrate components of the Intelligent TV 100. In general, as shown by FIG. 2A, the Intelligent TV 100 can be supported by a removable base or stand 204 that is attached to a frame 208. The frame 208 surrounds edges of a display screen 212, leaving a front surface of the display screen 212 uncovered. The display screen 212 may comprise a Liquid Crystal Display (LCD) screen, a plasma screen, Light Emitting Diode (LED) screen, or other screen types. In embodiments, the entire front surface of the screen 212 may be touch sensitive and capable of receiving input by the user touching the front surface of the screen 212.

The Intelligent TV 100 may include integrated speakers 216 and at least one microphone 220. A first area of the frame 208 may comprise a horizontal gesture capture region 224 and second areas comprise vertical gesture capture regions 228. The gesture capture regions 224, 228 may comprise areas or regions that are capable of receiving input by recognizing gestures made by the user, and in some examples, without the need for the user to actually touch the screen 212 surface of the Intelligent TV 100. However, the gesture capture regions 224, 228 may not include pixels that can perform a display function or capability.

One or more image capture devices 232, such as a camera, can be included for capturing still and/or video images. The image capture device 232 can include or be associated with additional elements, such as a flash or other light source 236 and a range finding device 240 to assist focusing of the image capture device. In addition, the microphone 220, gesture capture regions 224, 228, image capture devices 232, and the range finding device 240 may be used by the Intelligent TV 100 to recognize individual users. Additionally or alternatively, the Intelligent TV 100 may learn and remember preferences associated with the individual users. In some embodiments, the learning and remembering (i.e., identifying and recalling stored information) may be associated with the recognition of a user.

An IR transmitter and receiver 244 may also be provided to connect the Intelligent TV 100 with a remote control device (not shown) or other IR devices. Additionally or alternatively, the remote control device may transmit wireless signals via RF, light, and/or a means other than IR. Also shown in FIG. 2A is an audio jack 248, which may be hidden behind a panel that is hinged or removable. The audio jack 248 accommodates a tip, ring, sleeve (TRS) connector, for example, to allow the user to utilize headphones, a headset, or other external audio equipment.

The Intelligent TV 100 can also include a number of buttons 252. For example, FIG. 2A illustrates the buttons 252 on the top of the Intelligent TV 100, although the buttons could be placed at other locations. As shown, the Intelligent TV 100 includes six buttons 252a-f, which can be configured for specific inputs. For example, the first button 252a may be configured as an on/off button used to control overall system power to the Intelligent TV 100. The buttons 252 may be configured to, in combination or alone, control a number of aspects of the Intelligent TV 100. Some non-limiting examples include, but are not limited to, overall system volume, brightness, the image capture device, the microphone, and initiation/termination of a video conference. Instead of separate buttons, two of the buttons may be combined into a rocker button. This rocker button arrangement may be useful in situations where the buttons are configured to control features such as volume or brightness. In some embodiments, one or more of the buttons 252 are capable of supporting different user commands. By way of example, a normal press has a duration commonly of less than about 1 second and resembles a quick input. A medium press has a duration commonly of 1 second or more but less than about 12 seconds. A long press has a duration commonly of about 12 seconds or more. The function of the buttons is normally specific to the application that is active on the Intelligent TV 100. In the video conference application for instance and depending on the particular button, a normal, medium, or long press can mean end the video conference, increase or decrease the volume, increase a rate speed associated with a response to an input, and toggle microphone mute. Depending on the particular button, a normal, medium, or long press can also control the image capture device 232 to increase zoom, decrease zoom, take a photograph, or record video.

In support of communications functions or capabilities, the Intelligent TV 100 can include one or more shared or dedicated antennae 256 and wired broadband connections 260 as shown in FIG. 2B. The antennae 256 also enable the Intelligent TV 100 to receive digital and/or analog broadcast TV channels. The wired broadband connections 260 are, for example, a Digital Subscriber Line (DSL), an optical line, an Ethernet port, an IEEE 1394 interface, or other interfaces. The Intelligent TV 100 also has a telephone line jack 262 to further provide communications capability.

In addition to the removable base 204, the Intelligent TV 100 may include hardware and mounting points 264 on a rear surface to facilitate mounting the Intelligent TV 100 to a surface, such as a wall. In one example, the Intelligent TV 100 may incorporate at least one Video Equipment Standards Association (VESA) mounting interface for attaching the device 100 to the surface.

Figure 2C:
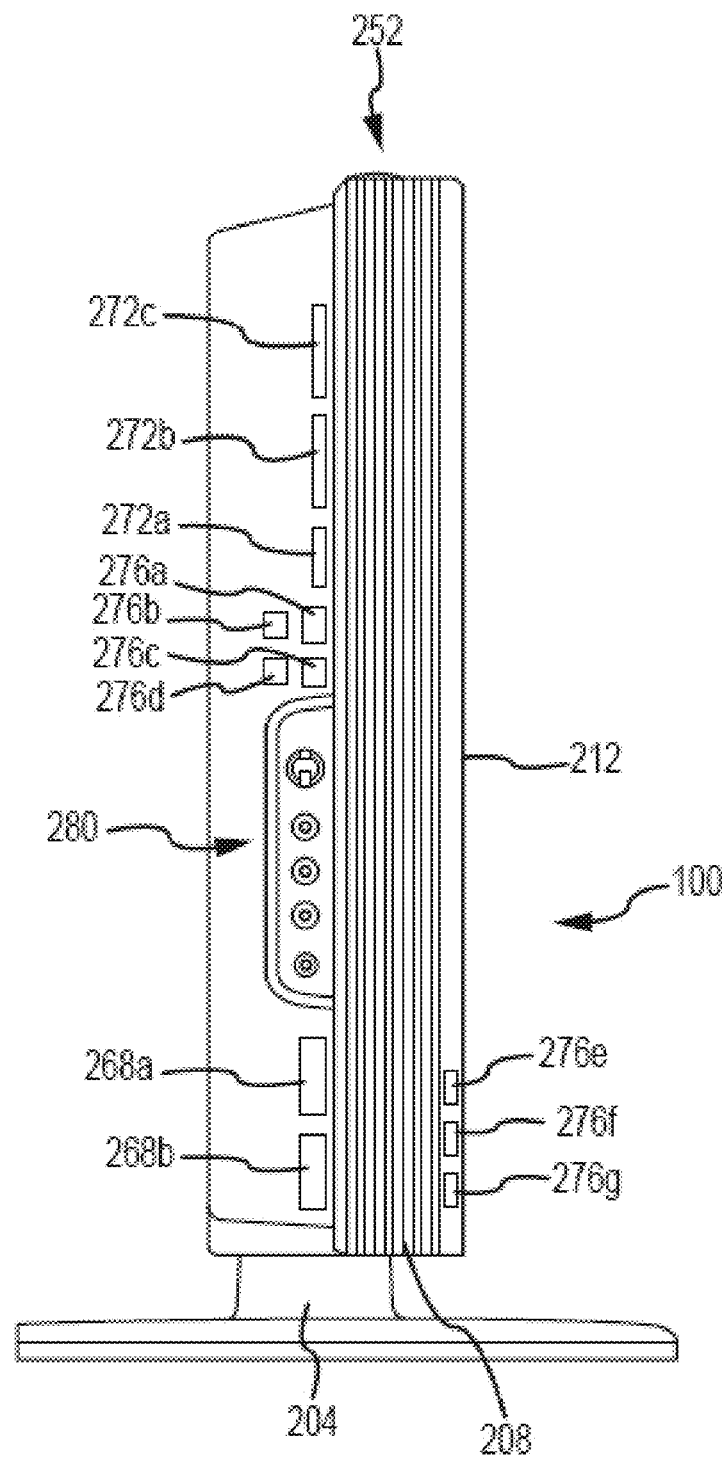
FIG. 2C includes a third view of an embodiment of a intelligent television.
Figure 2D:
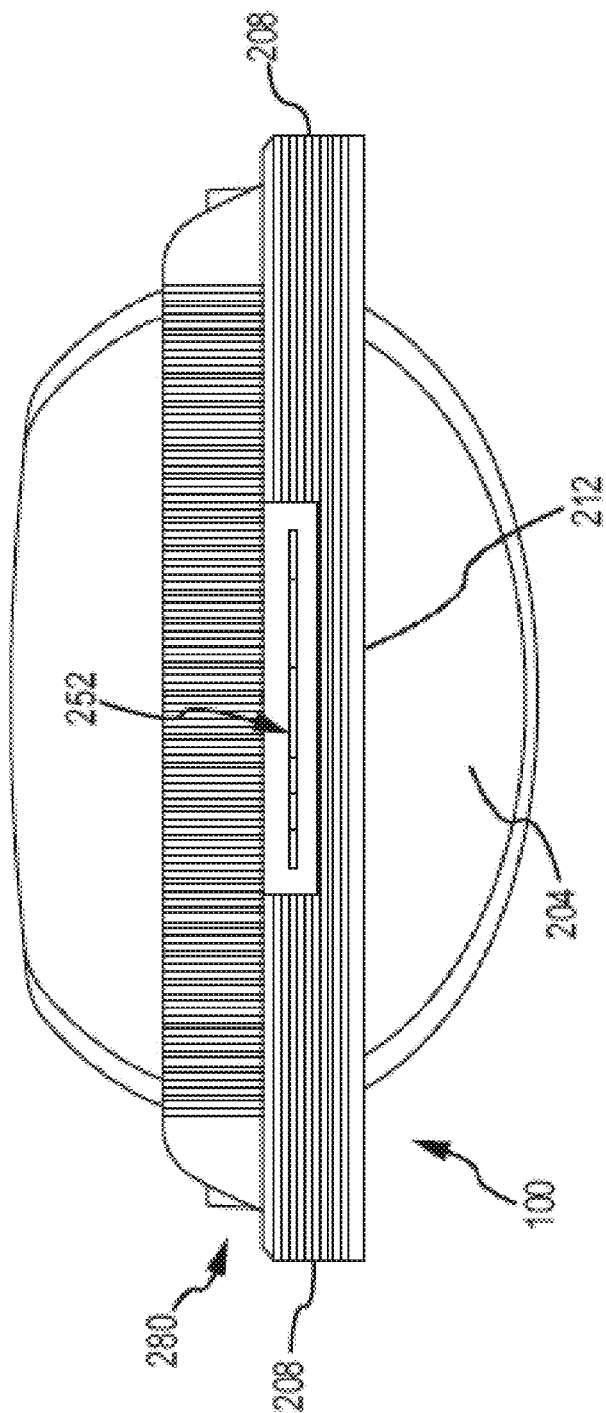
FIG. 2D includes a fourth view of an embodiment of a intelligent television.

As shown in FIG. 2C, the Intelligent TV 100 may include docking interfaces or ports 268. The docking ports 268 may include proprietary or universal ports to support the interconnection of the Intelligent TV 100 to other devices or components, which may or may not include additional or different capabilities from those integral to the Intelligent TV 100. In addition to supporting an exchange of communication signals between the Intelligent TV 100 and a connected device or component, the docking ports 268 can support the supply of power to the connected device or component. The docking ports 268 can also comprise an intelligent element that comprises a docking module for controlling communications or other interactions between the Intelligent TV 100 and the connected device or component.

The Intelligent TV 100 also includes a number of card slots 272 and network or peripheral interface ports 276. The card slots 272 may accommodate different types of cards including subscriber identity modules (SIM), secure digital (SD) cards, MiniSD cards, flash memory cards, and other cards. Ports 276 in embodiments may include input/output (I/O) ports, such as universal serial bus (USB) ports, parallel ports, game ports, and high-definition multimedia interface (HDMI) connectors.

An audio/video (A/V) I/O module 280 can be included to provide audio to an interconnected speaker or other device, and to receive audio input from a connected microphone or other device. As an example, the audio input/output interface 280 may comprise an associated amplifier and analog to digital converter.

Figure 3:
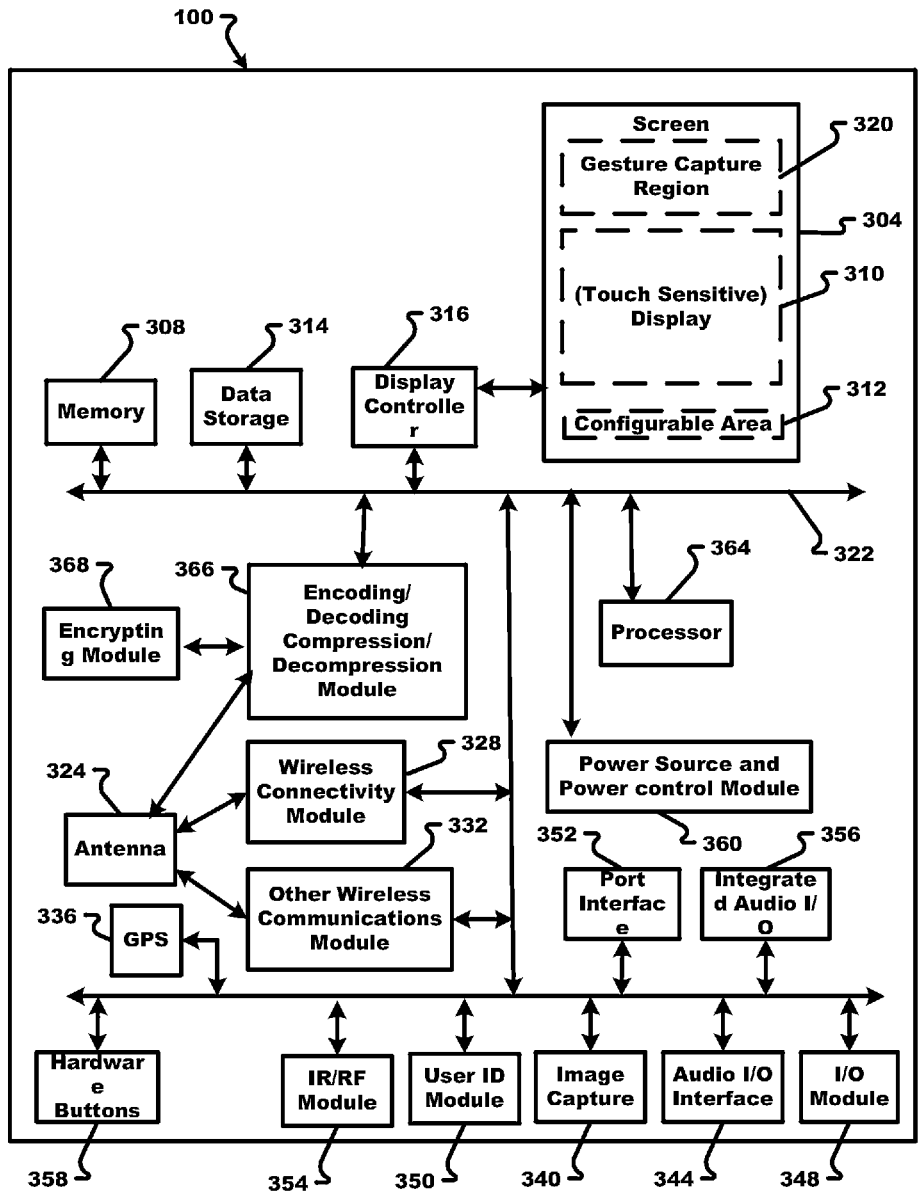
FIG. 3 is a block diagram of an embodiment of the hardware of the intelligent television.

Hardware Features:

FIG. 3 illustrates components of a Intelligent TV 100 in accordance with embodiments of the present disclosure. In general, the Intelligent TV 100 includes a primary screen 304. Screen 304 can be a touch sensitive screen and can include different operative areas.

For example, a first operative area, within the screen 304, may comprise a display 310. In some embodiments, the display 310 may be touch sensitive. In general, the display 310 may comprise a full color, display.

A second area within the screen 304 may comprise a gesture capture region 320. The gesture capture region 320 may comprise an area or region that is outside of the display 310 area, and that is capable of receiving input, for example in the form of gestures provided by a user. However, the gesture capture region 320 does not include pixels that can perform a display function or capability.

A third region of the screen 304 may comprise a configurable area 312. The configurable area 312 is capable of receiving input and has display or limited display capabilities. In embodiments, the configurable area 312 may present different input options to the user. For example, the configurable area 312 may display buttons or other relatable items. Moreover, the identity of displayed buttons, or whether any buttons are displayed at all within the configurable area 312 of a screen 304, may be determined from the context in which the Intelligent TV 100 is used and/or operated.

In an exemplary touch sensitive screen 304 embodiment, the touch sensitive screen 304 comprises a liquid crystal display extending across at least those regions of the touch sensitive screen 304 that are capable of providing visual output to a user, and a capacitive input matrix over those regions of the touch sensitive screen 304 that are capable of receiving input from the user.

One or more display controllers 316 may be provided for controlling the operation of the screen 304. The display controller 316 may control the operation of the touch sensitive screen 304, including input (touch sensing) and output (display) functions. The display controller 316 may also control the operation of the screen 304 and may interface with other inputs, such as infrared and/or radio input signals (e.g., door/gate controllers, alarm system components, etc.). In accordance with still other embodiments, the functions of a display controller 316 may be incorporated into other components, such as a processor 364.

The processor 364 may comprise a general purpose programmable processor or controller for executing application programming or instructions. In accordance with at least some embodiments, the processor 364 may include multiple processor cores, and/or implement multiple virtual processors. In accordance with still other embodiments, the processor 364 may include multiple physical processors. As a particular example, the processor 364 may comprise a specially configured application specific integrated circuit (ASIC) or other integrated circuit, a digital signal processor, a controller, a hardwired electronic or logic circuit, a programmable logic device or gate array, a special purpose computer, or the like. The processor 364 generally functions to run programming code or instructions implementing various functions of the Intelligent TV 100.

In support of connectivity functions or capabilities, the Intelligent TV 100 can include a module for encoding/decoding and/or compression/decompression 366 for receiving and managing digital television information. Encoding/decoding compression/decompression module 366 enables decompression and/or decoding of analog and/or digital information dispatched by a public television chain or in a private television network and received across antenna 324, I/O module 348, wireless connectivity module 328, and/or other wireless communications module 332. The television information may be sent to screen 304 and/or attached speakers receiving analog or digital reception signals. Any encoding/decoding and compression/decompression is performable on the basis of various formats (e.g., audio, video, and data). Encrypting module 368 is in communication with encoding/decoding compression/decompression module 366 and enables the confidentiality of all the data received or transmitted by the user or supplier.

In support of communications functions or capabilities, the Intelligent TV 100 can include a wireless connectivity module 328. As examples, the wireless connectivity module 328 can comprise a GSM, CDMA, FDMA and/or analog cellular telephony transceiver capable of supporting voice, multimedia and/or data transfers over a cellular network. Alternatively or in addition, the Intelligent TV 100 can include an additional or other wireless communications module 332. As examples, the other wireless communications module 332 can comprise a Wi-Fi, Blutooth™, WiMax, infrared, or other wireless communications link. The wireless connectivity module 328 and the other wireless communications module 332 can each be associated with a shared or a dedicated antenna 324 and a shared or dedicated I/O module 348.

An input/output module 348 and associated ports may be included to support communications over wired networks or links, for example with other communication devices, server devices, and/or peripheral devices. Examples of an input/output module 348 include an Ethernet port, a Universal Serial Bus (USB) port, Thunderbolt™ or Light Peak interface, Institute of Electrical and Electronics Engineers (IEEE) 1394 port, or other interface.

An audio input/output interface/device(s) 344 can be included to provide analog audio to an interconnected speaker or other device, and to receive analog audio input from a connected microphone or other device. As an example, the audio input/output interface/device(s) 344 may comprise an associated amplifier and analog-to-digital converter. Alternatively or in addition, the Intelligent TV 100 can include an integrated audio input/output device 356 and/or an audio jack for interconnecting an external speaker or microphone. For example, an integrated speaker and an integrated microphone can be provided, to support near talk or speaker phone operations.

A port interface 352 may be included. The port interface 352 may include proprietary or universal ports to support the interconnection of the device 100 to other devices or components, such as a dock, which may or may not include additional or different capabilities from those integral to the device 100. In addition to supporting an exchange of communication signals between the device 100 and another device or component, the docking port 136 and/or port interface 352 can support the supply of power to or from the device 100. The port interface 352 also comprises an intelligent element that comprises a docking module for controlling communications or other interactions between the Intelligent TV 100 and a connected device or component. The docking module may interface with software applications that allow for the remote control of other devices or components (e.g., media centers, media players, and computer systems).

An Intelligent TV 100 may also include memory 308 for use in connection with the execution of application programming or instructions by the processor 364, and for the temporary or long term storage of program instructions and/or data. As examples, the memory 308 may comprise RAM, DRAM, SDRAM, or other solid state memory. Alternatively or in addition, data storage 314 may be provided. Like the memory 308, the data storage 314 may comprise a solid state memory device or devices. Alternatively or in addition, the data storage 314 may comprise a hard disk drive or other random access memory.

Hardware buttons 358 can be included for example for use in connection with certain control operations. One or more image capture interfaces/devices 340, such as a camera, can be included for capturing still and/or video images. Alternatively or in addition, an image capture interface/device 340 can include a scanner, code reader, or motion sensor. An image capture interface/device 340 can include or be associated with additional elements, such as a flash or other light source. The image capture interfaces/devices 340 may interface with a user ID module 350 that assists in identifying users of the Intelligent TV 100.

The Intelligent TV 100 can also include a global positioning system (GPS) receiver 336. In accordance with embodiments of the present invention, the GPS receiver 336 may further comprise a GPS module that is capable of providing absolute location information to other components of the Intelligent TV 100. As will be appreciated, other satellite-positioning system receivers can be used in lieu of or in addition to GPS.

Power can be supplied to the components of the Intelligent TV 100 from a power source and/or power control module 360. The power control module 360 can, for example, include a battery, an AC to DC converter, power control logic, and/or ports for interconnecting the Intelligent TV 100 to an external source of power.

Communication between components of the Intelligent TV 100 is provided by bus 322. Bus 322 may comprise one or more physical buses for control, addressing, and/or data transmission. Bus 322 may be parallel, serial, a hybrid thereof, or other technology.

Figure 4:
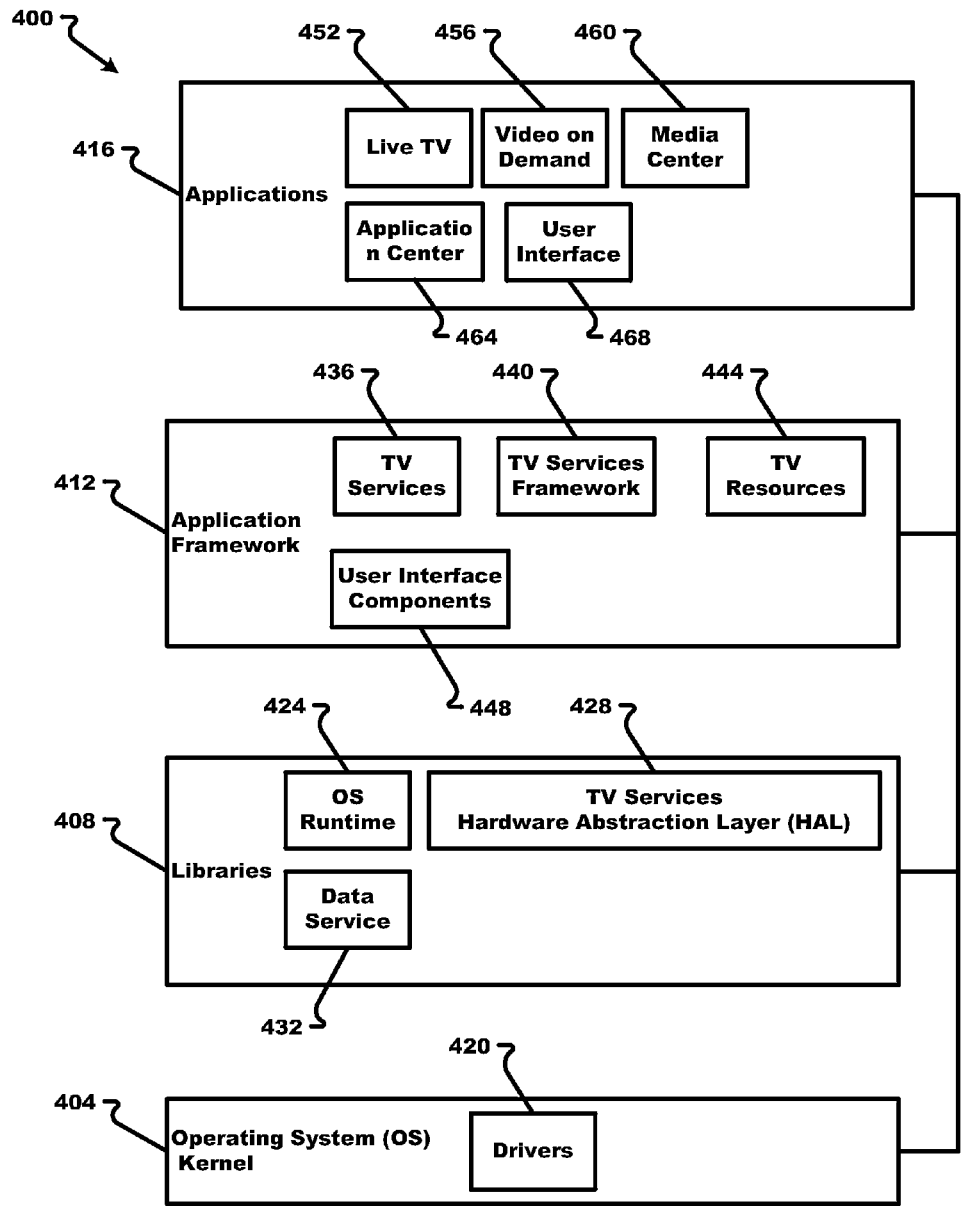
FIG. 4 is a block diagram of an embodiment of the intelligent television software and/or firmware.

Firmware and Software:

An embodiment of the software system components and modules 400 is shown in FIG. 4. The software system 400 may comprise one or more layers including, but not limited to, an operating system kernel 404, one or more libraries 408, an application framework 412, and one or more applications 416. The one or more layers 404-416 can communicate with each other to perform functions for the Intelligent TV 100.

An operating system (OS) kernel 404 contains the primary functions that allow the software to interact with hardware associated with the Intelligent TV 100. Kernel 404 can include a collection of software that manages the computer hardware resources and provides services for other computer programs or software code. The operating system kernel 404 is the main component of the operating system and acts as an intermediary between the applications and data processing done with the hardware components. Part of the operating system kernel 404 can include one or more device drivers 420. A device driver 420 can be any code within the operating system that helps operate or control a device or hardware attached to or associated with the Intelligent TV. The driver 420 can include code for operating video, audio, and/or other multimedia components of the Intelligent TV 100. Examples of drivers include display, camera, flash, binder (IPC), keypad, WiFi, and audio drivers.

Library 408 can contain code or other components that may be accessed and implemented during the operation of the software system 400. The library 408 may contain one or more of, but is not limited to, an operating system runtime library 424, a TV services hypertext application language (HAL) library 428, and/or a data service library 432. The OS runtime library 424 may contain the code required by the operating system kernel 404 or other operating system functions to be executed during the runtime of the software system 400. The library can include the code that is initiated during the running of the software system 400.

The TV services hypertext application language library 428 can include code required by TV services either executed in the application framework 412 or an application 416. The TV services HAL library 428 is specific to the Intelligent TV 100 operations that control different functions of the Intelligent TV. The TV service HAL library 428 can also be formed from other types of application languages or embodiments of different types of code or formats for code beyond the hypertext application language.

Figure 6:
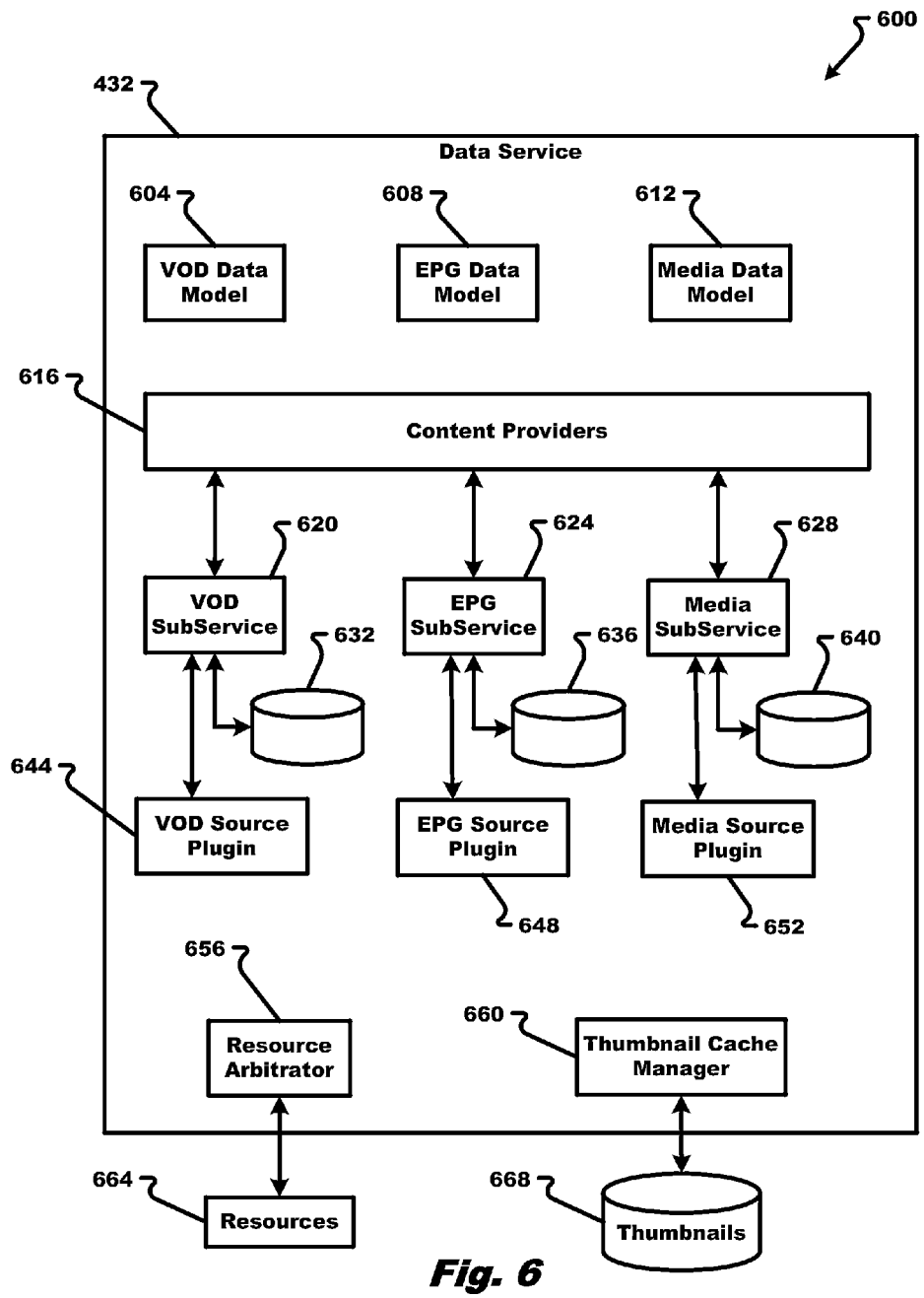
FIG. 6 is a third block diagram of an embodiment of the intelligent television software and/or firmware.

The data services library 432 can include the one or more components or codes to implement components for the data services function. The data services function can be implemented in the application framework 412 and/or applications layer 416. An embodiment of a function of the data services and the type of components that may be included is shown in FIG. 6.

The application framework 412 can include a general abstraction for providing functionality that can be selected by one or more application 416 to provide specific application functions or software for those applications. Thus, the framework 412 can include one or more different services, or other applications, that can be accessed by the applications 416 to provide general functions across two or more applications. Such functions include, for example, management of one or more of windows or panels, surfaces, activities, content, and resources, The application framework 412 can include one or more, but is not limited to, TV services 434, TV services framework 440, TV resources 444, and user interface component 448.

The TV services framework 440 can provide an additional abstraction for different TV services. TV services framework 440 allows for the general access and function of services that are associated with the TV functionality. The TV services 436 are general services provided within the TV services framework 440 that can be accessed by applications in the applications layer 416. The TV resources 444 provide code for accessing TV resources 444 including any types of storage, video, audio, or other functionality provided with the Intelligent TV 100. The TV resources 444, TV services 436, and TV services framework 440 provide for the different implementations of TV functionality that may occur with the Intelligent TV 100.

One or more user interface components 448 can provide general components for display of the Intelligent TV 100. The user interface components 448 might be general components that may be accessed by different applications provided in the application framework 412. The user interface components 448 may be accessed to provide for panels and silos as described in conjunction with FIG. 5.

The applications layer 416 can both contain and execute applications associated with the Intelligent TV 100. Applications layer 416 may include one or more of, but is not limited to, a live TV application 452, a video on demand application 456, a media center application 460, an application center application 464, and a user interface application 468. The live TV application 452 can provide live TV over different signal sources. For example, the live TV application, 452, can provide TV from input from cable television, over air broadcasts, from satellite services, or other types of live TV services. Live TV application 452 may then present the multimedia presentation or video and audio presentation of the live television signal over the display of the Intelligent TV 100.

The video on demand application 456 can provide for video from different storage sources. Unlike Live TV application 452, video on demand 456 provides for display of videos that are accessed from some memory source. The sources of the video on demand can be associated with users or with the Intelligent TV or some other type of service. For example, the video on demand 456 may be provided from an iTunes library stored in a cloud, from a local disc storage that contains stored video programs, or from some other source.

The media center application 460 can provide application for different types of media presentation. For example, the media center 460 can provide for displaying pictures or audio that is different from, but still accessible by the user and different from live TV or video on demand. The media center 460 allows for the access of different sources to obtain the media in the display of such media on the Intelligent TV 100.

The application center 464 allows for the provision, storage and use of applications. An application can be a game, a productivity application, or some other application generally associated with computer systems or other devices, but may be operated within the Intelligent TV. An application center 464 may obtain these applications from different sources, store them locally and then execute those types of applications for the user on the Intelligent TV 100.

Figure 5:
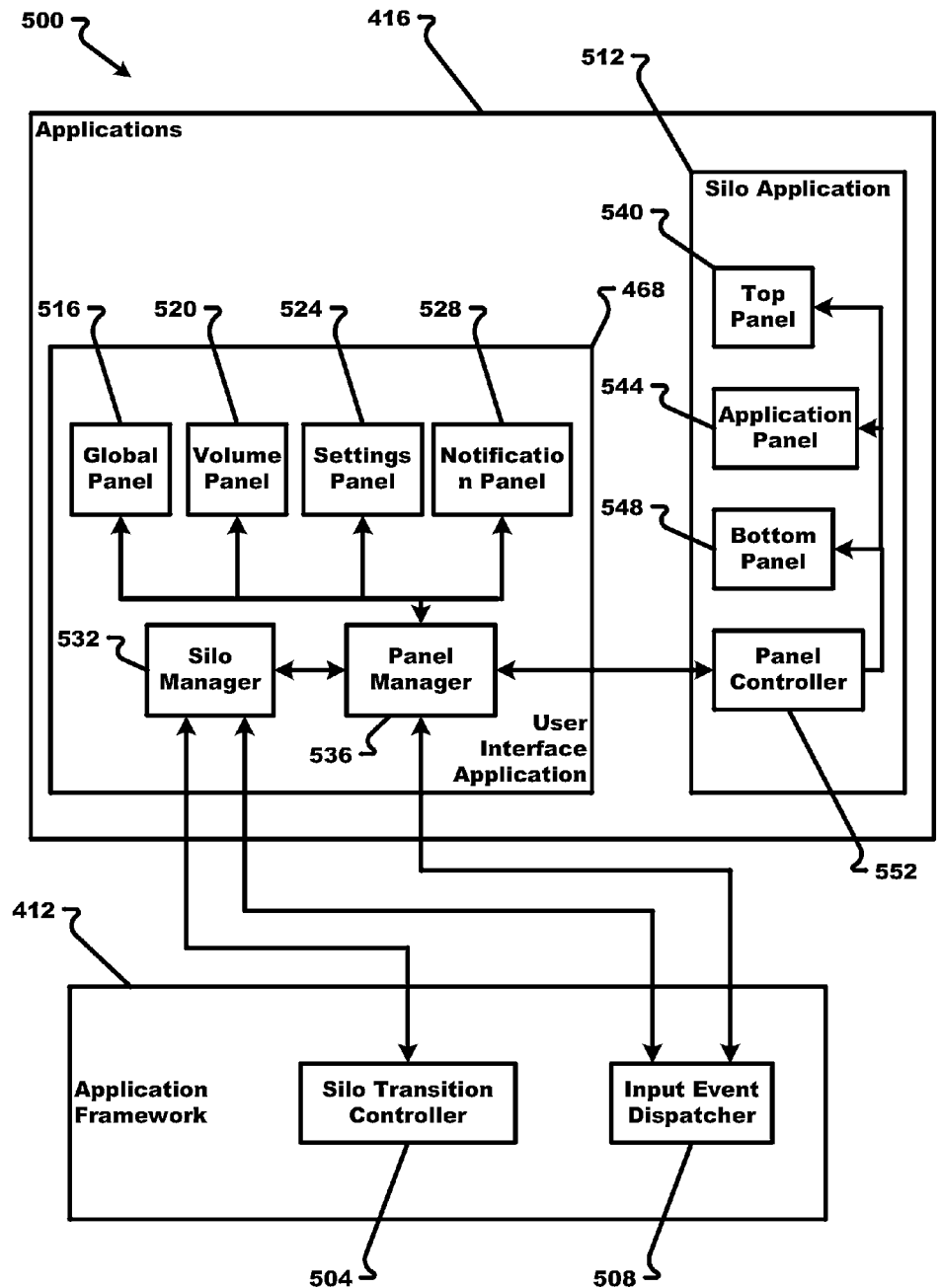
FIG. 5 is a second block diagram of an embodiment of the intelligent television software and/or firmware.

User interface application 468 provides for the specific user interfaces associated with the Intelligent TV 100. These user interfaces can include the silos and panels that are described in FIG. 5. An embodiment of the user interface software 500 is shown in FIG. 5. Here the application framework 412 contains one or more code components which help control the user interface events while one or more applications in the applications layer 416 affects the user interface use for the Intelligent TV 100. The application framework 412 can include a silo transition controller 504 and/or an input event dispatcher 508. There may be more or fewer code components in the application framework 412 than those shown in FIG. 5. The silo transition controller 504 contains the code and language that manages the transitions between one or more silos. A silo can be a vertical user interface feature on the Intelligent TV that contains information for user. The transition controller 504 can manage the changes between two silos when an event occurs in the user interface. The input event dispatcher 508 can receive user interface events that may be received from the operating system and provided to the input event dispatcher 508. These events can include selections of buttons on a remote control or on the TV or other types of user interface inputs. The input event dispatcher 508 may then send these events to a silo manager 532 or panel manager 536 depending on the type of the event. The silo transition controller 504 can interface with the silo manager 532 to affect changes in the silos.

The application layer 416 can include a user interface application 468 and/or a silo application 512. The application layer 416 can include more or fewer user interface applications as necessary, to control the user interface of the Intelligent TV 100 than those shown in FIG. 5. The user interface application 468 can include a silo manager 532, a panel manager 536, and one or more types of panels 516-528. The silo manager 532 manages the display and/or features of silos. The silo manager 532 can receive or send information from the silo transition controller 504 or the input event dispatcher 508 to change the silos displayed and/or to determine types of input received in the silos.

A panel manager 536 is operable to display panels in the user interface to manage transitions between those panels or to affect user interface inputs received in the panel. The panel manager 536 may thus be in communication with different user interface panels such as a global panel 516, a volume panel 520, a settings panel 524, and/or a notification panel 528. The panel manager 536 can display these types of panels depending on the inputs received from the input event dispatcher 508. The global panel 516 may include information that is associated with the home screen or top level hierarchal information for the user. A volume panel 520 may display information about an audio volume control or other settings for volume. A settings panel 524 can include information displayed about the settings of the audio or video, or other settable characteristics of the Intelligent TV 100. A notification panel 528 can provide information about notifications to a user. These notifications can be associated with information, such as, video on demand displays, favorites, currently provided programs, or other information. Notifications can be associated with the media or with some type of setting, or operation or the Intelligent TV 100. The panel manager 536 may be in communication with a panel controller 552 of the silo application 512.

The panel controller 552 may operate to control portions of the panels of the types described previously. Thus, the panel controller 552 may be in communication with a top panel application 540, an application panel 544, and/or bottom panel 548. These types of panels may be differently displayed in the user interface of the Intelligent TV 100. The panel control thus may be based on the configuration of the system or the type of display being used currently, put the types of panels 516-528 into a certain display orientation governed by the top panel application 540, application panel 544, or bottom panel application 548.

An embodiment of the data service 432 and the operation of the data management is shown in FIG. 6. The data management 600 can include one or more code components that are associated with different types of data. For example, there may be code components within the data service 432 that execute and are associated with video on demand, the electronic program guide, or media data. There may be more or fewer types of data service 432 components than those shown in FIG. 6. Each of the different types of data may include a data model 604-612. The data models govern what information is to be stored and how that information will be stored by the data service. Thus, the data model can govern regardless of where the data comes from, how the data will be received or managed within the Intelligent TV system. Thus, the data model 604, 608, and/or 612, can provide a translation ability or affect the ability to translate data from one form to another to be used by the Intelligent TV 100.

The different types of data services (video on demand, electronic programming guide, media) each have a data subservice 620, 624, and/or 628 that is in communication with one or more internal and/or external content providers 616. The data subservices 620, 624, and 628 that communicate with the content providers 616 to obtain data that may then be stored in databases 632, 636, and 640. The subservices 620, 624, and 628 may communicate with and initiate or enable one or more source plug-ins 644, 648, and 652 to communicate with the content provider. For each content provider 616, there may be a different source plug-in 644, 648, and 652. Thus, if there is more than one source of content for the data, each of the data subservice 620, 624, and 628 may determine and then enable or initiate a different source plug-in 644, 648, and/or 652. The content providers 616 may also provide information to a resource arbitrator 656 and/or thumbnail cache manager 660. The resource arbitrator 656 may operate to communicate with resources 664 that are external to the data service 432. Thus, the resource arbitrator 656 may communicate with cloud based storage, network based storage, or other types of external storage in the resources 664. This information may then be provided through the content provider module 616 to the data subservices 620, 624, 628. Likewise, a thumbnail cache manager 660 may obtain thumbnail information from one of the data subservices 620, 624, 628 and store that information in the thumbnail database 668. Further the thumbnail cache manager 660 may extract or retrieve that information from the thumbnails database 668 to provide to one of the data subservices 620, 624, 628.

Figure 13:
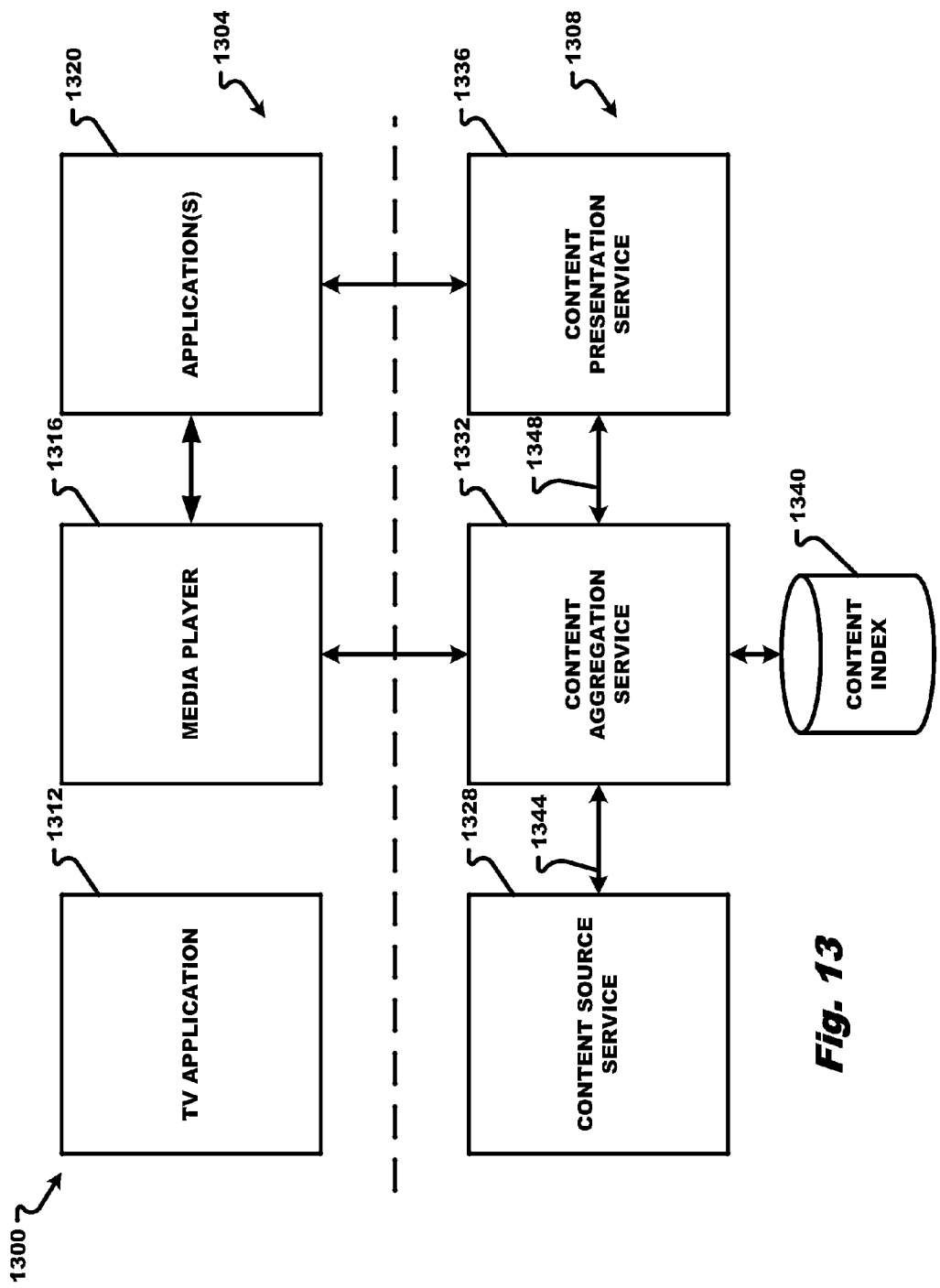
FIG. 13 is a block diagram of an embodiment of a content data service.

An exemplary content aggregation architecture 1300 is shown in FIG. 13. The architecture can include a user interface layer 1304 and content aggregation layer 1308. The user interface layer 1304 may include a TV application 1312, media player 1316, and application(s) 1320. The TV application 1312 enables the viewer to view channels received via an appropriate transmission medium, such as cable, satellite, and/or the Internet. The media player 1316 views other types of media received via an appropriate transmission medium, such as the Internet. The application(s) 1320 include other TV-related (pre-installed) applications, such as content viewing, content searching, device viewing, and setup algorithms, and coordinates with the media player 1316 to provide information to the viewer.

The content source layer 1308 includes, as data services, a content source service 1328, a content aggregation service 1332 and a content presentation service 1336. The content source service 1328 can manage content source investigators, including local and/or network file system(s), digital network device manager (which discovers handheld and non-handheld devices (e.g., digital media servers, players, renderers, controllers, printers, uploaders, downloaders, network connectivity functions, and interoperability units) by known techniques, such as a multicast universal plug and play or UPnP discovery techniques, and, for each discovered device, retrieves, parses, and encodes device descriptors, notifies the content source service of the newly discovered device, and provides information, such as an index, on previously discovered devices), Internet Protocol Television or IPTV, digital television or DTV (including high definition and enhanced TV), third party services (such as those referenced above), and applications (such as Android applications).

Content source investigators can track content sources and are typically configured as binaries. The content source service 1328 starts content source investigators and maintains open and persistent channels for communications. The communications include query or command and response pairs. The content aggregation service 1332 can manage content metadata fetchers, such as for video, audio, and/or picture metadata. The content presentation service 1336 may provide interfaces to the content index 1340, such as an Android application interface and digital device interfaces.

The content source service 1328 can send and receive communications 1344 to and from the content aggregation service 1332. The communications can include notifications regarding new and removed digital devices and/or content and search queries and results. The content aggregation service 1332 can send and receive communications 1348 to and from the content presentation service 1336 including device and/or content lookup notifications, content-of-interest advisories and notifications, and search queries and results.

When a search is performed, particularly when the user is searching or browsing content, a user request may be received from the user interface layer 1300, by the content presentation service 1336, which responsively opens a socket and sends the request to the content aggregation service 1332. The content aggregation service 1332 first returns results from the local database 1340. The local database 1340 includes an index or data model and indexed metadata. The content source service 1328 further issues search and browse requests for all content source investigators and other data management systems. The results are forwarded to the content aggregation service 1332, which updates the database 1340 to reflect the further search results and provides the original content aggregation database search results and the data updates, reflecting the additional content source service search results, over the previously opened socket to the content presentation service 1336. The content presentation service 1336 then provides the results to one or more components in the user interface layer 1300 for presentation to the viewer. When the search session is over (e.g., the search session is terminated by the user or by an action associated with user), the user interface layer 1300 disconnects the socket. As shown, media can be provided directly by the content aggregation service 1332 to the media player 1316 for presentation to the user.

Figure 7:
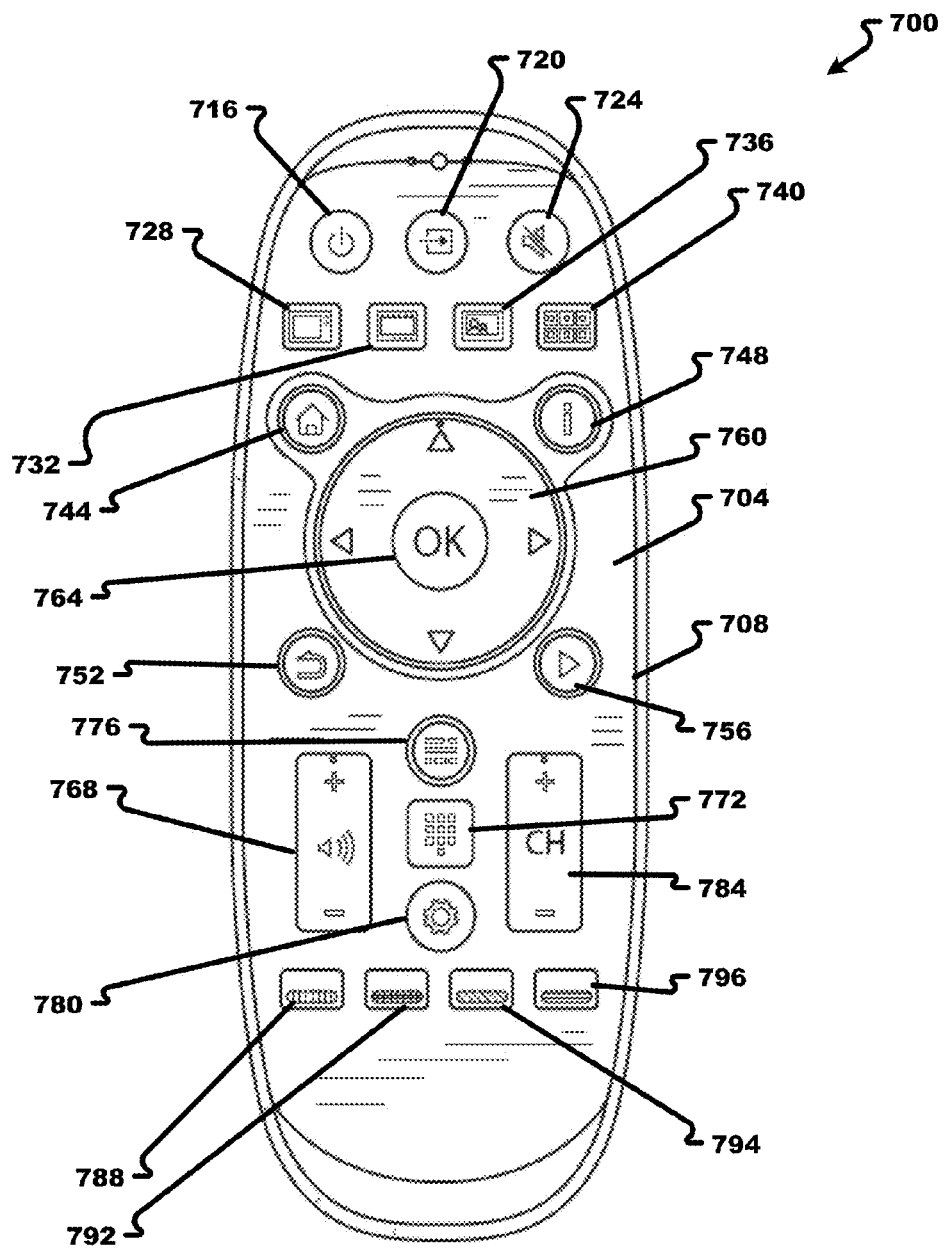
FIG. 7 is a plan view of an embodiment of a handheld remote control.
Figure 8:
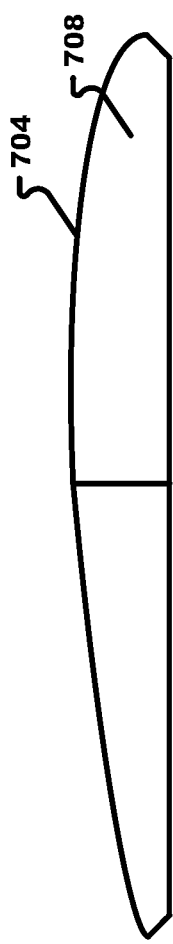
FIG. 8 is a side view of an embodiment of a remote control.
Figure 9A:
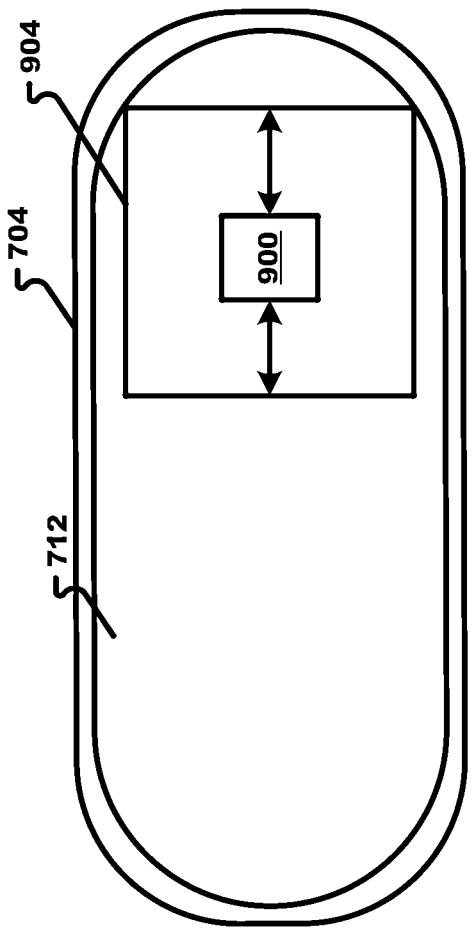
FIG. 9A is a bottom view of an embodiment of a remote control with a joystick in a neutral position.

Remote Control:

A handheld remote control can be provided to enable user interaction with the Intelligent TV 100. An exemplary handheld remote control is shown in FIGS. 7-9. The remote control 700 can include one or more of, but is not limited to, top, side and bottom housings 704, 708, and 712, an (on/off) power button 716, an input source button 720 (to select input source such as Live TV, video on demand, media center, application center, high definition multimedia interface or HDMI, component or COMP, audio/Video or A/V, digital or analog television or DTV/ATV, and video graphics array (VGA)), a (volume) mute button 724, a Live TV button 728 (to activate or select the Live TV silo), a video on demand (VOD) button 732 (to activate or select the video on demand silo), a media center button 736 (to activate or select the media center application or silo, which access various types of media such as music, TV programming, videos, and the like), an application center button 740 (to activate or select the application center application or silo), a global panel button 744, an application panel button 748, a back button 752 (to select a prior user operation or Intelligent TV state and/or navigate up a hierarchy of any displayed image or object(s) (in which case the back button 752 does not navigate within application panels or across application silos), a play button 756 (to play or pause media), a D-pad 760 (which includes north, east, west, and south directional arrows to navigate among displayed images and/or move between levels of an application's or object's hierarchy such as application view navigation, panel navigation, and collection navigation), an OK (or select) button 764 (to select a highlighted displayed image (such as displayed speed control, rewind, forward, play, and pause objects and/or objects on menu bar or in a menu box) and/or navigate down a hierarchy of any displayed image or object(s)), a rocker-type volume-up and volume-down button 768 (to adjust the volume), a menu/guide button 772 (to select for display a menu or guide of programming), a 0-9 (number) button 776 (to display a number pad on the TV screen), a settings button 780 (which launches an application to access current and change TV settings (such as channel settings and settings used to adjust picture and sound effects (e.g., image mode (e.g., standard, playground, game, cinema, concert, and studio), brightness, contrast, saturation, color temperature, energy savings, 3D noise reduction, hue, sharpness, zoom mode (e.g., full screen, standard, smart zoom, and dot-to-dot), picture position, 3D mode, for picture, and sound retrieval system or SRS TruSurround, sound mode (e.g., standard, live 1, live 2, theatre, music, speech, user equalizer mode, Left/Right speaker balance, auto volume control, Sony/Philips Interconnect Format or S/PDIF (off, auto, pulse code modulation or PCM) for sound) and system settings (such as system (e.g., selected language for graphical user interface, user geographical and/or geopolitical location information, input method, area settings, and sleep time), network (e.g., WiFi, WiFi hotspot, WiFi direct, Point-to-Point Protocol over Ethernet or PPPoE (asymmetric digital subscriber line or ADSL), Ethernet) settings (e.g., enabled and disabled and selected and non-selected) and information (e.g., network information (e.g., electronic address such as Internet Protocol or IP address, subnet mask, gateway, domain name server information, domain name, Media Access Control or MAC address, service set identification or SSID, security information, and password information) and inline status), manage applications (e.g., currently installed applications, currently executing applications, and internal and external computer readable medium usage), and view user information regarding the Intelligent TV 100)), a rocker-type channel-up and channel-down button 784 (to increment or decrement the selected channel), and first, second, third and fourth hotkeys 788, 792, 794, and 796, and/or a moveable joystick 900 on a bottom of the remote control 700. The first, second, third, and fourth hotkeys are generally assigned different colors, which color indexing is depicted as visual indicia on a selected panel to show the currently assigned function, if any, for each hotkey. As can be seen, the actuator layout can provide a highly efficient, satisfactory, and easily usable experience to the end user.

Unlike the functional associations and functions of many of the actuators, those of some of the actuators are not readily apparent. A number of examples will now be discussed by way of illustration.

The media center button 736, when selected, can provide information regarding music, videos, photographs, collections or groupings of music, videos, and/or photographs, and internal and external computational devices (such as personal computers, laptops, tablet computers, wireless phones, removable computer readable media, and the like), which can be grouped in a selected manner (such as favorites, most recently viewed, most watched or viewed, and most recently added). The information can includes previews (which can include selected portions of the media content, duration, file size, date created, date last watched, times watched or viewed, and audio and/or video format information).

The application center button 740, when selected, may provide information regarding pre-installed and downloaded applications. Unlike downloaded applications, pre-installed applications cannot be removed by the user or manually updated. Exemplary pre-installed applications include web browser, settings control, and content search algorithms. By way of illustration, the application center button 740 can provide a scrollable graphical grid of icons (each icon being associated with an application) currently available in the application center.

The global panel button 744, when selected, can provide the user, via one or more panels or windows, with access to one or more of, but not limited to, silos, notifications, a web browser, system settings, and/or information associated therewith. For example, the global panel button 744 can enable the user to determine what external devices are currently connected to and/or disconnected from the Intelligent TV 100, determine what inputs (e.g., HDMI ports) are currently available for connecting to external devices, determine a connection and/or operational status of a selected external device and/or network (e.g., WiFi connected, Ethernet connected, and offline), assign a custom (or user selected) name to each input source, determine what content is currently being offered on Live TV, on demand, the media center, and/or the application center, access vendor messages and notifications to the user (e.g., system and/or application updates are available), activate the Internet browser, and/or access shortcuts on a displayed shortcut bar to more frequently used and desired applications. Common shortcuts are Internet browser (e.g., Internet search engine), system settings, and notifications. The common types of panels are for information (which is typically information related to a currently displayed image and/or content (e.g., title, date/time, audio/visual indicator, rating, and genre), browse requests, and/or search requests (such as search term field)). Each of the panel types may include a panel navigation bar, detailed information or relevant content to the panel function, operation and/or purpose, and a hotkey bar (defining currently enabled functional associations of hotkeys).

The application panel button 748, when selected, can display an application window or panel. One application panel may be an information panel regarding a selected (pre-installed or previously downloaded) application icon. The information panel can one or more of identify the selected application, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs), provide the option to launch, remove, update, and add to favorites the identified application, and provide a listing of selectable links of other (not yet downloaded) recommended applications that provide similar functionality to the identified application. The latter listing can, in turn, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs).

The functions of the first, second, third, and fourth hotkeys 788, 792, 794, and 796 can change depending on system state, context, and/or, within a selected screen and/or panel, based on a content or currently selected portion of (or relative cursor position on) the screen. Commonly, a currently assigned function of any of the first, second, third, and fourth hotkeys 788, 792, 794, and 796 depends on a currently accessed silo and/or panel (with which the user is currently interacting within the silo). In other words, a first function of one of the first, second, third, and fourth hotkeys 788, 792, 794, and 796 is activated by the respective hotkey in a first system state while a different second function is activated by the respective hotkey in a different second system state. In another example, a third function of one of the first, second, third, and fourth hotkeys 788, 792, 794, and 796 is activated by the respective hotkey when a user focus (or currently selected cursor position or screen portion) is at a first screen position while a different fourth function is activated by the respective hotkey when a user focus (or currently selected cursor position or screen portion) is at a different second screen position. The first screen position can, for instance, be within an icon while the second screen position is outside of the icon. Hotkey functionality that could be enabled when in the first screen position may be "configure" and "remove" and disabled is "add", and, when in the second position hotkey functionality enabled can be "add" and disabled is "configure" and "remove". Generally, the states of hotkeys can include normal (for enabled actions or functions), disabled (when an action or function is temporarily disabled), pressed (when selected by a user to command an action or function to be performed), and unavailable (when no association between the hotkey and an action or function is currently available). While examples of hotkey functions are discussed below, it is to be understood that these are not intended to be exhaustive or limiting examples.

The first hotkey 788, when selected in a first system state, can enable the user to assign, change, or edit a name of an input source. It is typically enabled only when the input source of HDMI, Comp/YPbPr (e.g., component video cables), video output, and VGA is in focus. When selected in a second system state, the first hotkey 788 can return the user to a top of a scrollable collection of objects, such as application icons.

The second hotkey 792 may show all or less. In other words, the hotkey 792 can allow the user to show all inputs, including the unconnected/undetected ones and to hide the unconnected/undetected inputs, e.g., to expand and collapse the silo/input list. Each input source can have one of two states, namely connected/detected and unconnected/undetected. Some input sources, including Live TV, video on demand, media center, and application center are always connected/detected.

Figure 9B:
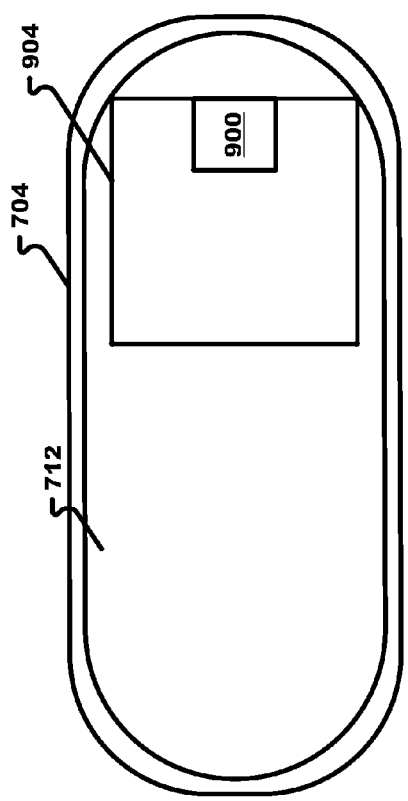
FIG. 9B is a bottom view of an embodiment of a remote control with the joystick in a lower position.
Figure 9C:
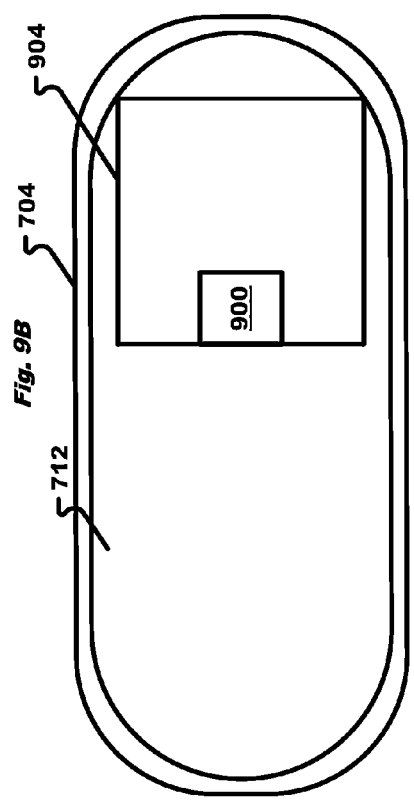
FIG. 9C is a bottom view of an embodiment of a remote control with the joystick in an upper position.

The moveable joystick 900 on the bottom of the remote control 700, when manipulated, can cause a displayed image on the Intelligent TV 100 screen to be displaced a proportional amount. In other words, the displayed image is displaced substantially simultaneously with displacement of the joystick 900 within the joystick aperture 904 in the bottom housing 712 of the remote control. As shown in FIGS. 9B-C, the joystick 900 moves or slides between forward and reverse positions. Releasing the joystick 900 causes the joystick 900 to return to the center position of FIG. 9A, and the window to move or slide upwardly (when the joystick is released from the joystick position of FIG. 9B) or downwardly (when the joystick is released from the joystick position of FIG. 9C) until it disappears from view as shown in FIG. 11A. The effect on the screen of the Intelligent TV 100 is shown in FIGS. 11A-C. In FIG. 11A, video content, such as TV programming, a video, movie, and the like, is being displayed by front surface of the screen 212. In FIG. 11B, the joystick 900 is moved or slid to the upper position of FIG. 9B, and a drop down window or panel 1100 moves or slides down (at the substantially the same rate of joystick 900 movement) at the top of the screen 212. In FIG. 11C, the joystick 900 is moved or slid to the lower position of FIG. 9C, and a drop up window or panel 1100 moves or slides up (at the substantially the same rate of joystick 900 movement) at the bottom of the screen 212. The window 1100 partially covers the video content appearing on the remainder of the screen 212 and/or causes a portion of the screen 212 displaying video content to move and/or compress up or down the height of the window 1100.

The window 1100 can include one or more of information (which is typically information related to a currently displayed image and/or content (e.g., panel navigation bar, detailed information (e.g., title, date/time, audio/visual indicator, rating, and genre), and hotkey bar (defining current functional associations of hotkeys)), browse requests, and/or search requests. Commonly, the window 1100 includes suitable information about the content (such as name, duration, and/or remaining viewing duration of content), settings information, TV or system control information, application (activation) icons (such as for pre-installed and/or downloaded applications such as application center, media center and Web browser), and/or information about input source(s), When the joystick 900 is in either the forward or reverse position, the user can select an actuator on the front of the remote control, such as the OK button 764, and be taken, by displayed images on the screen 212, to another location in the user interface, such as a desktop. This process can be done in a nonintrusive manner and without affecting the flow of content that is pushed up or down. The joystick 900 could be moved, additionally or differently, from side-to-side to cause the window to appear at the left or right edge of the screen 212.

Figure 10:
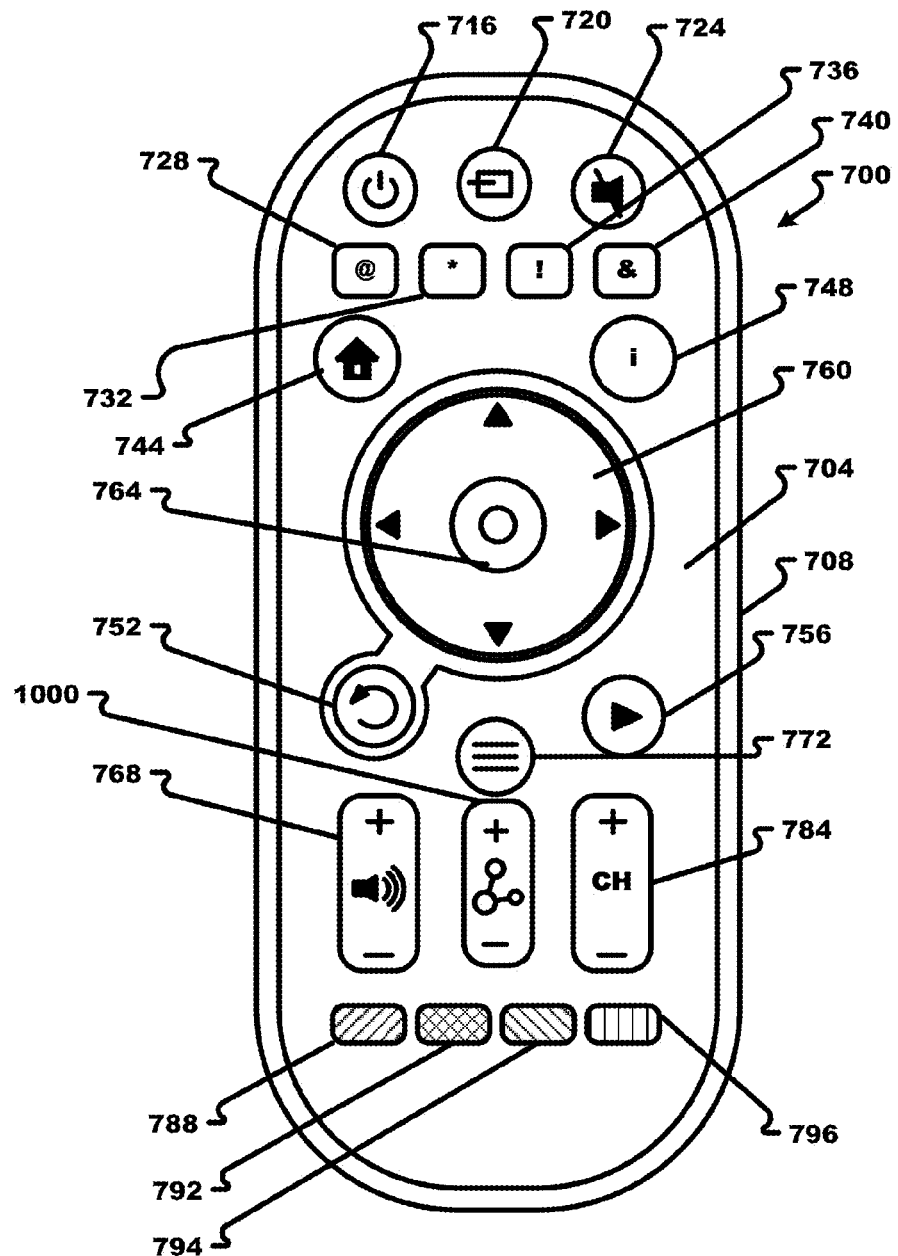
FIG. 10 is a plan view of another embodiment of a handheld remote control.

An alternative actuator configuration is shown in FIG. 10. The actuators are substantially the same as those of FIGS. 7-9 except that the social network button 1000, when selected, can automatically select content and publish, via a social network service or other social media, the content to a social network or online community. User or viewer comments and/or other messages can be included in the outbound message. For example, all or one or frames or portions of media content (such as a video, music, a photograph, a picture, or text) can be provided automatically to a predetermined or selected group of people via Linked-In™, Myspace™, Twitter™, YouTube™, DailyMotion™, Facebook™, Google+™ or Second Life™ The user, upon activating the button 1000 could, in response, select a social forum or media upon which the selected content (which is the content displayed to the user when the social network button 1000 is activated) is to be posted and/or a predetermined group within that social media to which the content is to be posted. Alternatively, these selections could be preconfigured or preselected by the user.

The social network button can also be used to "turn up" or "turn down" a social volume visualization. The Intelligent TV 100 can create dynamically a visualization of aggregated connections (and inbound and/or outbound messages) from a variety of social networks. The aggregation (and inbound and outbound messages) can be depicted graphically on the screen as a volume of connections to influence the viewer user. With a social volume visualization, selected contents of each linked social network profile of a social contact (and inbound and/or outbound messages from or to the linked social network contact and/or current activity of the social contact (such as watching the same programming or content the viewer is currently watching) can be presented in a separate tile (or visually displayed object). The size of the tile can be related to any number of criteria, including a relationship of the linked social contact (e.g., a relative degree of importance or type of relationship can determine the relative size of the tile, a degree of influence of the linked social contact to the current viewer, a geographic proximity of the linked social contact to the current viewer, a degree to which the currently provided media content is of interest to both the viewer and linked social contact (e.g., both parties enjoy war movies, murder mysteries, musicals, comedies, and the like), an assigned ranking of the linked viewer by the viewer, a type of social network type linking the viewer with the linked social contact, a current activity of the social network contact (e.g., currently watching the same content that the viewer is currently watching), a current online or offline status of the linked social contact, and a social network grouping type or category to which both the viewer and linked social contact belong (e.g., work contact, best friend, family member, etc.).

The viewer can designate a portion of the screen to depict the social network aggregation. By turning the social volume up (+) or down (−), the viewer can increase the size and/or numbers of linked contact tiles provided to the viewer. In other words, by increasing the social volume the viewer can view, access, and/or push more social content from those of his or her social networks associated with him or her in a memory of the Intelligent TV. By decreasing the social volume, the viewer can view, access, and/or push less social content from his or her associated social networks. By selecting the mute button 724, the viewer can stop or pause any interactivity with his or her associated social networks (e.g., inbound or outbound messages). Social volume and/or mute can be separated into two (or more) volume settings for outbound and inbound social network activity. By way of illustration, a first volume setting, control, and/or button can control the volume for outbound social network activity (e.g., outbound social messages) while a second (different) volume setting, control, and/or button can control the volume for inbound social network activity (e.g., inbound social messages). By way of further illustration, a first mute setting, control, and/or button can stop or pause outbound social network activity (e.g., outbound social messages) while a second (different) mute setting, control, and/or button can stop or pause inbound social network activity (e.g., inbound social messages).

Figure 12:
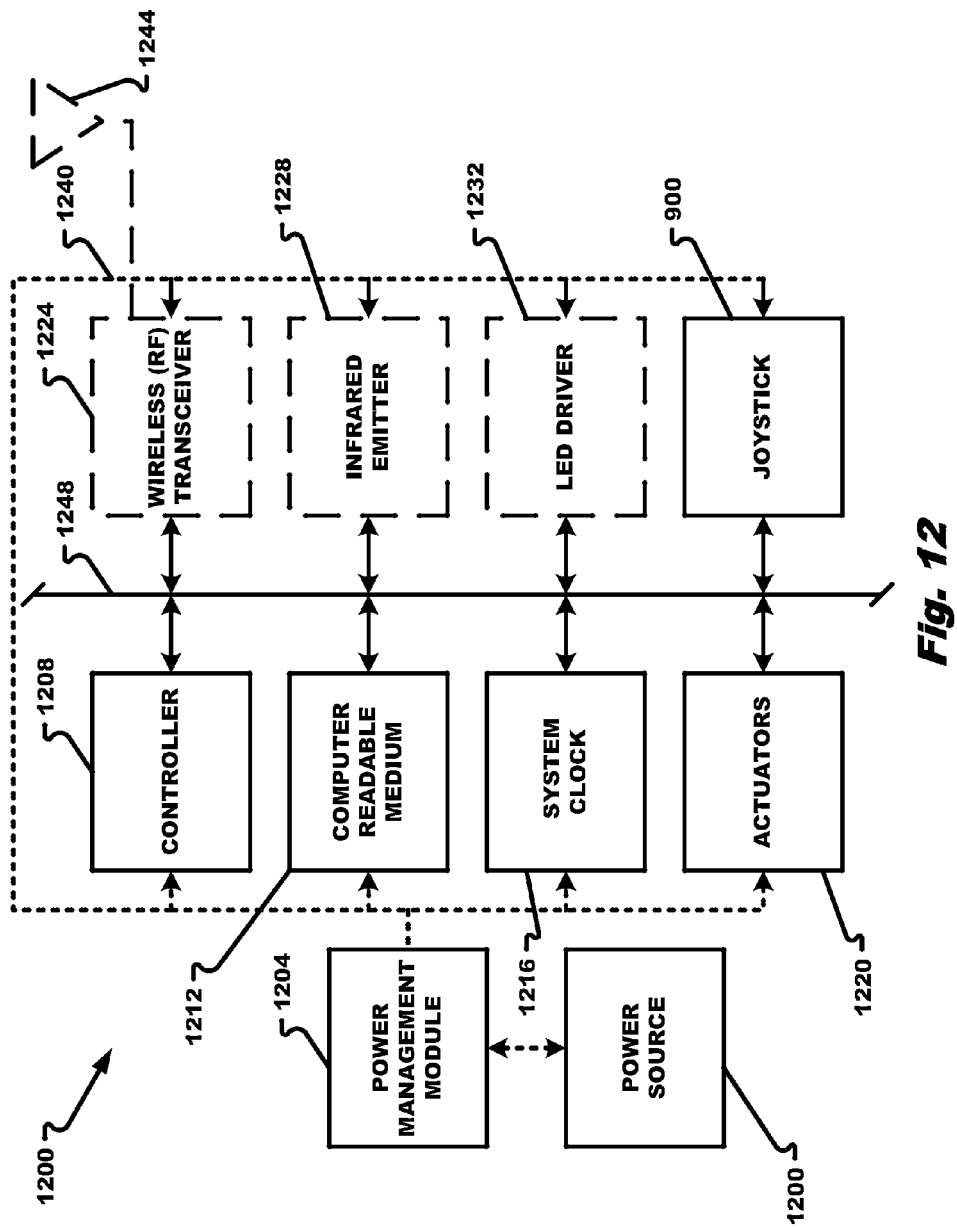
FIG. 12 is a block diagram of an embodiment of a handheld remote control of either FIG. 7 or 10.

A functional block diagram of the remote control is shown in FIG. 12. The remote control 700 includes a controller 1208 to control and supervise remote control operations, optional wireless (RF) transceiver 1224 and antenna 1244 to send and receive wireless signals to and from the Intelligent TV 100 and other external components, optional infrared emitter 1228 to emit infrared signals to the Intelligent TV 100, optional light emitting diode or LED driver 1232 to control LED operation to provide video-enabled feedback to the user, actuators 1220 (including the various buttons and other actuators discussed above in connection with FIGS. 7 and 10), and joystick 900, all interconnected via a bus 1248. An on board power source 1200 and power management module 1204 provide power to each of these components via power circuitry 1240. The infrared emitter 1228 and receiver (not shown) on the Intelligent TV system 100 can be used to determine a displayed object illuminated by the infrared signal and therefore adjust the displayed image, for example to indicate a focus of the user (e.g., illuminate a displayed object or show cursor position relative to displayed objects on the screen) and to determine and activate a desired command of the user. This can be done by tracking a position of the remote control in relation to infrared tracking reference points (e.g., a sensor bar or infrared LED's) positioned on or adjacent to the screen of the Intelligent TV 100. Motion tracking can further be augmented using position information received from a multi-axis gyroscope and/or accelerometer on board the remote control (not shown).

Using metadata associated with the programming, the application framework 412 can distinguish between, and classify Live TV programming as, the following program types: movies, TV show episodes (which can be any type of recurring show such as drama series, sitcoms, animated series, reality shows, mini series, talk shows, game shows, and newscasts), sport events (such as baseball, hockey, boxing, football, and other sporting event programming), specials (such as holiday specials, election coverage, and special news reports), radio (which deliver audio-only broadcasts), and undefined (which refers to programming having no associated metadata). Based on metadata associated with the programming, the application framework 412 can further distinguish between and classify each program type into a program category. Common program categories include political, law, military, economic, culture, sports, the Arts, history, geography, science, medical, environmental, social, recreation, and other (for any non-specified electronic programming guide ("EPG") entries). The metadata can be obtained from the content aggregation service 1332, a content metadata fetcher, such as for video, audio, and/or picture metadata, and the like. The metadata, for example, can be obtained from an Internet accessible EPG provider. Examples of metadata formats include EVB-SI, TV-Anytime, and MPEG-7 and communication protocols include the Programming Metadata Communication Protocol ("PMCP") and Program and System Information Protocol ("PSIP"). Typically, the data which populates the EPG comes from the PSIP. PMCP provides the source data for PSIP, A PSIP generator converts PMCP to a broadcast-ready format. The downloaded EPG metadata is typically stored locally in a computer readable medium.

The user application framework 412 further enables the user to mark a selected channel or program as a "favorite". This marking means that the user is more interested in these programming items than other items; in other words, the user is more likely to watch favorite programs and channels than other unmarked programs and channels. Once a channel or program is marked as a "favorite", it is highlighted in all views and made easier to access. While favorite channels and programs can be located by an EPG provider in the cloud, the favorite channels and programs are typically maintained only in the local computer readable medium.

The application framework 416 can further enable the user to set reminders for specific programs. Reminders cause notifications by the notification panel 528 that a specific program is about to start, regardless of where or how the user is currently interacting with the Intelligent TV 100 (e.g., regardless of what channel or silo the user is currently interacting with). When a reminder is set, it is created for that specific instance of the complete series. For example if a program were to be on every Friday night at 8 pm on channel 3, setting a reminder for the program creates a reminder that the program is provided every Friday at 7:58 pm. If a program were to be a single airing event (such as a movie or special), a reminder is provided only for that instance.

The EPG, which can be selected by the menu/guide button 772, provides users with a continuously updating table of scheduling information on current and upcoming programming. The EPG is typically obtained, via a network 128 (e.g., the Internet) from a third party source. The EPG can be used to discover content to watch and set reminders for future programs. EPG program listings typically provide at least the following information: show name (which is the full name of the program (e.g., TV episode, movie or special), length of show (which is shown by the relative size of the listing or associated icon in the table), progress of show (programs in process are visually differentiated from shows not in progress to show the progress), favorite indicator (programs that have been marked as a favorite are visually differentiated, such as by a favorite icon, to show that they are favorites), reminder indicator (programs that have been set to trigger a reminder are visually differentiated, such as by a reminder icon, to show that they contain reminders), first air indicator (programs that are airing for the first time are visually differentiated, such as by a first-to-air icon, to show that they are airing for the first time), program type indicator (the program listing contains a visual indicator, such a program-type indicator, to show the program type), and an HD indicator (the program listing contains a visual indicator, such an HD indicator, to show that the program is in high definition).

One EPG format will be discussed with reference to FIG. 14. The intelligent TV 100 displays the EPG modal 1400. The display includes a live preview area 1404 (which displays programming on the currently active channel (and not the channel that is in focus within the EPG)), a program preview area 1408, the EPG 1412, and the hot key bar 1416 (which is color-coded to the hot keys to show currently enabled hot key functionality, e.g., the red hot key corresponds to "Now", which, if selected, jumps to currently playing program in the EPG, the yellow hot key to "Categories", which, if selected, switches the category view, the green hot key to "Manage", which, if selected, switches to the manage view, and the blue hot key to "Mark", which, if selected, provides a modal with three choices, namely set a reminder for [Show Name], Add [Show Name] to favorites, and add [channel number] to favorite channels, where the item in brackets refers to the currently selected channel and program).

The program preview area 1408 corresponds to the program or channel listing currently selected or in-focus. For the channel listing, the program preview area 1408 includes program information about the program currently being aired on the channel. The program preview area 1408 can include the following fields, namely show name 1420, season 1422 (if applicable) (which can be the number of the season), episode number 1424, episode name 1428, start and end time 1432, description 1436 (which describes the current program), thumbnail view 1440 (which is a thumbnail preview of the current program (e.g., a still (not moving) image, such as a captured frame of the second programming (e.g., a screen grab provided by the Internet-provided EPG service)), a picture (such as a movie poster), or a photograph), channel 1442 providing the program, and other information 1444 (which can include current time (e.g., the current time of day), duration (or start-to-finish time), runtime (or temporal progress of the program), runtime remaining, rating (e.g., TV-Y, TY-Y7, TV-G, TV-PG, TV-14, and TV-MA), video format (or resolution of the current program), audio format (or audio format of the current program), digital air date or first airing indicator, encryption status (when the channel is detected to be encrypted (regardless of decryption status)), program category, program type, track information (for radio programming—the name of the current artist and track), and other indicators noted above).

The EPG includes plural program listings, with each listing having a channel indicator 1448 and show name 1452. The program listings may further include a favorite (program) indicator 1456 (which is shown in the shape of a star but can be any other indicator), a first air indicator 1460 (which is shown as "NEW" but can be any other indicator), and a reminder indicator 1464 (shown as a blue dot but can be any other indicator). The channel indicator 1448 typically includes the channel number, channel logo, an active channel indicator (to show that the channel is currently playing), a selected channel indicator (to show that the channel is currently in-focus), and a favorite (channel) indicator (not shown) (showing that the channel is marked as a favorite channel by the user). Time indicators are shown at the top of the EPG and placed relative to the EPG program listings to show, as the case may be, a total or remaining duration of the program.

Figure 14:
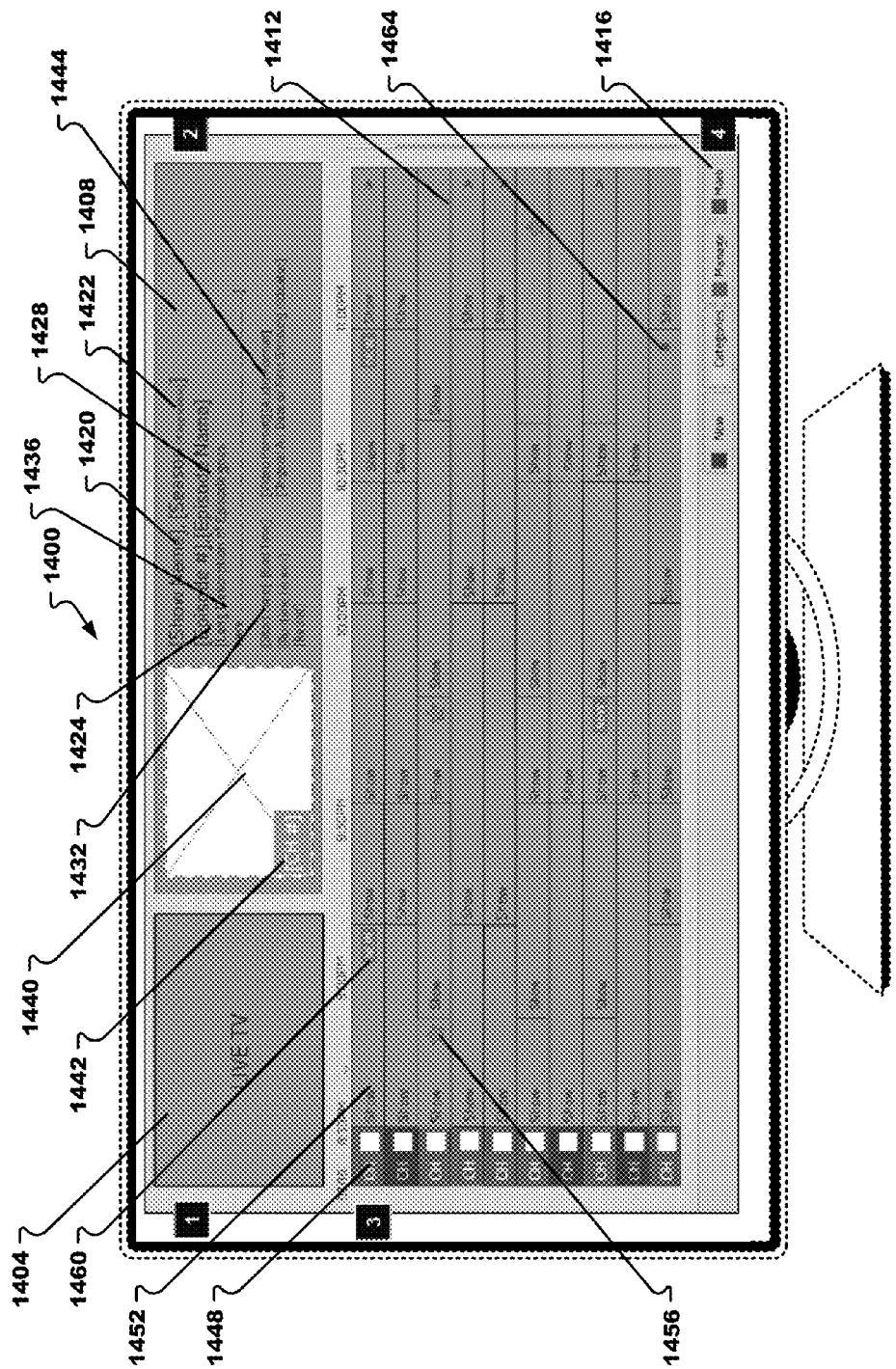
FIG. 14 is a screen shot of the Intelligent TV screen according to according to an embodiment.
Figure 15:
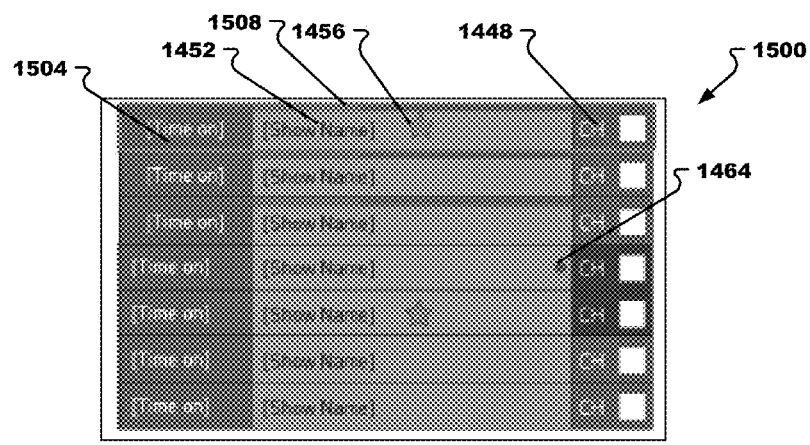
FIG. 15 is a partial screen shot of the Intelligent TV screen according to an embodiment.

The EPG of FIG. 14 is by channel. Other EPG formats can be used. An example EPG 1500 format is shown in FIG. 15, which is by time. The listed programs each have an associated start time 1504 (which may be different or the same for plural listings), a show name 1456, and channel indicator 1448. The program listings can be grouped by program type, program category, or channel. A band 1508 shows the current program runtime for programs in process. The format supports the other visual indicators of the EPG of FIG. 14. While the EPG of FIG. 14 can be scrolled not only vertically (e.g., up and down in channels) but also horizontally (e.g., backwards and forwards in time) using the D-Pad 760 of the remote control, the EPG of FIG. 15 can be scrolled only vertically (e.g., up and down in channels for the selected time). The topmost program listing in each of the EPG formats, when the format is presented initially, is typically the current program in view. The OK button 764 or play button 756 on the remote control selects an in-focus program listing for view. When a channel or program is selected, the application layer 416 automatically exits the EPG display and commences viewing the selected programming.

Figure 16:
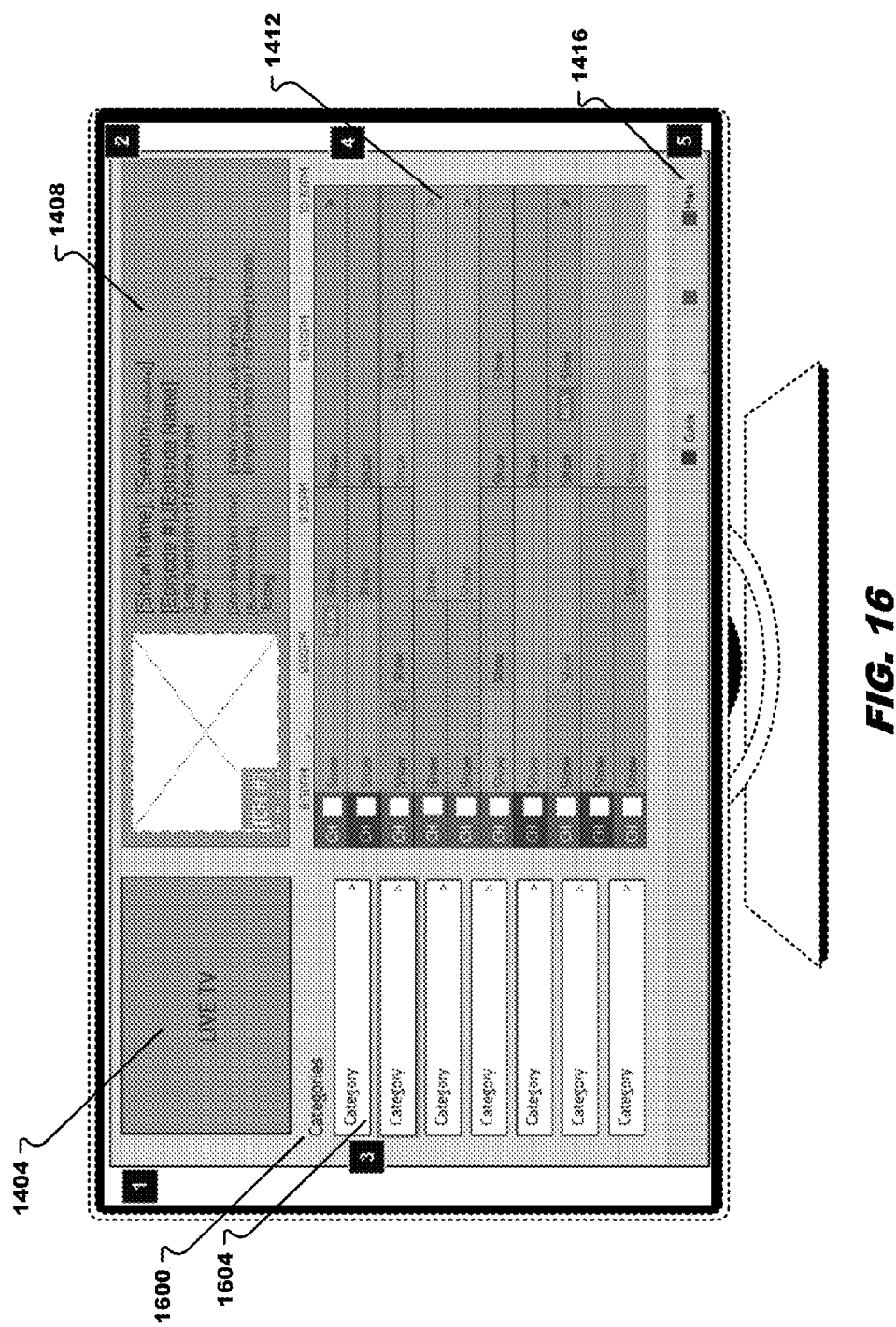
FIG. 16 is a screen shot of the Intelligent TV screen according to according to an embodiment.

With reference to FIG. 16, the interaction of EPG with selected program categories is illustrated. The vertically scrollable category area 1600 presents a scrollable listing of selectable program category bars 1604. Moving focus to a category bar causes the EPG 1412 program listings to be refreshed with a set of program listings filtered by the in-focus category bar. In the hot key bar 1416, the red hot key corresponds to "Now", the yellow and green hot keys correspond to no assigned functionality and the blue hot key to "Mark". Unlike the other EPG formats, the category-enabled EPG is fixed to a two-hour window and therefore cannot be scrolled horizontally. Stated another way, only channels having a program on (in the next two hours) that matches the selected or in-focus category are shown. Those category-matching programs are visually highlighted relative to category non-matching programs to show the match. The content of the program preview area 1408 reflects the currently in-focus program listing. The OK button 764 or play button 756 on the remote control selects an in-focus program listing for view. When a channel or program is selected, the application layer 416 automatically exits the EPG display and commences viewing the selected programming.

Figure 18:
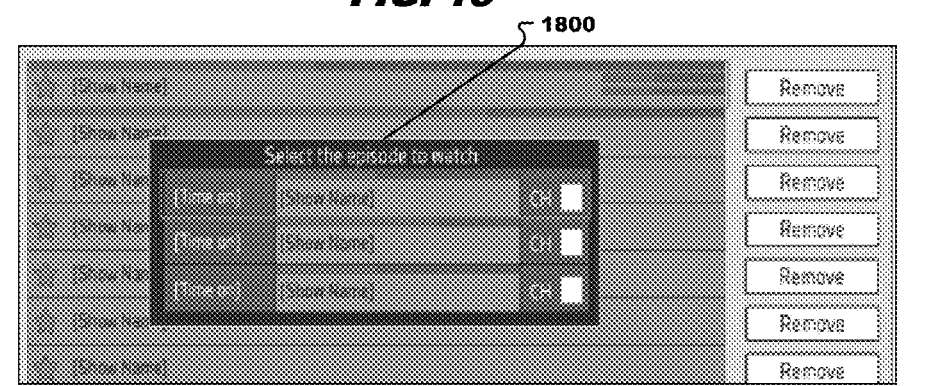
FIG. 18 is a partial screen shot of the Intelligent TV screen according to an embodiment.
Figure 17:
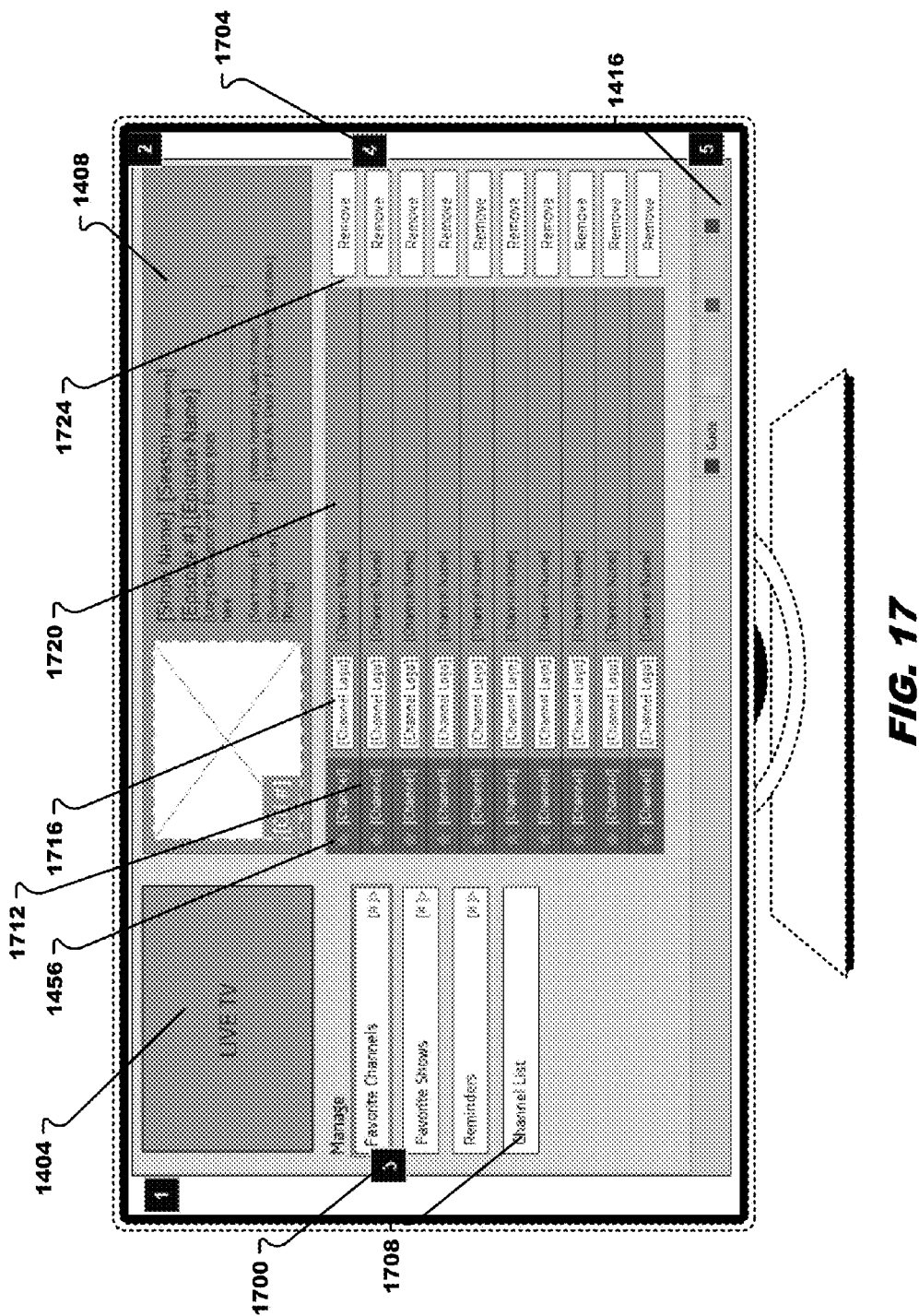
FIG. 17 is a screen shot of the Intelligent TV screen according to according to an embodiment.

With reference to FIG. 17, the interaction of EPG with favorite indicators is illustrated. The manage favorite area 1700 includes selectable bars 1708 for favorite channels, shows, reminders, and channel list and a vertically scrollable channel listing 1704. Moving the focus from one selectable bar 1708 to another causes the vertically scrollable channel listing 1704 to be refreshed to mirror the currently in-focus bar 1708. Each listing in the channel listing 1704 includes, when the favorite channels bar 1708 is in-focus, a favorite indicator 1456, a channel identifier 1712, channel logo 1716, channel name 1720, and a remove icon 1724 (which, if selected, removes the corresponding channel from the set of favorite channels). When the favorite shows bar 1708 is in-focus, a program listing is provided in lieu of the channel listing 1704. Each channel listing includes a favorite indicator 1456, a show name. and a remove icon 1724 (which, if selected, removes the corresponding program from the set of favorite programs). Referring to FIG. 18, when multiple airings of the same program are currently airing, those programs are highlighted accordingly. Selecting the program will provide the user with a modal 1800 of all the listings that are currently live. The modal lists each currently live program listing or episode by start time, show name and channel indicator. The content of the program preview area 1408 reflects the currently in-focus channel programming (in-focus not requiring selection by the OK or play buttons but focus only by the cursor) or program listing. In the hot key bar 1416, the red hot key corresponds to "Guide" (which, if selected, jumps back to currently playing program in the full EPG), and the yellow, green, and red hot keys correspond to no assigned functionality.

The channel list bar 1700, when selected, enables the user to hide and restore channels. Hiding a channel will remove the channel from all views as well as from the normal channel changing experience. If the hidden channel has been marked as a favorite, it will automatically be un-favorited (or removed from the set of favorite channels) before removal. Restoring or un-hiding a channel will reactivate the channel and make it re-accessible from all views. Channels that are hidden are visually differentiated from active channels. In the hot key bar 1416, the red hot key corresponds to "Guide" (which, if selected, jumps back to currently playing program in the full EPG), the yellow hot key to "Restore all" (which, if selected restores all hidden channels), the green hot key to no assigned functionality, and the blue hot key to "Favorites" (which, if selected, toggles the favorite status of the listed channel(s)).

The reminder bar 1708, when selected, enables the user to manage all configured reminders. The vertically scrollable list of programs in the program listing contains all programs that have reminders set. In the hot key bar 1416, the red hot key corresponds to "Guide" (which, if selected, jumps back to currently playing program in the full EPG), the yellow hot key to "Date/Alphabetic" (which, if selected changes the sort order from alphabetic to date (items ordered by soonest to latest) or vice versa with items having no upcoming air date being ordered alphabetically at the end), and the green and blue hot keys to no assigned functionality.

In any of the variations of FIG. 17, the OK button 764 or play button 756 on the remote control selects an in-focus program or channel listing for live viewing. When a channel or program is selected, the application layer 416 automatically exits the EPG display and commences viewing the selected programming.

With reference to FIG. 19, the header bar 1900 will be discussed. The header bar 1900 provides contextual information for the currently watched program. The header bar 1900 includes the following fields: channel indicator 1448, program preview area 1408, current time, current viewing time remaining (or completed) 1904 and/or start-to-finish viewing time 1908 for the currently selected program, video format 1912, and audio format 1916. The header bar 1900 is presented for all program types, including movies, TV show episodes, sport, specials, radio, and undefined. During programming viewing, the header bar 1900 is always displayed whenever the D-Pad 760 is touched or whenever the channel is changed. It auto hides (or is no longer viewable) after a predetermined time, such as 5 seconds. In the viewing area 1920, a full screen thumbnail view of the current program (which can be the same or different to the thumbnail view 1440 in the header bar 1900) is displayed. As noted, the thumbnail view can be program poster if the program poster is available; otherwise, the thumbnail view should be a screen grab provided by the Internet-provided EPG service. When a new channel or program is selected, both the header bar 1900 and viewing area 1920 are updated immediately to reflect the new programming without needing to wait for the newly selected channel or program to activate. The activation delay can be caused by tuning delays. During the activation delay, the viewing area 1920 of the display is unable to display the new programming as a live feed and may continue to display video frames from the prior programming even after a new channel or program is selected. The thumbnail view on the display or viewing area can improve the channel changing experience as all channels will show a full-screen thumbnail view immediately after channel or program selection and while tuning takes place. This can allow the user to flip quickly through channels and view what is on without having to wait for the tuner to catch up.

There are many modes to change channels or programming. With reference to FIGS. 7-10, the remote control includes channel-up and channel-down button 784 to select a next higher or lower channel, respectively, for viewing. The D-Pad 760 can scroll through EPG program or channel listings as described above, and the OK button 764 can select a program or channel for viewing. When not in the EPG display mode, the D-Pad 760 can be used to cycle through favorite channels that have been set on the system along with favorite programs that are currently airing. Opposing sets of arrows, either the up and down arrows or the left and right arrows, when pressed cycle through the favorite channels and programs. The back button 752 can change the currently viewed channel to the last-viewed channel. Repeatedly pressing the back button 752 will toggle between the currently viewed and previously viewed channels. When scrolling in any of these modes, once the largest or smallest numbered channel is reached, the next press takes the user to the smallest or largest numbered channel, respectively.

With reference to FIGS. 7-10, the remote control does not have number keys but rather a 0-9 (number) button 776, which, if selected, reveals an on screen channel changer 2000 shown in FIG. 20. The on screen channel changer 2000 includes a program preview area 1408 (reflecting the currently in-focus channel), a vertically scrollable (EPG) channel listing 2004 (each listing including the channel indicator 1448, show name and progress bar), and a number input bar 2008. In the number input bar 2008, only numbers that will currently produce a selectable channel are enabled. Disabled numbers cannot receive focus and are bypassed during navigation of the number input bar. As each number is selected, the numbers enabled and disabled will vary to reflect the selectable channels available from the root numbers selected. The back button 752 acts as a backspace and, when selected, deletes the last number selected. The removal of the number keys or buttons from the remote control reduces the complexity of the remote control and thereby improves the remote control's overall usability and simplicity while the on screen channel changer 2000 provides the user with the ability to change channels using only the D-Pad 760. One opposing set of arrows (e.g., the up and down arrows) scrolls up and down through the program listing 2004 while the other opposing set of arrows (e.g., the left and right moves to the left and right, respectively, through the number input bar 2008.

The on screen channel changer 2000 can have different EPG channel listing configurations. In one configuration, a mini EPG is presented having a single channel listing of the last channel that was manually entered by the user (that may not be the currently viewed channel). In another configuration shown in FIG. 20, as numbers are selected a dynamic EPG channel listing is presented. The channels in the dynamic EPG listing correspond to the channels that are currently selectable from the root entered numbers. For example, if the user has entered "11" and only numbers "2", "4", and "6" in the number input bar are enabled, the channels in the dynamic EPG channel listing would include channel listings for channels 112, 114, and 116.

Figure 21:
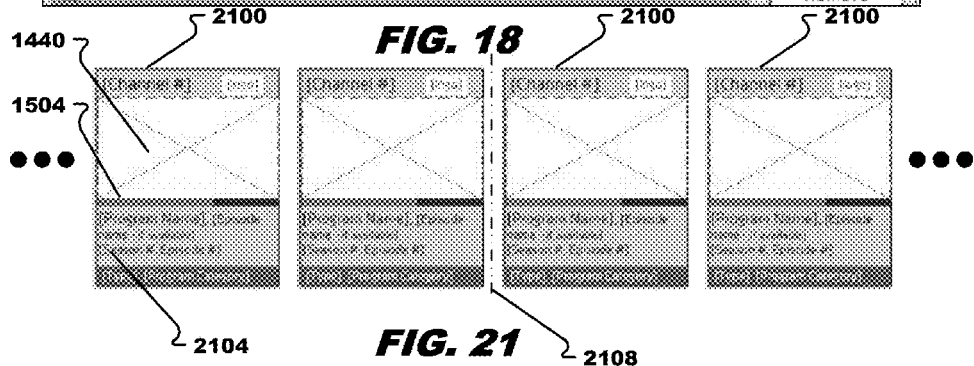
FIG. 21 is a partial screen shot of the Intelligent TV screen according to an embodiment.

With reference to FIG. 21, a D-Pad channel navigation display is shown. Pressing left or right arrows in the D-Pad moves focus from file 2100 to file 2100. Each file 2100 includes a channel number and logo, thumbnail view 1440, progress bar 1504, and program information 2104 (e.g., program name, episode name, season number, episode number, and/or program type and/or category). An in-focus file can be selected by pressing the OK button. The channels to the right of center 2108 can be made up of all channels that have been set as favorites along with any other channels that are currently airing a favorite program. The favorite channels can be ordered by channel increasing or decreasing from the center 2108 out. The channels to the left of the center 2108 can be made of all recommendations based on the user's favorites and watching patterns (e.g., this can initially be limited to programs matching the active program's category until cloud-based recommendations are available). The user's current favorites, for example, can be used to identify similar channels and/or programs that may be of interest to the user. A similar channel may be, for example, a channel broadcasting a favorite program of the user. A similar program may be, for example, a program of a similar category or type to a current favorite. Watching patterns can be determined, for example, by monitoring the frequency (over a selected period of time) of the user selecting a channel and/or watching a program (such as an episode, sport event, news program, and the like). When the frequency is at least a determined amount, the channel or program is recommended. The recommended channels and/or programs can be ordered based on frequency magnitude. As will be appreciated, other techniques can be used to recommend a channel or program to the user. The recommended channels can be ordered by channel increasing or decreasing from the center 2108 out.

Figure 22:
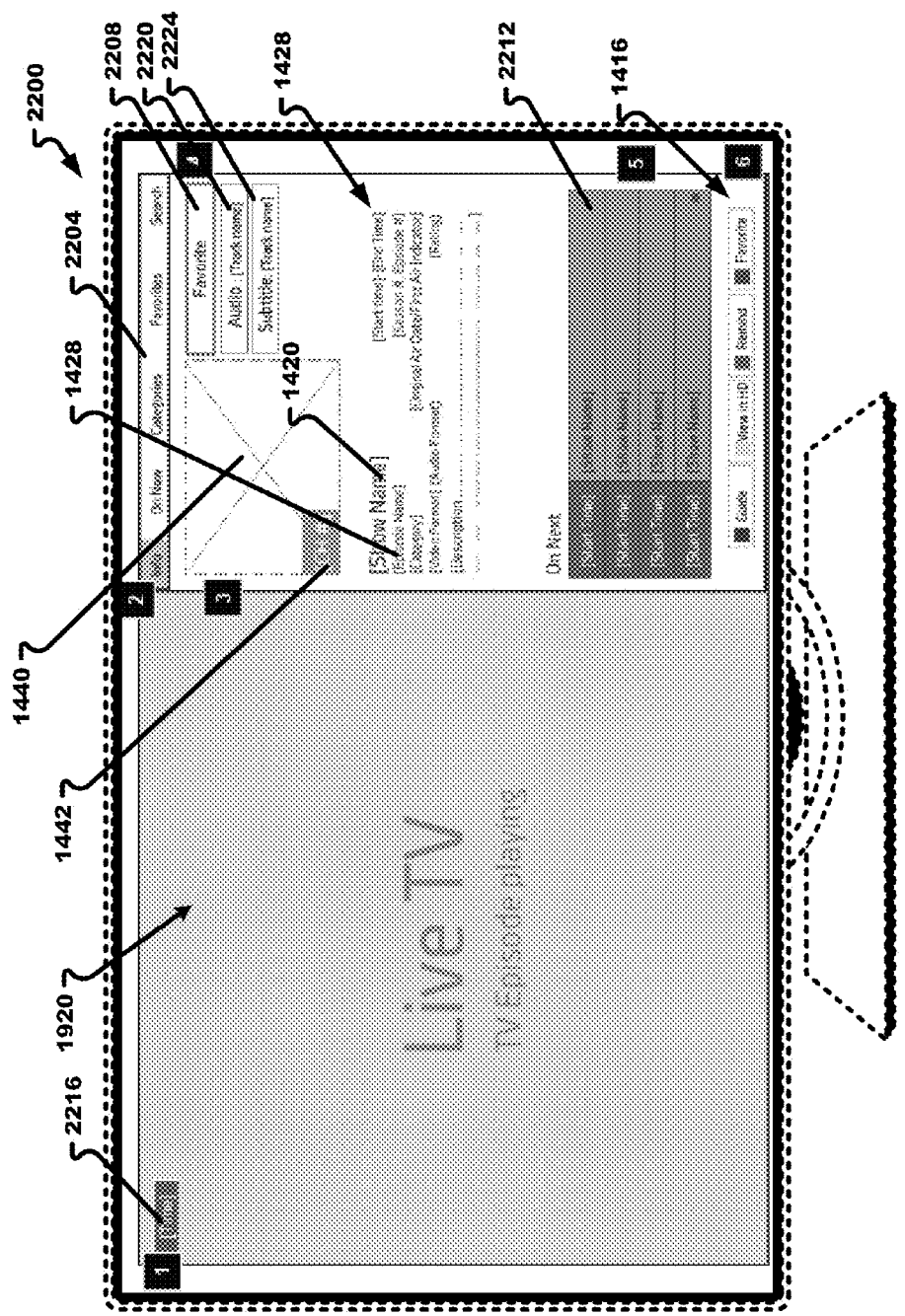
FIG. 22 is a screen shot of the Intelligent TV screen according to according to an embodiment.

The information panel for an episode is shown in FIG. 22. It is available when the user is watching any episode and provides extended information on the currently watched program. The information panel 2200 is adjacent to the viewing area 1920 displaying the live episode programming and displaying the current time 2216. The information panel 2200 includes a panel navigation bar 2204, a thumbnail view 1440 and channel number, name and logo 1442 with accompanying information fields for the episode being displayed in the viewing area 1920, a favorite action button 2208 (which, is selected, provides a modal providing the options: add or remove a program to or from favorites, add or remove a channel to or from favorites, audio track button 2220 (only visible is there are multiple audio tracks and, if selected, provides a modal with a list of all audio tracks available with the video), and subtitle button 2224 (which, if selected, provides a modal with a list of all subtitle tracks available within the video), an on next mini EPG 2212, and hot keys 1416. The accompanying information fields include show name 1420, episode name 1428, and other information 1428 (which includes one or more of program category of the episode, program video format of the episode, program audio format of the episode, program description of the episode, program start and end times of the episode, program season number of the episode (or the season to which the episode belongs), episode number, original air date of the episode, first air indicator, encryption status, and rating of the episode). The on next mini EPG 2212 shows a small time-based EPG with the next few listings of the episode that will be aired. In the hot key bar 1416, the red hot key corresponds to "Guide", which, if selected, dismisses the information panel and launches the full-screen EPG, the yellow hot key to "View in HD", which, if selected, switches to the channel currently airing the same program in HD (which is useful when the current channel is airing the program in SD), the green hot key to "Remind", which, if selected, toggles the reminder on and off for the selected or in-focus program, and the blue hot key to "Favorite", which, if selected, provides a modal with the options: add or remove [Program] to or from favorites and add or remove [Channel] to or from favorites.

An information panel similar to that of FIG. 22 is provided for TV specials, movies, sporting events, radio, and undefined programming. Any of the information panels can be selected by selecting the "Info" option on the panel navigation bar 2204.

From the display of FIG. 22, an EPG panel can be selected by selecting the On Now option on the panel navigation bar 2204. This selection replaces the information panel 2200 with an EPG 1412 similar to that of FIG. 14. It provides a vertically scrollable listing of programs available or airing within the next hour. In this panel, the hot key assignments remain the same as the information panel except for the yellow hot key, which has no corresponding assigned function.

From the display of FIG. 22, a categories panel can be selected by selecting the Category option on the panel navigation bar 2204. This selection replaces the information panel 2200 with a vertically scrollable list of all available program categories. Categories not having available content are excluded from the listing. Selecting a listed category provides a focused mini EPG listing the corresponding available programs within the selected category. In the hot key bar 1416, the red hot key corresponds to "Go to Top", which, if selected, returns the user to the top of the panel, the yellow hot key has no corresponding function, the green hot key to "Remind", which, if selected, toggles the reminder on and off for the selected or in-focus program, and the blue hot key to "Favorite", which, if selected, marks the series in focus as a favorite and, when the series is already a favorite, removes the series from the set of favorites.

From the display of FIG. 22, a favorites panel can be selected by selecting the Favorite option on the panel navigation bar 2204. This selection replaces the information panel 2200 with a vertically scrollable list of all channels that have been marked as favorites along with currently airing programs that are marked as favorites. The listing of channels includes channel number, name and logo and show name. The listing is updated dynamically such that, when a favorite program ends for a channel that is not a favorite, the program is removed from the listing. In the hot key bar 1416, the red hot key corresponds to "Guide", which, if selected, dismisses the favorites panel and launches the full-screen EPG, the yellow and green hot keys have no corresponding functions, and the blue hot key to "Favorite", which, if selected, provides a modal with the options: add or remove [Program] to or from favorites and add or remove [Channel] to or from favorites.

Figure 23:
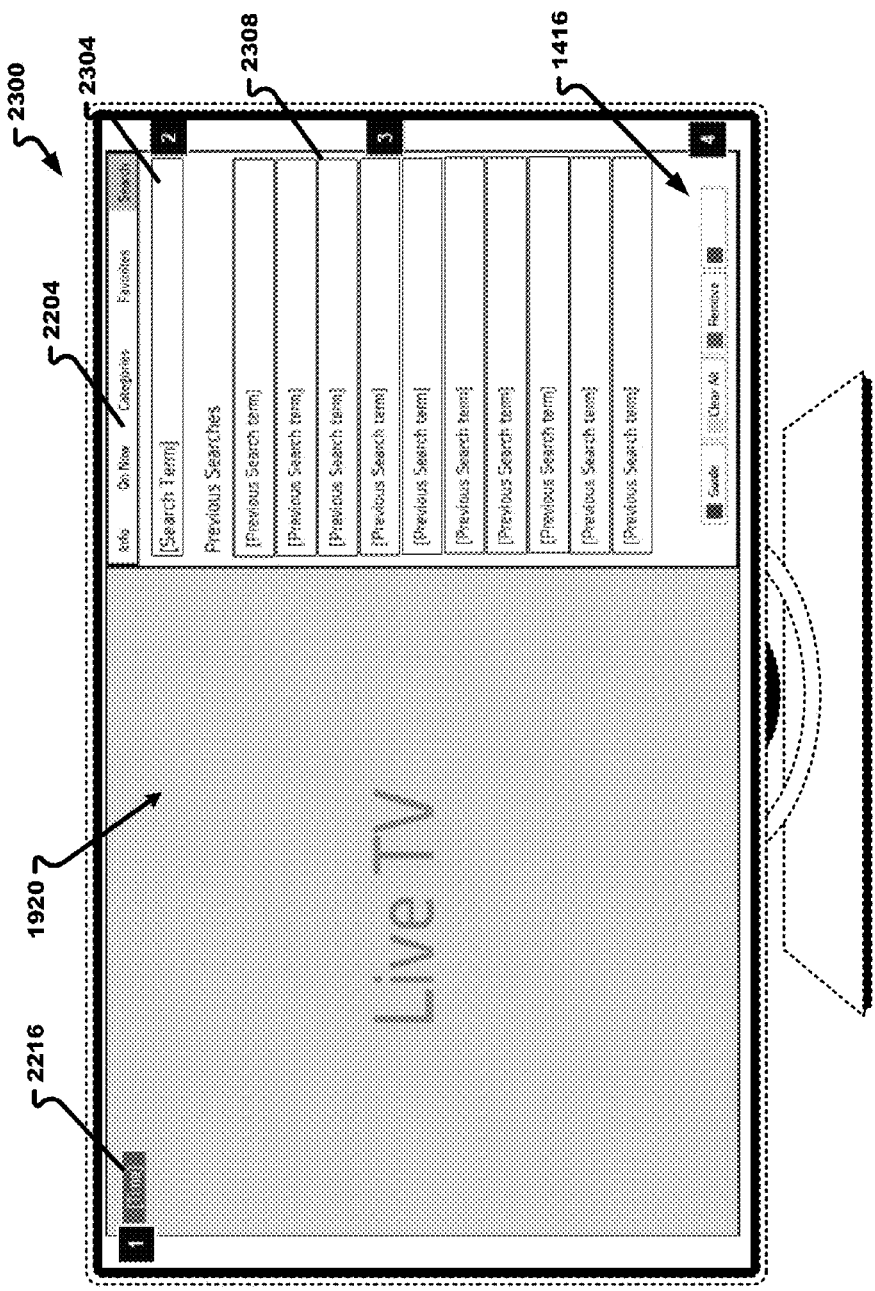
FIG. 23 is a screen shot of the Intelligent TV screen according to according to an embodiment.

From the display of FIG. 22, a search panel 2300 can be selected by selecting the Search option on the panel navigation bar 2204. The search panel 2300 allows the user to search for media within the EPG for content that will be available within a predetermined time period. With reference to FIG. 23, the search panel 2300 includes a search term field 2304, a list of previous search terms 2308, and the hot key bar 1416. The previous search terms are listed with the most recent searched terms on the top of the list. Any of the previous search terms can be selected by the OK button to initiate a new search using the terms. The search term can search any field within an EPG, including channel number, name, or logo, show name 1420, episode name 1428, program category, program video format, program audio format, program description, program start and end times, program season number, episode number, original air date, first air indicator, encryption status, and rating. In the hot key bar 1416, the red hot key corresponds to "Guide", which, if selected, dismisses the search panel and launches the full-screen EPG, the yellow hot key to "Clear all", which, if selected, clears the search history, the green hot key to "Remove", which, if selected, removes the selected term from the search history, and the blue hot key has no corresponding function.

Figure 24:
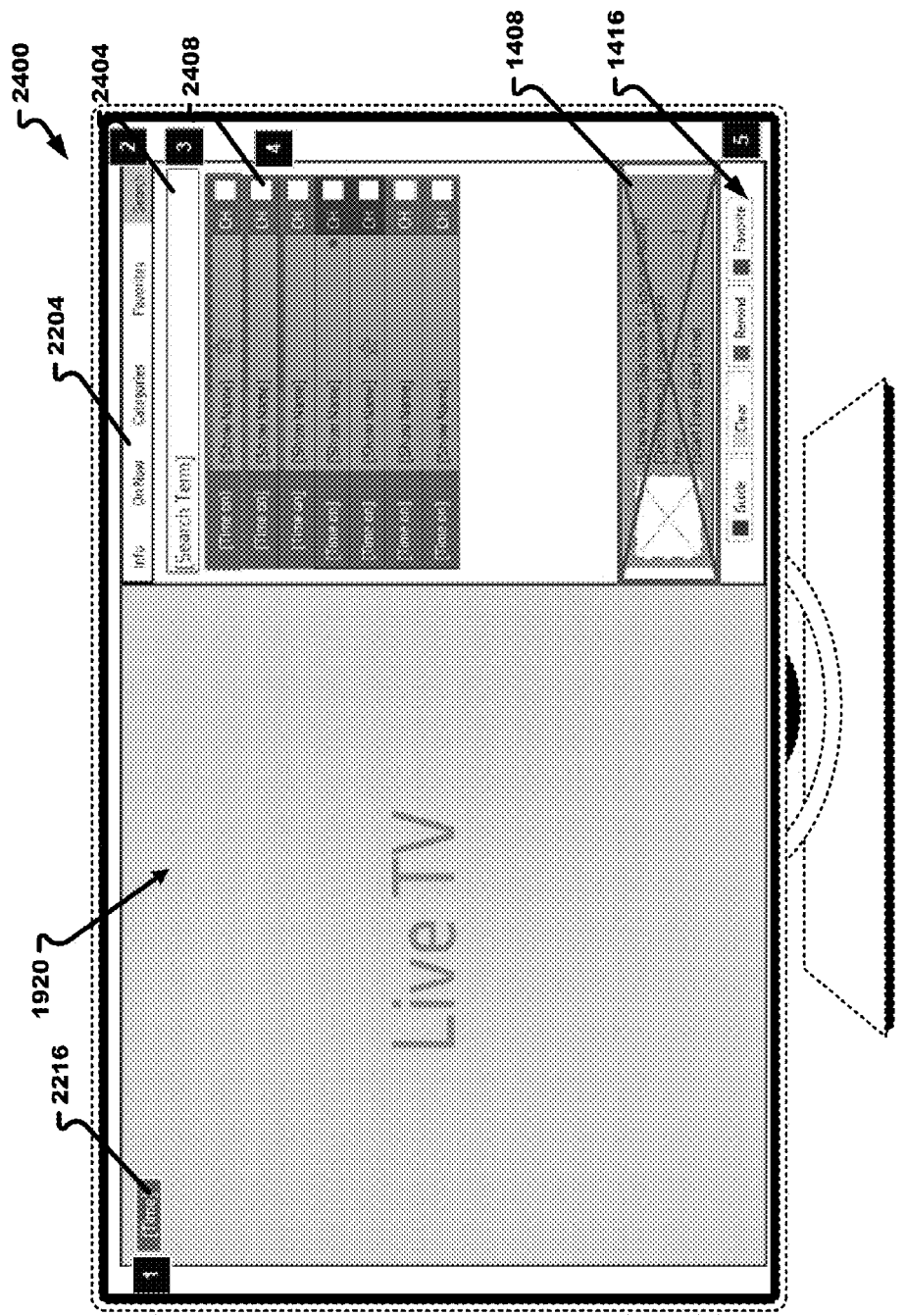
FIG. 24 is a screen shot of the Intelligent TV screen according to according to an embodiment.

The search results panel 2400 of FIG. 24 is provided after a search is initiated. The search results panel includes not only the panel navigation bar 2204 and hot key bar 1416 but also a search term field 2404 and search results listing 2408. The search results update in real time while the user fills in the search term field 2404. The search results 2408 provide a vertically scrollable collection of programs that are related to the search term and are or will be airing within a predetermined time. Each search term listing includes time on or program start time, show name, progress bar, indicators such as the favorite and reminder indicators, and channel number, name, and logo. The search terms are reset (to the prior search terms on the display) when the user exits the live TV silo, the user turns off the TV, or a predetermined time passes from the time of the search. In the hot key bar 1416, the red hot key corresponds to "Go to Top", which, if selected, returns the user to the top of the panel, the yellow hot key to "Clear", which, if selected, clears the current search and returns the panel to the prior to search view with the focus in the empty entry field, the green hot key to "Remind", which, if selected, toggles the reminder on and off for the selected or in-focus program, and the blue hot key to "Favorite", which, if selected, marks the series in focus as a favorite and, when the series is already a favorite, removes the series from the set of favorites. As shown, the search results panel 2400 can optionally include a program preview area 1408 for the in-focus listing in the search results listing 2408.

Figure 25:
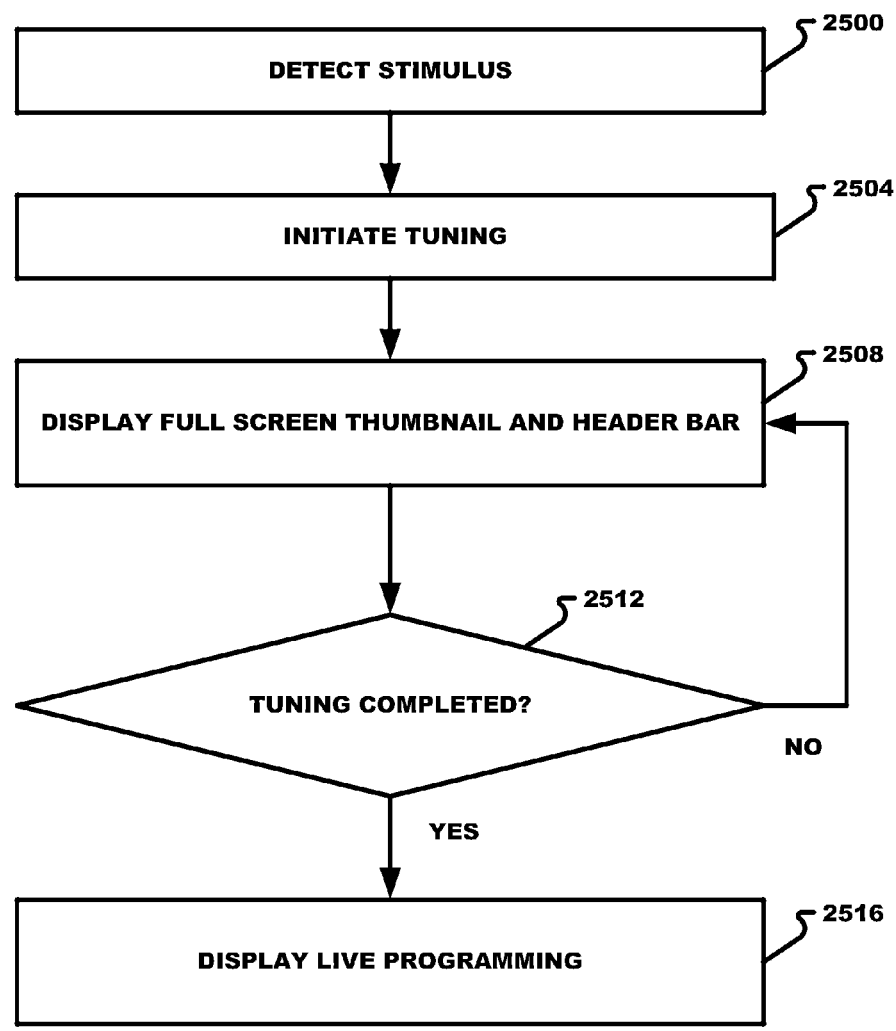
FIG. 25 is a flow chart according to an embodiment.

A user interface operation of the application framework 412 (typically the panel manager 536 and/or panel controller 552) is shown in FIG. 25. The operation will be discussed with reference to FIG. 19.

In step 2500, the application framework 412 detects a stimulus, such as selection of a new channel or program that causes the intelligent TV 100 tuner to locate a new programming signal.

In step 2504, the intelligent TV 100 tuner initiates tuning to locate the new programming signal.

In step 2508, the application framework 412, during the period that the tuner is attempting to locate the new programming signal, displays, in the viewing area 1920, the display of FIG. 19. One or more thumbnail views of the current program on the new channel or the newly selected program are shown in the thumbnail view and viewing area.

In decision diamond 2512, the application framework 412 determines whether tuning is completed and the new programming signal has been located and is currently being received. If not, the application framework 412 returns to step 2508. If so, the application framework 412, in step 1516, displays, in the viewing area 1920, live programming in lieu of the view of FIG. 19.

Figure 26:
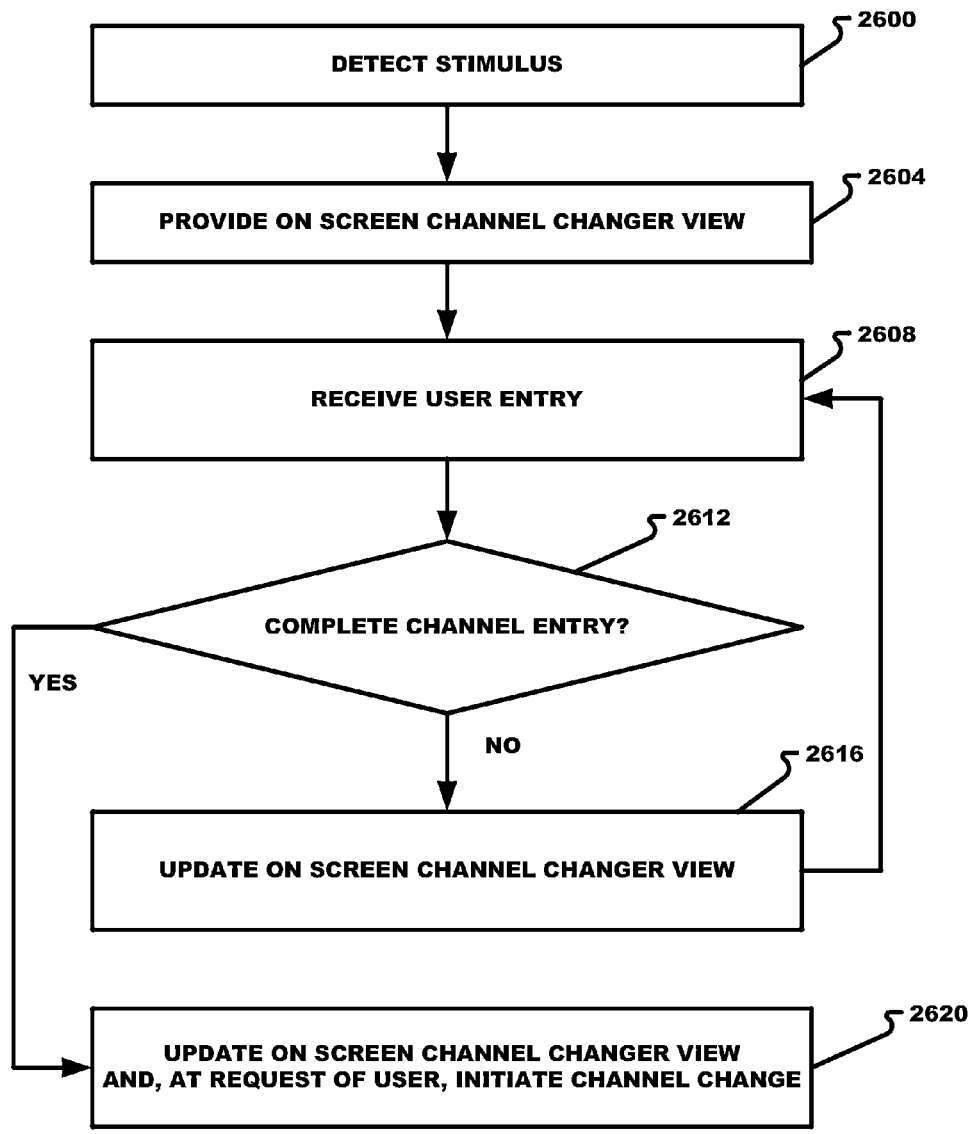
FIG. 26 is a flow chart according to an embodiment.

A further user interface operation of the application framework (typically the panel manager 536 and/or panel controller 552) is shown in FIG. 26. The operation will be discussed with reference to FIGS. 20 and 27.

In step 2600, the application framework 412 detects a stimulus, such as selection of the 0-9 (number) button 776, a new channel or program that causes the intelligent TV 100 tuner to locate a new programming signal.

Figure 27:
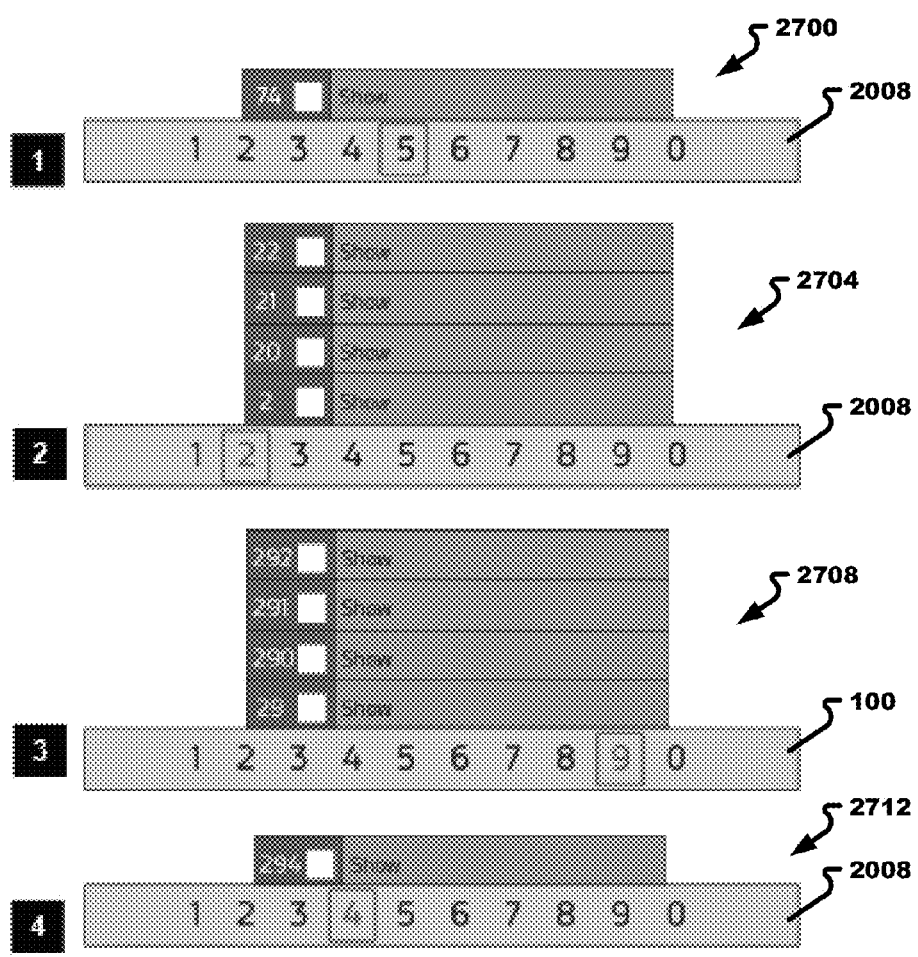
FIG. 27 is a series of partial screen shots of the Intelligent TV screen according to an embodiment.

In step 2604, the application framework 412, in response, displays, in the viewing area 1920, an on screen channel changer 2000. With reference to FIG. 27, the on screen channel changer 2000 will have the appearance of the on screen channel changer 2700. When the on screen channel changer is brought into focus, it will contain a mini EPG with a single entry of the last channel that was manually entered (that is not the current channel). The in-focus indicator will be in a default center position on the number input bar 2008 (which is in the "5" position as shown). Only numbers in the number input bar 2008 that will produce a selectable channel are enabled while the other numbers are disabled.

In step 2608, the application framework 412 receives a number selection via the on screen channel changer.

In decision diamond 2612, the application framework 412 determines whether the user has entered a complete channel entry. If not, the application framework 412, in step 2612, updates the on screen channel changer 2700 to reflect the selected number. Referring to FIG. 27, the user used the D-Pad to select the number "2". The on screen channel changer 2704 is updated to show, in the mini EPG, the next three channels that begin with the number "2". Selecting any of these EPG listings will automatically change the channel and dismiss the on screen channel changer 2704.

In the example of FIG. 27, the user has selected only the first number of the channel. The user next uses the D-Pad to select the number "9". Because a complete channel entry has not been entered, the application framework 412 proceeds to step 2612 and updates the on screen channel changer 2704 to reflect the selected number. Referring to FIG. 27, the user used the D-Pad to select the number "9". The on screen channel changer 2708 is updated to show, in the mini EPG, the next three channels that begin with the numbers "29". Selecting any of these EPG listings will automatically change the channel and dismiss the on screen channel changer 2708.

The user, in step 2608, next selects the number "4" using the D-Pad. In decision diamond 2612, the application framework 412 determines that a complete channel has been entered (which is 294 in the example) and, in step 2620, updates the on screen channel changer 2712 by showing, in the mini EPG, and putting in focus only a single listing corresponding to the entered channel. If the user selects the listing, the application framework 412 will automatically change the channel and dismiss the on screen channel changer 2712.

The exemplary systems and methods of this disclosure have been described in relation to intelligent televisions. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a television, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:

accessing, from a network accessible external content source, electronic program guide ("EPG") information, the EPG information comprising, for each program, airtime, program name, program channel, and program description;

displaying, by a microprocessor executable application framework and on a screen of a television, a search panel, the search panel comprising a search term field to receive a search term and at least one previous set of search terms used by a user in a prior search, wherein selection of the at least one previous set of search terms initiates a search of the EPG information using the at least one previous set of search terms as a first selected set of search terms;

performing, by a microprocessor executable data service of the television, the search using a second selected set of search terms, the second selected set of search terms being received in the search term field or a selected previous set of search terms, said performing comprising:

receiving, from the application framework, the second selected set of search terms, the second selected set of search terms being received in the search term field or a selected previous set of search terms;

in response, a microprocessor executable content presentation service opening a socket and sending the second selected set of search terms to a microprocessor executable content aggregation service; and providing, by the microprocessor executable content aggregation service, the second selected set of search terms to plural external content sources, wherein the plural external content sources comprise a Web site other than the EPG content source;

receiving, by the microprocessor executable content aggregation service, local search results, from a local database of the television; the local search results responsive to the second selected set of search terms;

receiving, by the microprocessor executable content aggregation service, non-local search results responsive to the second selected set of search terms from the plural external content sources, the plural external content sources comprising an Internet site and one or both of cable and satellite content sources other than the Internet site; the non-local search results comprising EPG information corresponding to multiple channels and/or programs;

providing, by the microprocessor executable content presentation service, the local and non-local search results, over the previously opened socket to one or more users, the providing comprising displaying, by the application framework, the local and non-local search results on the television screen;

receiving, by the application framework and from a remote control of the user, a program selection from the displayed set of local and non-local search results; and changing, by the application framework, a current channel to a channel broadcasting the program selection, wherein, when the search session is over, the microprocessor executable content presentation service disconnects the socket.

2. The method of claim 1, wherein the plural external content sources comprise a plurality of an email server, an instant messaging service, a data service other than a Web site, a blogging service, a social media site, and a Web site other than the foregoing plural external content sources.

3. The method of claim 2, wherein the plural external content sources provide programming formation comprising, for each program, airtime, program name, program channel, and program description.

4. The method of claim 3, wherein the displayed search results lists multiple programs, wherein each search result comprises an air time of the corresponding program, a name of the corresponding program, and a channel broadcasting the corresponding program, wherein one of the multiple programs is in focus, wherein a thumbnail preview is displayed on a screen of the television with the displayed set of search results, wherein the thumbnail preview corresponds to the in focus program, wherein the thumbnail preview comprises a graphical image and at least one of a program name, series name, episode number, episode name, and sport event name and a plurality of a program description, a program type, a program category, a start-to-finish time, current runtime, and a remaining runtime, and wherein the graphical image is one of a captured frame of the in focus program, a picture associated with the in focus program, and a photograph associated with the in focus program.

5. The method of claim 1, wherein the plural external content sources comprise a social media site, wherein the television publishes, automatically and via a social network service, selected content displayed by a screen of the television to a social network and wherein the published selected content comprises one or more user comments.

6. The method of claim 5, wherein the television screen provides a dynamic visualization of aggregated connections and/or inbound messages and/or outbound messages from one or more social media sites and wherein the aggregation and/or inbound messages and/or outbound messages are depicted graphically on the television screen as a volume of connections to influence the user.

7. The method of claim 6, wherein, in a social volume visualization, selected contents of each linked social network profile of a social contact and/or inbound messages and/or outbound messages from or to a linked social media contact and/or current activity of the social media contact is presented in a displayed object on the television screen, the displayed object comprising at least one tile.

8. The method of claim 7, wherein a size of the at least one tile is related to one or more of a relative degree of importance of the linked social contact to the user, a type of relationship of user to the linked social contact, a degree of influence of the linked social contact to the user, a geographic proximity of the linked social contact to the user, a degree to which the currently provided media content is of interest both to the user and linked social contact, an assigned ranking of the linked social contact by the user, a type of social network type linking the user with the linked social contact, a current activity of the linked social contact, a current online or offline status of the linked social contact, and a social network grouping type or category to which both the user and linked social contact belong.

9. A television, comprising:
a television screen;
a local computer readable medium;
at least one of an infrared and radio frequency module to receive wirelessly input signals from a remote control of a user;
a microprocessor executable application framework to display on a screen of a television, a search panel, the search panel comprising a search term field to receive a search term and at least one previous set of search terms used by the user in a prior search, wherein selection of the at least one previous set of search terms initiates a search of electronic program guide ("EPG") information using the at least one previous set of search terms as a first selected set of search terms;
a microprocessor executable content aggregation service to access, from a network accessible content source EPG information, the EPG information comprising, for each program, airtime, program name, program channel, and program description; receive a selected set of search terms; perform the search using a second selected set of search terms, the second selected set of search terms being received in the search term field or a selected previous set of search terms, receive local search results, from a local database of the television, the local search results responsive to the second selected set of search terms; and receive non-local search results responsive to the second selected set of search terms from multiple external content sources, the multiple external content sources comprising an Internet site and one or both of cable and satellite content sources other than the Internet site; the non-local search results comprising EPG information corresponding to multiple channels and/or programs, wherein performing the search comprises:
providing, by the microprocessor executable content aggregation service, the second selected set of search terms to multiple external content sources, wherein the multiple external content sources comprise a Web site other than the EPG content source; and
a microprocessor executable content presentation service operable to open a socket to send the second selected set of search terms to the content aggregation service and provide, by the application framework, the local and non-local search results, over the previously opened socket to one or more users, the providing the local and non-local search results comprising displaying, by the application framework, the local and non-local search results on the television screen;
wherein the application framework receives, from a remote control of the user, a program selection from the displayed set of local and non-local search results and changes a current channel to a channel broadcasting the program selection, wherein, when the search session is over, the microprocessor executable content presentation service disconnects the socket.

10. The television of claim 9, wherein the multiple external content sources comprise a plurality of an email server, an instant messaging service, a data service other than a Web site, a blogging service, a social media site, and a Web site other than the foregoing multiple external content sources.

11. The television of claim 9, wherein the multiple external content sources provide programming information comprising, for each program, airtime, program name, program channel, and program description and wherein an external set-top box and/or satellite tuner integral to the television changes a current channel to a channel broadcasting the program selection.

12. The television of claim 11, wherein the displayed search results lists multiple programs, wherein each search result comprises an air time of the corresponding program, a name of the corresponding program, and a channel broadcasting the corresponding program, wherein one of the multiple programs is in focus, wherein a thumbnail preview is displayed on a screen of the television with the displayed set of search results, wherein the thumbnail preview corresponds to the in focus program, wherein the thumbnail preview comprises a graphical image and at least one of a program name, series name, episode number, episode name, and sport event name and a plurality of a program description, a program type, a program category, a start-to-finish time, current runtime, and a remaining runtime, and wherein the graphical image is one of a captured frame of the in focus program, a picture associated with the in focus program, and a photograph associated with the in focus program.

13. The television of claim 9, wherein the multiple external content sources comprise a social media site, wherein the television publishes, automatically and via a social network service, selected content displayed by a screen of the television to a social network and wherein the published selected content comprises one or more user comments.

14. The television of claim 13, wherein television screen provides a dynamic visualization of aggregated connections and/or inbound messages and/or outbound messages from one or more social media sites and wherein the aggregation and/or inbound messages and/or outbound messages are depicted graphically on the television screen as a volume of connections to influence the user.

15. The television of claim 14, wherein, in a social volume visualization, selected contents of each linked social network profile of a social contact and/or inbound messages and/or outbound messages from or to a linked social media contact and/or current activity of the social media contact is presented in a displayed object on the television screen, the displayed object comprising at least one tile.

16. The television of claim 15, wherein a size of the at least one tile is related to one or more of a relative degree of importance of the linked social contact to the user, a type of relationship of user to the linked social contact, a degree of influence of the linked social contact to the user, a geographic proximity of the linked social contact to the user, a degree to which the currently provided media content is of interest both to the user and linked social contact, an assigned ranking of the linked social contact by the user, a type of social network type linking the user with the linked social contact, a current activity of the linked social contact, a current online or offline status of the linked social contact, and a social network grouping type or category to which both the user and linked social contact belong.

17. A tangible and non-transitory computer readable medium, comprising microprocessor executable instructions that, when executed, cause a processor to perform operations comprising:

one or more instructions to access, from a network accessible content source, electronic program guide ("EPG") information, the EPG information comprising, for each program, airtime, program name, program channel, and program description;

one or more instructions to display, on a screen of a television, a search panel, the search panel comprising a search term field to receive a search term and at least one previous set of search terms used by a user in a prior search, wherein selection of the at least one previous set of search terms initiates a search of the EPG information using the at least one previous set of search terms as a first selected set of search terms;

one or more instructions to perform the search using a second selected set of search terms, the second selected set of search terms being received in the search term field or a selected previous set of search terms, said performing comprising:

one or more instructions to open a socket and send the second selected set of search terms to a microprocessor executable content aggregation service; and one or more instructions to provide the second selected set of search terms to multiple external content sources, wherein multiple external content sources comprise a Web site other than the EPG content source;

one or more instructions to receive local search results, from a local database of the television; the local search results responsive to the second selected set of search terms;

one or more instructions to receive non-local search results responsive to the second selected set of search terms from the multiple external content sources, the multiple external content sources comprising an Internet site and one or both of cable and satellite content sources other than the Internet site; the non-local search results comprising EPG information corresponding to multiple channels and/or programs;

one or more instructions to provide the local and non-local search results, over the previously opened socket to one or more users, the providing comprising displaying, by the application framework, the local and non-local search results on the television screen;

one or more instructions to receive, from a remote control of the user, a program selection from the displayed set of search results; and one or more instructions to change a current channel to a channel broadcasting the program selection, wherein, when the search session is over, the microprocessor executable content presentation service disconnects the socket.

18. The computer readable medium of claim 17, wherein the multiple external content sources comprise a plurality of an email server, an instant messaging service, a data service other than a Web site, a blogging service, a social media site, and a Web site other than the foregoing multiple external content sources.

19. The computer readable medium of claim 18, wherein the multiple external content sources provide programming formation comprising, for each program, airtime, program name, program channel, and program description.

20. The computer readable medium of claim 19, wherein the displayed search results lists multiple programs, wherein each search result comprises an air time of the corresponding program, a name of the corresponding program, and a channel broadcasting the corresponding program, wherein one of the multiple programs is in focus, wherein a thumbnail preview is displayed on a screen of the television with the displayed set of search results, wherein the thumbnail preview corresponds to the in focus program, wherein the thumbnail preview comprises a graphical image and at least one of a program name, series name, episode number, episode name, and sport event name and a plurality of a program description, a program type, a program category, a start-to-finish time, current runtime, and a remaining runtime, and wherein the graphical image is one of a captured frame of the in focus program, a picture associated with the in focus program, and a photograph associated with the in focus program.

21. The computer readable medium of claim 17, wherein the multiple external content sources comprise a social media site, wherein the television publishes, automatically and via a social network service, selected content displayed by a screen of the television to a social network and wherein the published selected content comprises one or more user comments.

22. The computer readable medium of claim 21, wherein television screen provides a dynamic visualization of aggregated connections and/or inbound messages and/or outbound messages from one or more social media sites and wherein the aggregation and/or inbound messages and/or outbound messages are depicted graphically on the television screen as a volume of connections to influence the user.

23. The computer readable medium of claim 22, wherein, in a social volume visualization, selected contents of each linked social network profile of a social contact and/or inbound messages and/or outbound messages from or to a linked social media contact and/or current activity of the social media contact is presented in a displayed object on the television screen, the displayed object comprising at least one tile.

24. The computer readable medium of claim 23, wherein a size of the at least one tile is related to one or more of a relative degree of importance of the linked social contact to the user, a type of relationship of user to the linked social contact, a degree of influence of the linked social contact to the user, a geographic proximity of the linked social contact to the user, a degree to which the currently provided media content is of interest both to the user and linked social contact, an assigned ranking of the linked social contact by the user, a type of social network type linking the user with the linked social contact, a current activity of the linked social contact, a current online or offline status of the linked social contact, and a social network grouping type or category to which both the user and linked social contact belong.

* * * * *